(12) United States Patent
Tanaka et al.

(10) Patent No.: US 7,823,180 B2
(45) Date of Patent: Oct. 26, 2010

(54) CONTENT DISTRIBUTION METHOD, CONTENT OBTAINING DEVICE AND METHOD, AND PROGRAM

(75) Inventors: Izuru Tanaka, Tokyo (JP); Makoto Imamura, Tokyo (JP); Yukiko Akiyama, Tokyo (JP); Toshikazu Minoshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 10/940,986

(22) Filed: Sep. 15, 2004

(65) Prior Publication Data

US 2005/0091679 A1 Apr. 28, 2005

(30) Foreign Application Priority Data

Sep. 17, 2003 (JP) ............................. 2003-324044

(51) Int. Cl.
H04N 7/16 (2006.01)
(52) U.S. Cl. ............................. 725/100; 725/62; 705/26
(58) Field of Classification Search ................. 725/100; 707/10; 705/62, 26
See application file for complete search history.

(56) References Cited

U.S. PATENT DOCUMENTS

| 5,027,400 | A | * | 6/1991 | Baji et al. ................... 725/116 |
| 7,124,125 | B2 | * | 10/2006 | Cook et al. ..................... 707/1 |
| 7,310,810 | B1 | * | 12/2007 | Hamada et al. ............... 725/91 |
| 2001/0049641 | A1 | * | 12/2001 | Nakamura et al. ............ 705/26 |
| 2003/0149988 | A1 | * | 8/2003 | Ellis et al. ..................... 725/87 |
| 2004/0117831 | A1 | * | 6/2004 | Ellis et al. ..................... 725/53 |
| 2005/0060701 | A1 | | 3/2005 | Murase |

FOREIGN PATENT DOCUMENTS

| JP | 10-198481 | 7/1998 |
| JP | 11-177497 | 7/1999 |
| JP | 11-186976 | 7/1999 |
| JP | 2001-211355 | 8/2001 |
| JP | 2003-015665 | 1/2003 |
| JP | 2003-162285 | 6/2003 |
| JP | 2003-162648 | 6/2003 |

OTHER PUBLICATIONS

U.S. Appl. No. 10/526,902, filed Aug. 16, 2005, Yamashita et al.
U.S. Appl. No. 10/554,542, filed Oct. 25, 2005, Iwatsu et al.

(Continued)

Primary Examiner—Joseph P Hirl
Assistant Examiner—Jivka Rabovianski
(74) Attorney, Agent, or Firm—Oblon, Spivak, McClelland, Maier & Neustadt, L.L.P.

(57) ABSTRACT

An information processing apparatus, including a communication unit that communicates with an external apparatus. The apparatus also includes a reproduction unit that reproduces content data. Additionally, the apparatus includes a control unit that controls the communication unit to receive list information including identification information of the content data, controls a display unit to display the list information, designates the identification information of the displayed list information based on an input to an operation unit, controls the communication unit to automatically receive a part of the content data corresponding to the designated identification information when the designation of the identification information continues for a defined duration, and controls the reproduction unit to reproduce the received part of the content data.

19 Claims, 28 Drawing Sheets

OTHER PUBLICATIONS

U.S. Appl. No. 10/564,317, filed Jan. 12, 2006, Kikkoji et al.
U.S. Appl. No. 10/577,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasude.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

F I G. 6
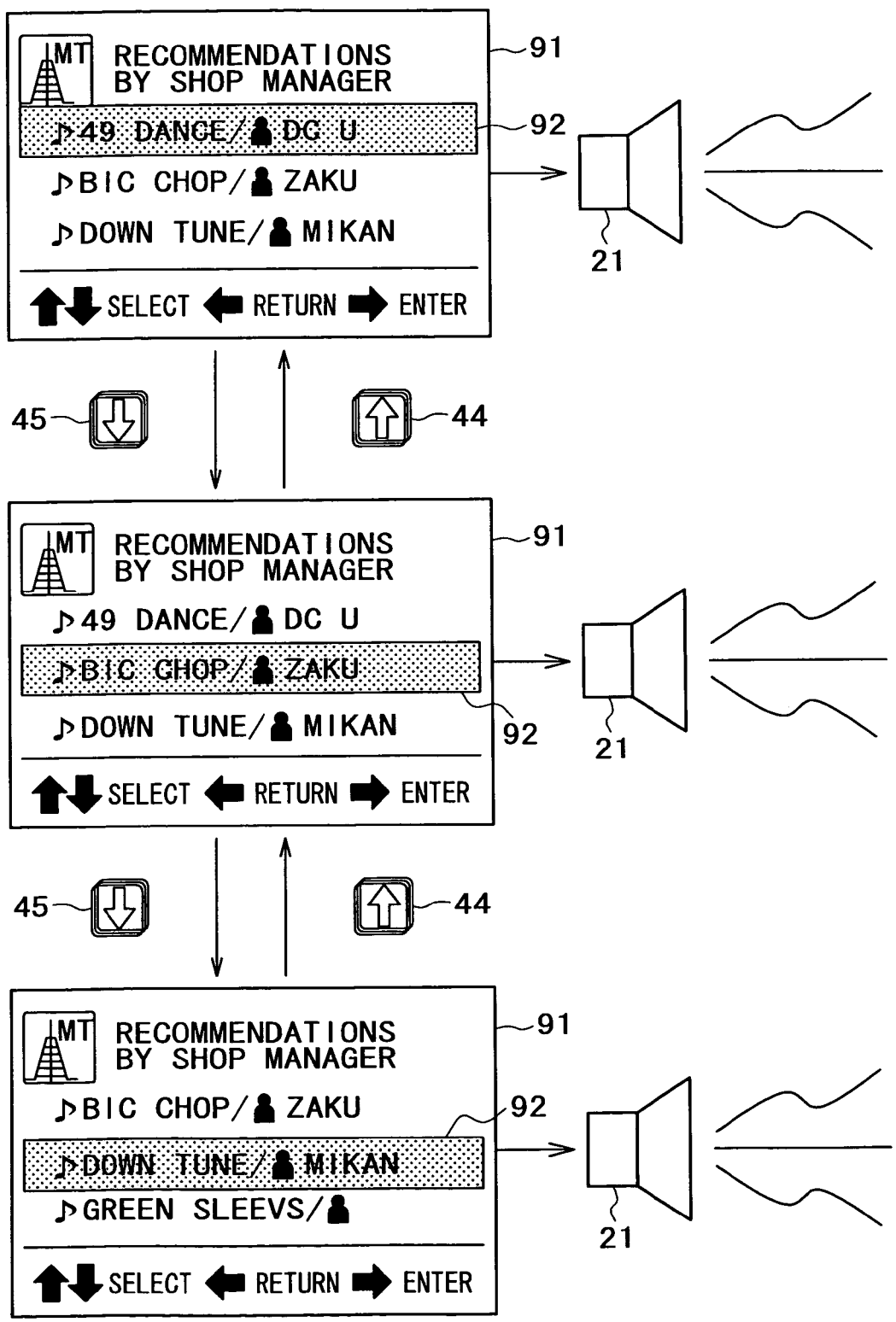

```
1  <PAGETITLE>RECOMMENDATIONS BY SHOP MANAGER</PAGETITLE>
2
3  <MUSIC>
4    <TITLE>49 DANCE</TITLE>
5    <ARTIST>DC UNIT</ARTIST>
6    <PRICE>100</PRICE>
7    <SAMPLE>
8      <REPEAT>3</REPEAT>
9      <SAMPLEDATA>http://sample.foobar.com/49dance-sample.dat<SAMPLEDATA>
10   </SAMPLE>
11   <CONTENT>
12     <CONTENTDATA>http://content.foobar.com/49dance.dat</CONTETDATA>
13   </CONTENT>
14   <LICENSE>
15     <LICENSEDATA>http://license.foobar.com/49dance.lic</LICENSEDATA>
16   </LICENSE>
17 </MUSIC>
18
19 <MUSIC>
20   <TITLE>BIG CHOP</TITLE>
21   <ARTIST>ZAKU ZAKU</ARTIST>
22   <PRICE>100</PRICE>
23   <SAMPLE>
24     <REPEAT>3</REPEAT>
25     <SAMPLEDATA>http://sample.foobar.com/BIGCHOP-sample.dat</SAMPLEDATA>
26   </SAMPLE>
27   <CONTENT>
28     <CONTENTDATA>http://content.foobar.com/BIGCHOP.dat</CONTENTDATA>
29   </CONTENT>
30   <LICENSE>
31     <LICENSEDATA>http://license.foobar.com/BIGCHOP.lic</LICENSEDATA>
32   </LICENSE>
33 </MUSIC>
              ⋮
```

FIG. 23

| | LICENSE |
|---|---|
| USE CONDITIONS | USE TIME LIMIT<br>DOWNLOAD TIME LIMIT<br>PERMITTED NUMBER OF COPIES<br>NUMBER OF CHECKOUTS<br>PERMITTED NUMBER OF CHECKOUTS<br>RIGHT TO RECORDING ONTO CD-R<br>NUMBER OF TIMES COPYING CAN BE PERFORMED TO PDS<br>RIGHT TO CHANGE LICENSE TO OWNERSHIP RIGHT<br>OBLIGATION TO KEEP USE LOG |
| LEAF ID | |
| DNK | |

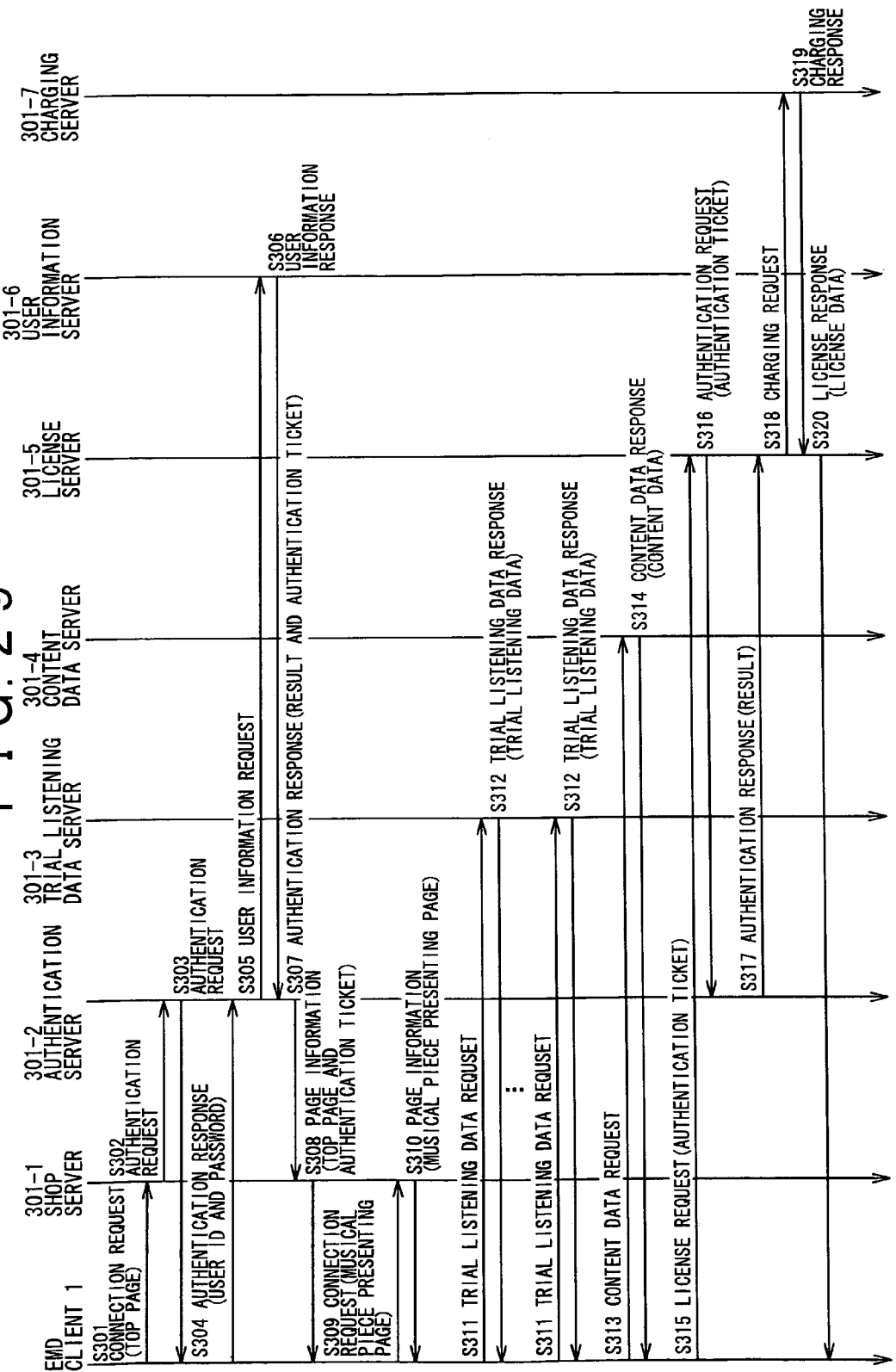

CONTENT DISTRIBUTION METHOD, CONTENT OBTAINING DEVICE AND METHOD, AND PROGRAM

BACKGROUND OF THE INVENTION

The present invention relates to a content distribution method, a device and a method for obtaining contents, and a program, and particularly to a content distribution method, a device and a method for obtaining contents, and a program that enable content download operation that does not rely on a GUI (Graphical User Interface).

Services that distribute various contents via the Internet have recently been spread. Such content distribution services include for example music (musical piece) distribution services (hereinafter referred to as EMD (Electronic Music Distribution) services).

A system for implementing such an EMD service (hereinafter referred to as an EMD system) comprises a server for distributing a musical piece (hereinafter referred to as an EMD server) and a client for obtaining (downloading) the musical piece (hereinafter referred to as an EMD client) (see Japanese Patent Laid-Open No. 2002-123264).

In the conventional EMD system as disclosed in Japanese Patent Laid-Open No. 2002-123264, however, a personal computer (hereinafter referred to as a PC (Personal Computer)) having a large screen (about 14 inches to 21 inches in many cases) and a pointing device such as a mouse or the like is used as the EMD client. The conventional EMD service has a problem in that the use of such a large screen and a pointing device, that is, the use of a GUI is essential.

In other words, the conventional EMD service has a problem in that it is difficult to apply as the EMD client a household electric appliance or the like (for example an audio apparatus) that does not have a large screen and a pointing device such as a PC has.

Specifically, in the conventional EMD system, a PC (EMD client) first obtains a list of purchasable musical pieces (distributable by the EMD server) from the EMD server, and displays the list on a screen of the PC.

A user listens to a sample of each of the musical pieces included in the list displayed on the screen of the PC. When the user finds a musical piece that the user likes, the user purchases (downloads) the musical piece. Alternatively, even when the user has already decided which musical piece to purchase, the user listens to a sample of the musical piece for confirmation before its purchase.

At this time, the user needs to use a pointing device to listen to the sample of the predetermined musical piece. Specifically, the list displayed on the screen includes information indicating characteristics of each of the musical pieces distributable by the EMD server (the information is for example a name of the musical piece, a name of a player, a price or the like, which information will hereinafter be referred to collectively as musical piece information). The musical piece information is listed on the screen of the PC. The user is required to perform a complex operation of specifying musical piece information corresponding to a musical piece a sample of which the user desires to listen to among the musical piece information thus listed by using the pointing device and further pressing (clicking) a button (software key) for starting trial listening reproduction of the musical piece by using the pointing device.

Furthermore, also when purchasing a musical piece that the user likes after listening to a sample thereof, the user needs to perform an operation similar to that at the time of sample listening (an explicit operation of clicking by using the pointing device).

Thus, the conventional EMD service supposes a GUI. It is therefore difficult to apply as the EMD client an appliance (an audio apparatus or the like) that does not have a large display unit (screen) and a pointing device such as a PC has.

Even when a PC is used as the EMD client, the purpose of the user is merely to listen to music, and therefore the user does not expect that the user will need to look carefully at the screen to listen to the music (listen to a sample of the music).

SUMMARY OF THE INVENTION

The present invention has been made in view of the above, and it is accordingly an object of the present invention to enable content download operation that does not rely on a GUI.

According to the present invention, there is provided a content distribution method of a content distribution system, the content distribution system including: a server system for distributing data of contents, the server system comprising one or more information processing apparatus; and a client for obtaining the data of the contents distributed from the server system, the content distribution method comprising the steps of: the client requesting a list including content information for identifying each of one or more contents from the server system; the server system transmitting the list requested by the client to the client; the client setting a content identified by first content information among one or more pieces of content information included in the list received as a content of interest, resetting a content identified by second content information among the one or more pieces of content information included in the received list as the content of interest when a user gives an instruction to change the content of interest, and directly requesting trial data of the content of interest set or reset from the server system without an operation of the user; the server system transmitting the trial data of the content of interest requested by the client to the client; the client directly reproducing the content of interest corresponding to the trial data received without an operation of the user, and requesting full data of the content of interest from the server system when the user gives an instruction to obtain the content of interest while the content of interest corresponding to the trial data is being reproduced; and the server system transmitting the full data of the content of interest requested by the client to the client.

In the content distribution method according to the present invention, when the client requests transmission of a list including content information for identifying each of one or more contents, the requested list is transmitted from the server system to the client. Next, the client sets a content identified by first content information among one or more pieces of content information included in the list received as a content of interest. The client resets a content identified by second content information among the one or more pieces of content information included in the list as the content of interest when a user gives an instruction to change the content of interest. Then, the client requests transmission of trial data of the content of interest set or reset from the server system, and the server system transmits the requested trial data of the content of interest to the client. Then, the client reproduces the content of interest corresponding to the trial data received, and requests transmission of full data of the content of interest from the server system when the user gives an instruction to obtain the content of interest while the content of interest corresponding to the trial data is being reproduced. As a result, the server system transmits the requested full data of the content of interest to the client.

According to the present invention, there is provided a content obtaining device for obtaining data of contents distributed from a server system, the server system including one or more information processing apparatus, the content obtaining device comprising: communication means for transmitting and receiving information to and from the server system; first communication control means for performing control to transmit first request information for requesting a list including content information for identifying each of one or more contents from the communication means to the server system, and then receive the list transmitted as a response to the first request information from the server system by the communication means; setting means for, when the list is received by the communication means under control of the first communication control means, setting a content identified by first content information among one or more pieces of content information included in the list as a content of interest, and when a user gives an instruction to change the content of interest, resetting a content identified by second content information among the one or more pieces of content information included in the list as the content of interest; second communication control means for performing control to directly transmit second request information for requesting trial data of the content of interest set or reset by the setting means to the server system without an operation of the user, and then performing control to make the communication means receive the trial data of the content of interest transmitted as a response to the second request information from the server system; reproducing means for directly reproducing the content of interest corresponding to the trial data received by the communication means under control of the second communication control means without an operation of the user; and third communication control means for performing control to transmit third request information for requesting full data of the content of interest from the communication means to the server system when the user gives an instruction to obtain the content of interest while the reproducing means is reproducing the content of interest corresponding to the trial data, and then make the communication means receive the full data of the content of interest transmitted as a response to the third request information from the server system.

The content obtaining device can further comprise operating means operated by the user, the operating means including: first input means for inputting the instruction to change the content of interest to the setting means; and second inputting means for inputting the instruction to obtain the content of interest to the third communication control means.

The list can further include a permitted number of repetitive reproductions of the trial data, the permitted number being set in advance for each of the one or more contents, and the second communication control means can repeatedly perform control to transmit the second request information from the communication means to the server system a number of times not more than the permitted number included in the list.

The second communication control means can perform control to transmit the second request information from the communication means to the server system when the content of interest is not changed even after a passage of a predetermined time from a point in time when the content of interest is set or reset by the setting means.

The list can include content-related information representing contents related to each of the one or more contents, and the content obtaining device can further comprise display control means for at least displaying content-related information corresponding to the content of interest among one or more pieces of content-related information included in the list on a predetermined display device.

In the content obtaining device according to the present invention, first request information for requesting a list including content information for identifying each of one or more contents is transmitted to the server system. When the list transmitted from the server system as a response to the first request information is thereafter received, a content identified by first content information among one or more pieces of content information included in the list is set as a content of interest. When a user gives an instruction to change the content of interest, a content identified by second content information among the one or more pieces of content information included in the list is reset as the content of interest. Then, second request information for requesting trial data of the set or reset content of interest is transmitted to the server system without an operation of the user. When the trial data of the content of interest transmitted from the server system as a response to the second request information is thereafter received, the content of interest corresponding to the received trial data is reproduced without an operation of the user. When the user gives an instruction to obtain the content of interest while the content of interest corresponding to the trial data is being reproduced, third request information for requesting full data of the content of interest is transmitted to the server system. Thereafter the full data of the content of interest transmitted from the server system as a response to the third request information is received.

According to the present invention, there is provided a content obtaining method for obtaining data of contents distributed from a server system, the server system comprising one or more information processing apparatus, the content obtaining method comprising: a first obtaining step for making a request to the server system for a list including content information for identifying each of one or more contents, and obtaining the list provided from the server system as a result of the request; a setting step for, when the list is obtained by a process of the first obtaining step, setting a content identified by first content information among one or more pieces of content information included in the list as a content of interest, and when a user gives an instruction to change the content of interest, resetting a content identified by second content information among the one or more pieces of content information included in the list as the content of interest; a second obtaining step for directly making a request to the server system for trial data of the content of interest set or reset by a process of the setting step without an operation of the user, and obtaining the trial data of the content of interest distributed from the server system as a result of the request; a reproducing step for directly reproducing the content of interest corresponding to the trial data obtained by a process of the second obtaining step without an operation of the user; and a third obtaining step for making a request to the server system for full data of the content of interest when the user gives an instruction to obtain the content of interest while the content of interest corresponding to the trial data is being reproduced by a process of the reproducing step, and obtaining the full data of the content of interest transmitted from the server system as a result of the request.

According to the present invention, there is provided a program for making a computer perform a process for obtaining data of contents distributed from a server system, the server system comprising one or more information processing apparatus, the program comprising: a first obtaining step for making a request to the server system for a list including content information for identifying each of one or more contents, and obtaining the list provided from the server system as a result of the request; a setting step for, when the list is obtained by a process of the first obtaining step, setting a content identified by first content information among one or more pieces of content information included in the list as a content of interest, and when a user gives an instruction to change the content of interest, resetting a content identified by second content information among the one or more pieces of content information included in the list as the content of interest; a second obtaining step for directly making a request to the server system for trial data of the content of interest set or reset by a process of the setting step without an operation of the user, and obtaining the trial data of the content of interest transmitted from the server system as a result of the request; a reproducing step for directly reproducing the content of interest corresponding to the trial data obtained by a process of the second obtaining step without an operation of the user; and a third obtaining step for making a request to the server system for delivery of full data of the content of interest when the user gives an instruction to obtain the content of interest while the content of interest corresponding to the trial data is being reproduced by a process of the reproducing step, and obtaining the full data of the content of interest transmitted from the server system as a result of the request.

In the content obtaining method and the program according to the present invention, a request is made to the server system for a list including content information for identifying each of one or more contents. When the list provided from the server system is obtained as a result of the request, a content identified by first content information among one or more pieces of content information included in the list is set as a content of interest. When a user gives an instruction to change the content of interest, a content identified by second content information among the one or more pieces of content information included in the list is reset as the content of interest. Then, a request is made to the server system for trial data of the set or reset content of interest without an operation of the user. As a result of the request, the trial data of the content of interest distributed from the server system is obtained. The content of interest corresponding to the obtained trial data is reproduced without an operation of the user. A request is made to the server system for full data of the content of interest when the user gives an instruction to obtain the content of interest while the content of interest corresponding to the trial data is being reproduced. As a result of the request, the full data of the content of interest transmitted from the server system is obtained.

As described above, according to the present invention, it is possible to download contents. In particular, it is possible to download contents by content download operation that does not rely on a GUI (Graphical User Interface).

BRIEF DESCRIPTION OF THE DRAWINGS

FIG. 6 is a diagram of assistance in explaining an example of operation for trial listening reproduction of musical pieces according to the present embodiment;

FIG. 13 is a diagram showing an example of structure of information of a musical piece presenting page;

FIG. 23 is a diagram showing an example of a license corresponding to the content data in FIG. 21;

FIG. 29 is an arrow chart of assistance in explaining a process flow of the EMD system of FIG. 28.

DETAILED DESCRIPTION OF PREFERRED EMBODIMENTS

Preferred embodiments of the present invention will hereinafter be described. Correspondences between required elements described in claims and concrete examples in the embodiments of the invention are illustrated as follows. This description is to confirm that the concrete examples supporting inventions described in the claims are described in the embodiments of the invention. Therefore, even when there is a concrete example described in the embodiments of the invention but not described here as corresponding to a required element, it does not signify that the concrete example does not correspond to the required element. Conversely, even when a concrete example is described here as corresponding to a required element, it does not signify that the concrete example does not correspond to a required element other than that required element.

Further, this description does not signify that all the inventions corresponding to the concrete examples described in the embodiments of the invention are described in the claims. In other words, this description does not negate presence of inventions corresponding to concrete examples described in the embodiments of the invention but not described in the claims of the present application, that is, presence of inventions for divisional application or to be added by amendments in the future.

Figure 5:
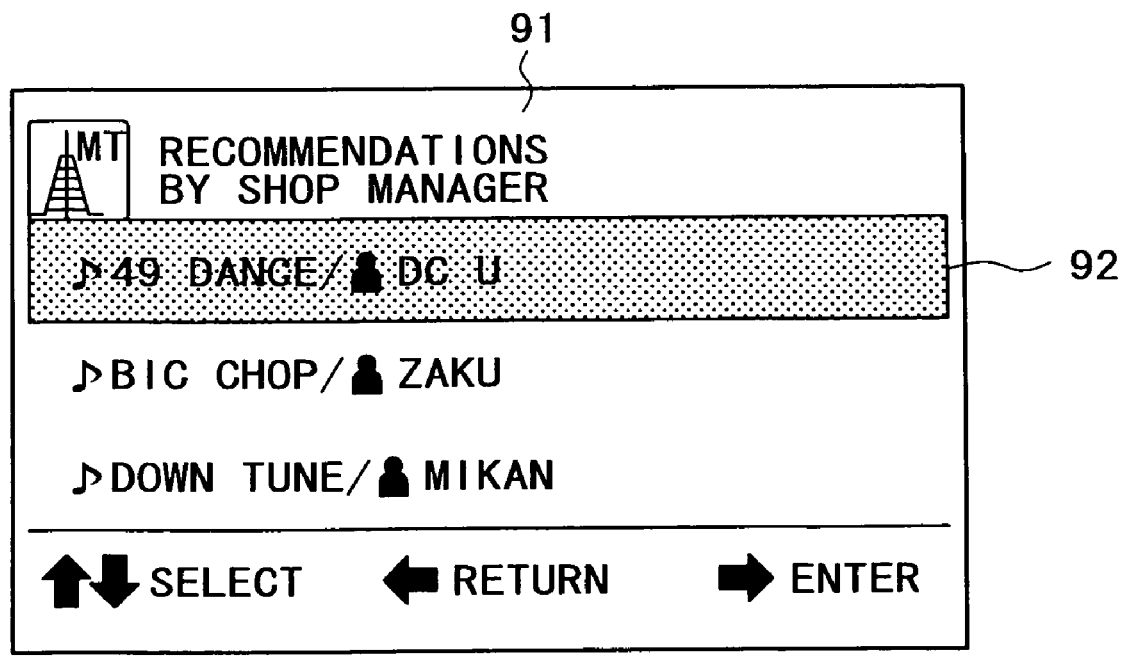
FIG. 5 is a diagram showing an example of display of a musical piece presenting page (list of musical piece information)
Figure 7:
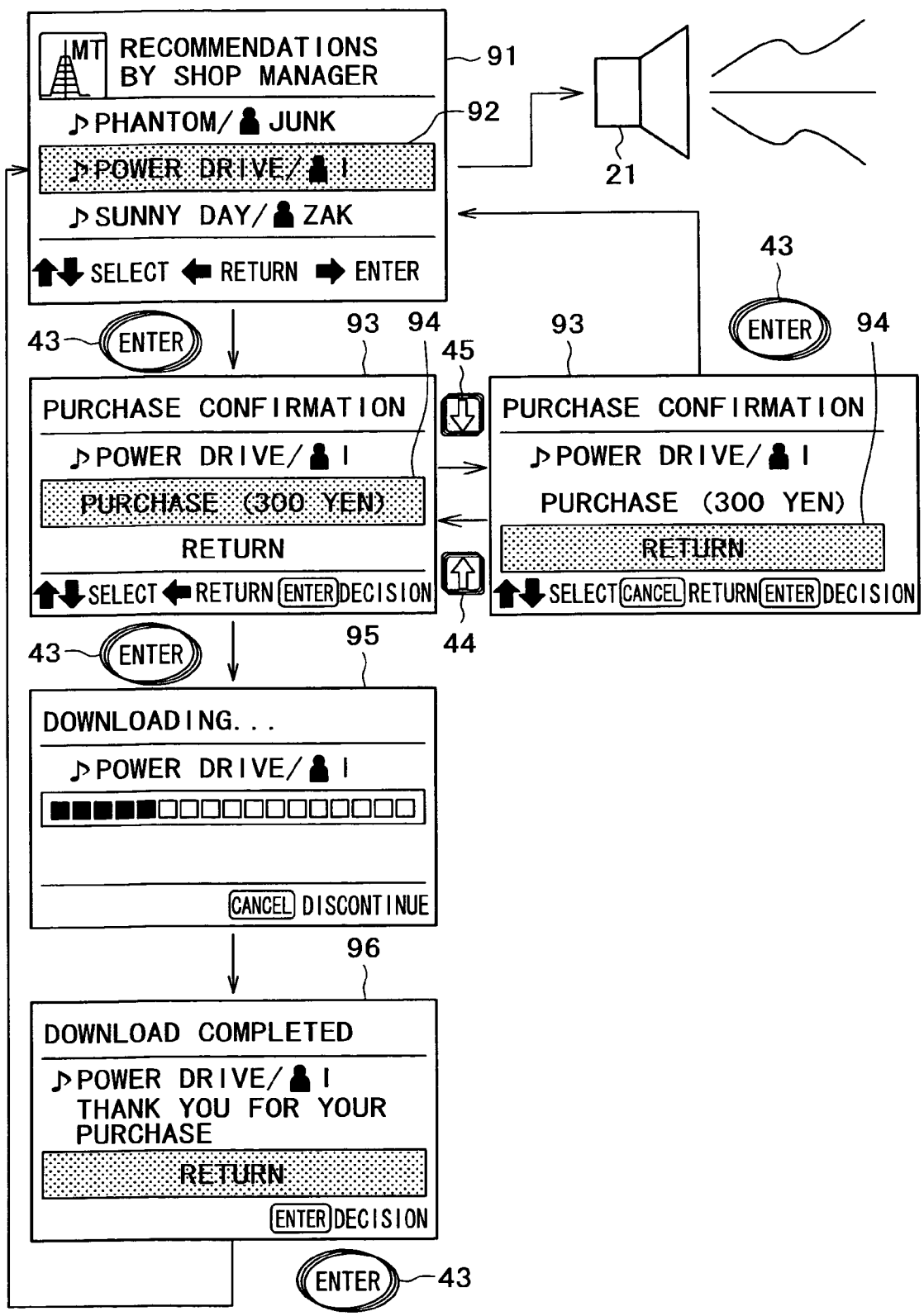
FIG. 7 is a diagram of assistance in explaining an example of operation for purchasing (downloading) a musical piece according to the present embodiment.

The present invention provides a content distribution method. This content distribution method is a content distribution method of a content distribution system, the content distribution system including: a server system (for example an EMD server 3 in FIG. 1 or an EMD server system 301 comprising a shop server 301-1 to a charging server 301-7 in FIG. 28) for distributing data of contents, the server system comprising one or more information processing apparatus; and a client (for example an EMD client 1 in FIG. 1 or FIG. 28) for obtaining the data of the contents distributed from the server system. Specifically, the client requests from the server system a list (for example a list that is formed as an HTML document 221 as shown in FIG. 13 (an HTML document 221 of a musical piece presenting page) and is as shown in FIG. 5 when displayed on a display device (display is not essential)) including content information (for example a name or an ID of a content, or a URL address where the data of the content is present) for identifying each of one or more contents (the client performs a process in step S42 in FIG. 24); the server system transmits the list requested by the client to the client (for example performs a process in step S205 in FIG. 24); the client sets a content (for example a musical piece having a cursor 92 disposed thereon in a musical piece information page 91 in a topmost figure in FIG. 6) identified by first content information among one or more pieces of content information included in the list received as a content of interest (for example a musical piece of interest to be described later, or a musical piece on which a focus is set), resets a content (for example a musical piece having the cursor 92 disposed thereon in a musical piece information page 91 in a second figure from the top of FIG. 6) identified by second content information among the one or more pieces of content information included in the list as the content of interest when a user gives an instruction to change the content of interest (when the user presses a downward button 45 in FIG. 2 as shown in FIG. 6, for example), and directly requests trial data of the content of interest set or reset from the server system without an operation of the user (for example performs a process in step S83 in FIG. 24); the server system transmits the trial data of the content of interest, the trial data being requested by the client, to the client (for example performs a process in step S207 in FIG. 24); the client directly reproduces the content of interest corresponding to the trial data received without an operation of the user, and requests full data of the content of interest from the server system (for example performs a process in step S102 in FIG. 25) when the user gives an instruction to obtain the content of interest while the content of interest corresponding to the trial data is being reproduced (when an ENTER key 43 in FIG. 2 is pressed twice while a musical piece having the cursor 92 disposed thereon in a musical piece information page 91 in a topmost figure in FIG. 7 is being reproduced from a speaker 21 in FIG. 2, as is shown in FIG. 7, for example); and the server system transmits the full data of the content of interest requested by the client to the client (for example performs a process in step S244 in FIG. 25).

The present invention provides a content obtaining device. The content obtaining device (for example an EMD client 1 in FIG. 2 or FIG. 3) for obtaining data of contents distributed from a server system (for example an EMD server 3 in FIG. 1 or an EMD server system 301 comprising a shop server 301-1 to a charging server 301-7 in FIG. 28), the server system comprising one or more information processing apparatus, comprises: communication means (for example a communication unit 19 in FIG. 2 and FIG. 3) for transmitting and receiving information to and from the server system; first communication control means (for example a list obtaining unit 71 in FIG. 3) for performing control to transmit first request information (for example a request for information of a musical piece presenting page 221 shown in FIG. 13) for requesting a list including content information for identifying each of one or more contents from the communication means to the server system, and then receive the list transmitted as a response to the first request information from the server system by the communication means; setting means (for example a focus setting unit 72 in FIG. 3) for, when the list is received by the communication means under control of the first communication control means, setting a content identified by first content information among one or more pieces of content information included in the list as a content of interest, and when a user gives an instruction to change the content of interest, resetting a content identified by second content information among the one or more pieces of content information included in the list as the content of interest; second communication control means (for example a content trial data obtaining unit 74 in FIG. 3) for performing control to directly transmit second request information (for example an access request transmitted when accessing a URL address interposed between SAMPLEDATA tags (<SAMPLE-DATA> and </SAMPLEDATA>) in a ninth line in an HTML document 221 in FIG. 13) for requesting trial data of the content of interest set or reset by the setting means from the communication means to the server system without an operation of the user, and then performing control to make the communication means receive the trial data of the content of interest transmitted as a response to the second request information from the server system; reproducing means (for example a reproducing unit 75 in FIG. 3) for directly reproducing the content of interest corresponding to the trial data received by the communication means under control of the second communication control means without an operation of the user; and third communication control means (for example a content full data obtaining unit 76 in FIG. 3) for performing control to transmit third request information (for example an access request transmitted when accessing a URL address interposed between CONTENTDATA tags (<CONTENTDATA> and </CONTENTDATA>) in a twelfth line in the HTML document 221 in FIG. 13) for requesting full data of the content of interest from the communication means to the server system when the user gives an instruction to obtain the content of interest while the reproducing means is reproducing the content of interest corresponding to the trial data, and then make the communication means receive the full data of the content of interest transmitted as a response to the third request information from the server system.

The content obtaining device can further comprise operating means (for example an input unit 17 in FIG. 2) operated by the user, the operating means including: first input means (for example an upward key 44 and a downward key 45 in FIG. 2) for inputting the instruction to change the content of interest to the setting means; and second inputting means (for example an ENTER key 43 in FIG. 2) for inputting the instruction to obtain the content of interest to the third communication control means.

Figure 15:
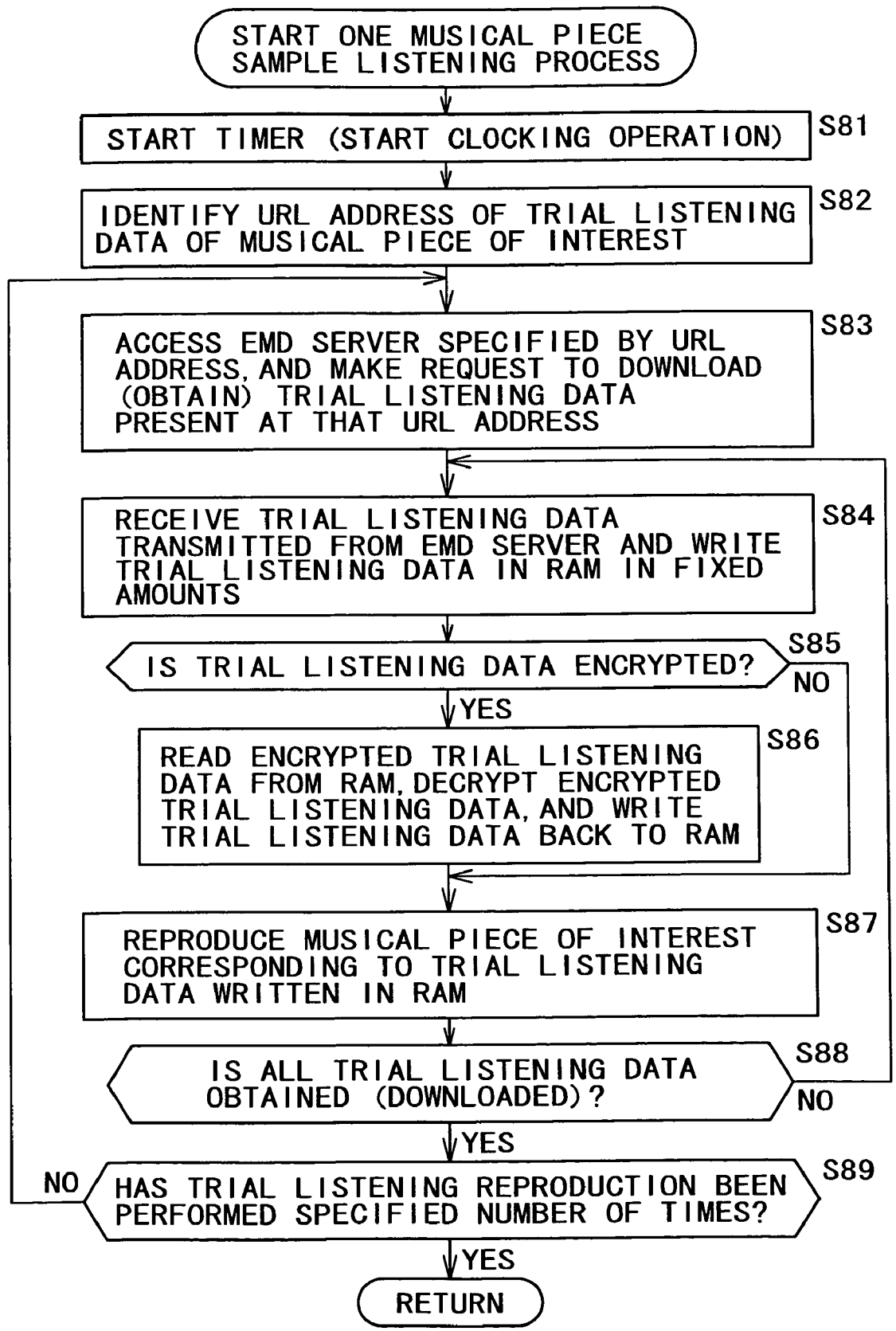
FIG. 15 is a flowchart of assistance in explaining an example of a one musical piece sample listening process managed by the trial listening data obtaining process in FIG. 14.

The list used by the content obtaining device can further include a permitted number (for example a number interposed between REPEAT tags (<REPEAT> and </REPEAT>) in an eighth line in the HTML document 221 in FIG. 13) of repetitive reproductions of the trial data, the permitted number being set in advance for each of the one or more contents, and the second communication control means of the content obtaining device can repeatedly perform control to transmit the second request information from the communication means to the server system a number of times not more than the permitted number included in the list (for example repeat a process from step S83 to step S89 until it is determined in a process in step S89 in FIG. 15 that reproduction has been performed a specified number of times (=the permitted number of times)).

Figure 14:
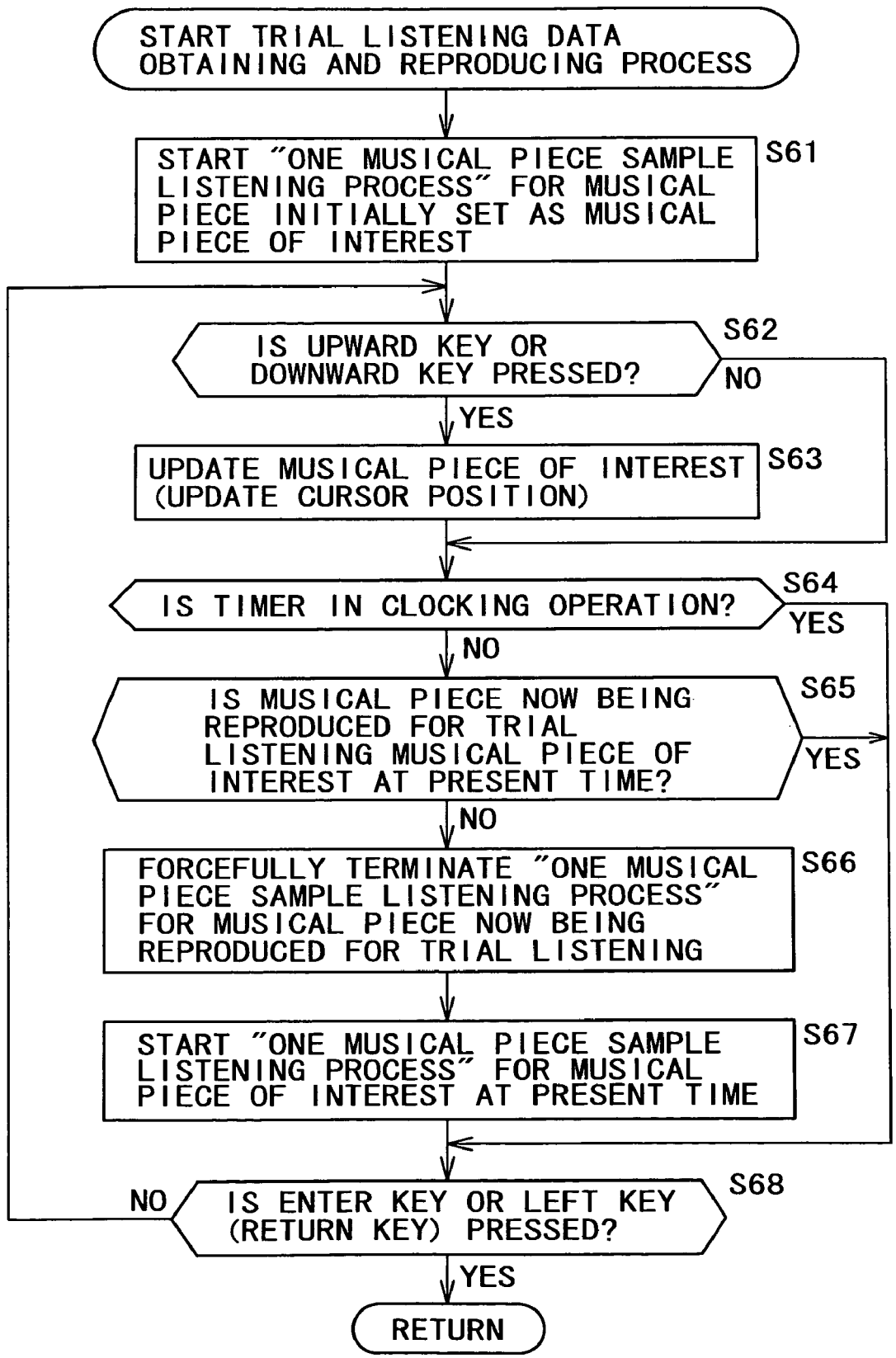
FIG. 14 is a flowchart of assistance in explaining a detailed example of a trial listening data obtaining process in the process of the EMD client in FIG. 9.

The second communication control means of the content obtaining device can perform control to transmit the second request information from the communication means to the server system when the content of interest is not changed even after a passage of a predetermined time from a point in time when the content of interest is set or reset by the setting means (even after a timer 51 in FIG. 2 has clocked the predetermined time, for example) (for example start a process in step S67, that is, a "one musical piece sample listening process" in FIG. 15 for a musical piece of interest at a present time when a determination in a process in step S64 in FIG. 14 is NO and a determination in a process in step S65 is NO).

The content obtaining device can further comprise display control means (for example a display control unit 73 in FIG. 3) for displaying at least a part of the content information corresponding to the content of interest among the one or more pieces of content information included in the list (for example displaying a musical piece presenting page 91 in FIG. 5) on a predetermined display device (for example a display unit 23 in FIG. 2).

Figure 12:
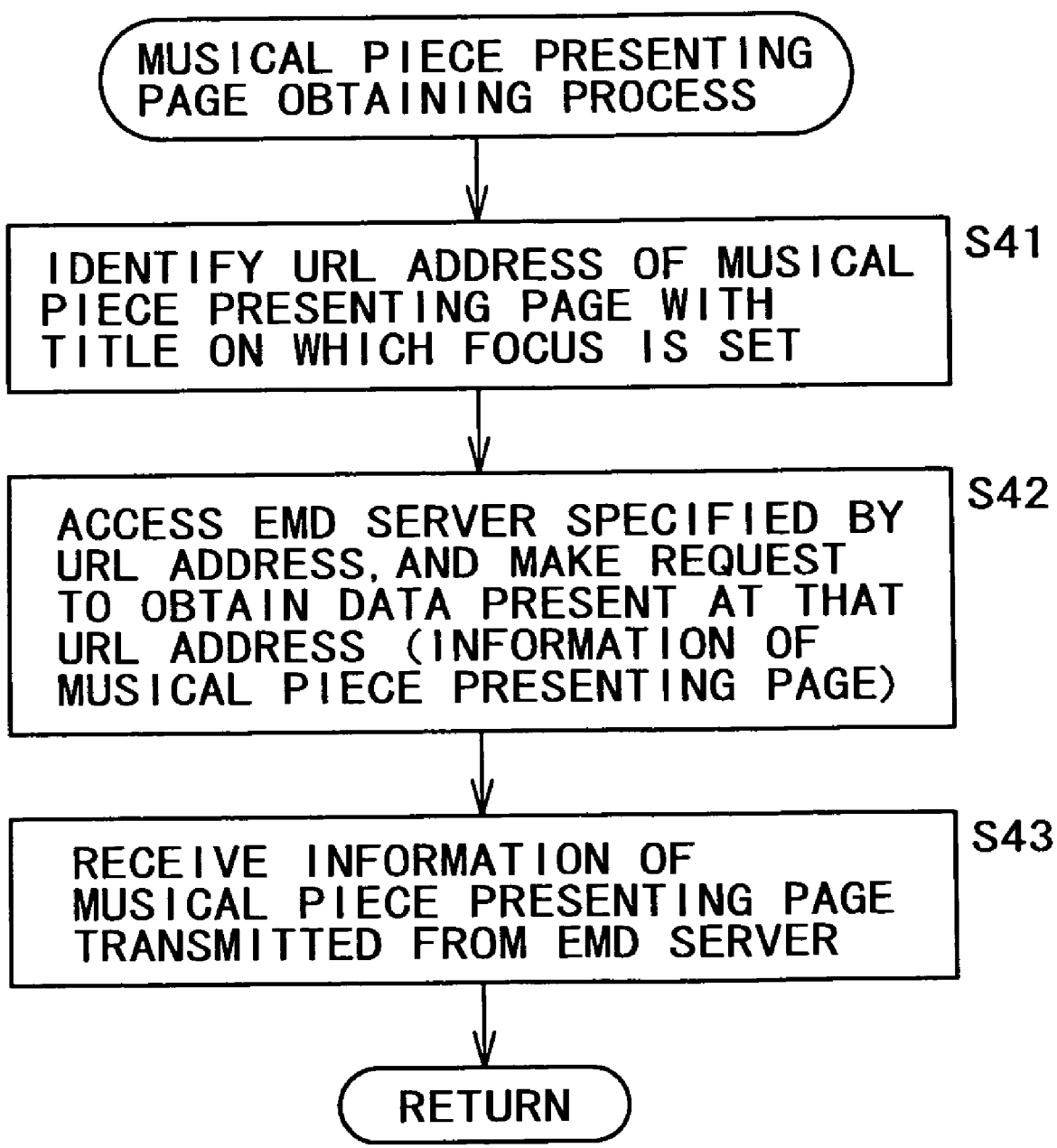
FIG. 12 is a flowchart of assistance in explaining a detailed example of a musical piece presenting page obtaining process in the process of the EMD client in FIG. 9.

The present invention provides a content obtaining method. The content obtaining method for obtaining data of contents distributed from a server system, the server system comprising one or more information processing apparatus, comprises: a first obtaining step (for example a "musical piece presenting page obtaining process (detailed in FIG. 12)" in step S7 in FIG. 9) for making a request to the server system for a list including content information for identifying each of one or more contents, and obtaining the list provided from the server system as a result of the request; a setting step (for example a process from step S61 to step S63 in FIG. 14) for, when the list is obtained by a process of the first obtaining step, setting a content identified by first content information among one or more pieces of content information included in the list as a content of interest, and when a user gives an instruction to change the content of interest, resetting a content identified by second content information among the one or more pieces of content information included in the list as the content of interest; a second obtaining step (for example a process in steps S83 and S84, in particular, in a "one musical piece sample listening process" in FIG. 15 started at a process in step S61 or step S67 in FIG. 14) for making a request to the server system for trial data of the content of interest set or reset by a process of the setting step without an operation of the user, and obtaining the trial data of the content of interest transmitted from the server system as a result of the request; a reproducing step (for example a process in steps S87, in particular, in the "one musical piece sample listening process" in FIG. 15 started at the process in step S61 or step S67 in FIG. 14) for directly reproducing the content of interest corresponding to the trial data obtained by a process of the second obtaining step without an operation of the user; and a third obtaining step (for example a "content data obtaining process (detailed in FIG. 16)" in step S12 in FIG. 9) for making a request to the server system for full data of the content of interest when the user gives an instruction to obtain the content of interest while the content of interest corresponding to the trial data is being reproduced by a process of the reproducing step, and obtaining the full data of the content of interest transmitted from the server system.

The present invention provides a program. The program for making a computer perform a process for obtaining data of contents distributed from a server system, the server system comprising one or more information processing apparatus, comprises: a first obtaining step (for example a "musical piece presenting page obtaining process (detailed in FIG. 12)" in step S7 in FIG. 9) for making a request to the server system for provision of a list including content information for identifying each of one or more contents, and obtaining the list provided from the server system as a result of the request; a setting step (for example a process from step S61 to step S63 in FIG. 14) for, when the list is obtained by a process of the first obtaining step, setting a content identified by first content information among one or more pieces of content information included in the list as a content of interest, and when a user gives an instruction to change the content of interest, resetting a content identified by second content information among the one or more pieces of content information included in the list as the content of interest; a second obtaining step (for example a process in steps S83 and S84, in particular, in a "one musical piece sample listening process" in FIG. 15 started at a process in step S61 or step S67 in FIG. 14) for making a request to the server system for trial data of the content of interest set or reset by a process of the setting step without an operation of the user, and obtaining the trial data of the content of interest transmitted from the server system as a result of the request; a reproducing step (for example a process in step S87, in particular, in the "one musical piece sample listening process" in FIG. 15 started at the process in step S61 or step S67 in FIG. 14) for directly reproducing the content of interest corresponding to the trial data obtained by a process of the second obtaining step without an operation of the user; and a third obtaining step (for example a "content data obtaining process (detailed in FIG. 16)" in step S12 in FIG. 9) for making a request to the server system for transmission of full data of the content of interest when the user gives an instruction to obtain the content of interest while the content of interest corresponding to the trial data is being reproduced by a process of the reproducing step, and obtaining the full data of the content of interest transmitted from the server system.

Incidentally, this program can be recorded on a recording medium.

A content distribution system and a content obtaining device according to the present invention will hereinafter be described with reference to the drawings.

Figure 1:
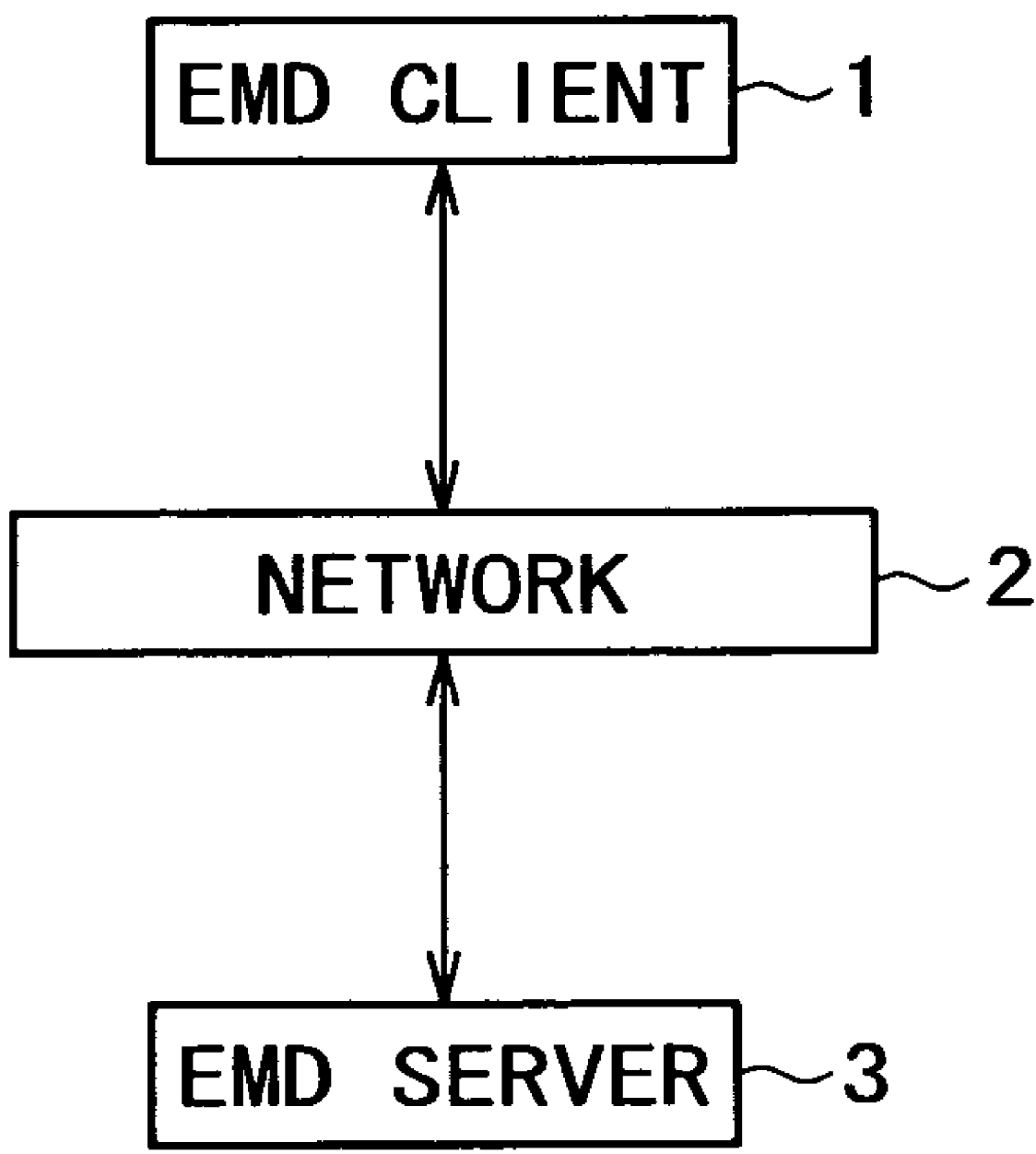
FIG. 1 is a block diagram showing an example of configuration of an EMD system (content distribution system) according to an embodiment of the present invention.
Figure 2:
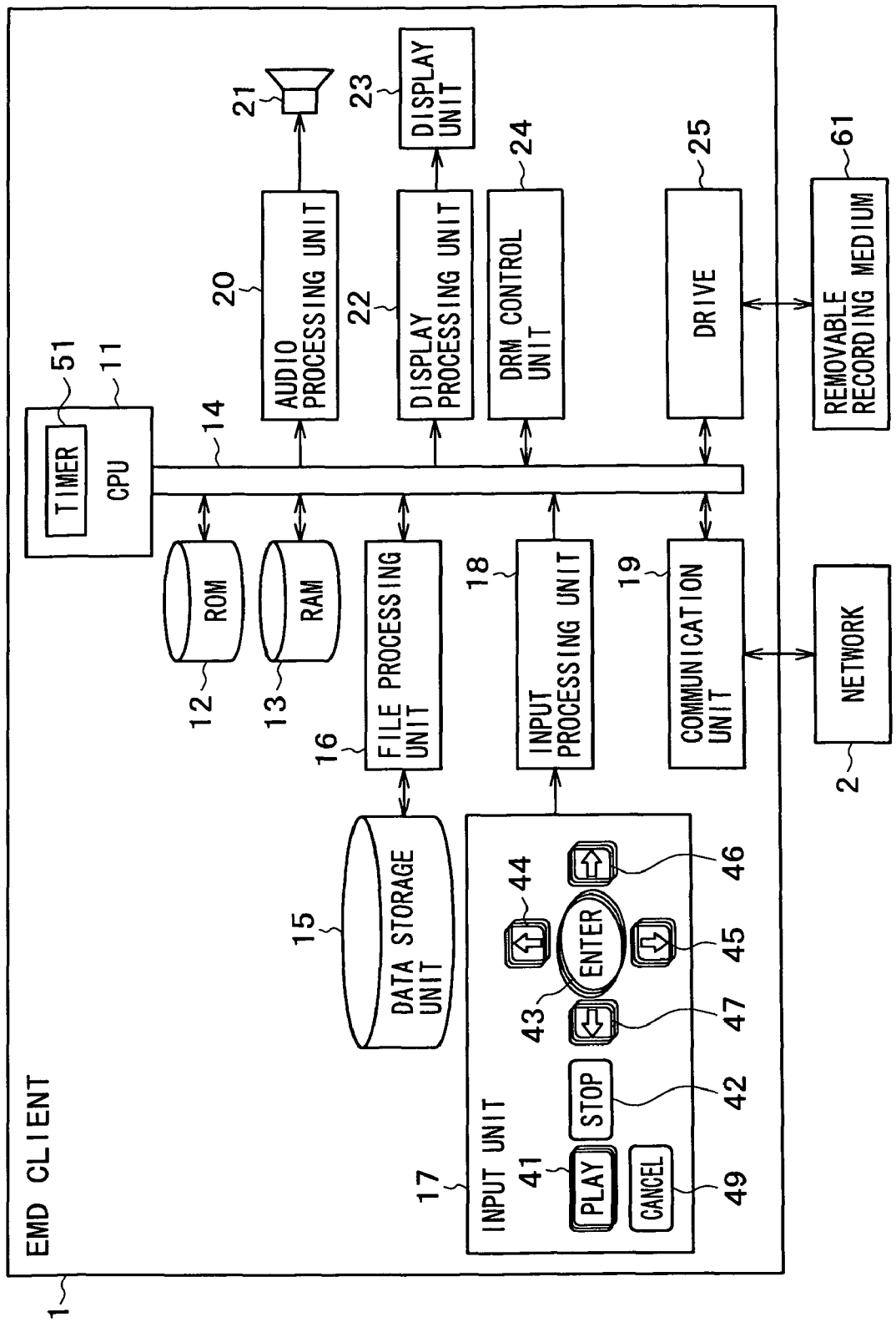
FIG. 2 is a block diagram showing an example of configuration of an EMD client in the EMD system of FIG. 1, that is, a content obtaining device according to the present embodiment.

FIG. 1 shows an example of configuration of an EMD system as a content distribution system according to the present invention.

As shown in FIG. 1, the EMD system according to the present embodiment comprises an arbitrary number of EMD clients (one EMD client 1 in the example of FIG. 1), and an arbitrary number of EMD servers (one EMD server 3 in the example of FIG. 1). The EMD client 1 and the EMD server 3 are connected to each other via a network 2.

The EMD client 1 for example comprises an audio device connectable to the network 2. Incidentally, details of the EMD client 1 will be described later with reference to FIG. 2 and FIG. 3.

Though not specifically limited in form, the network 2 in this case is the Internet.

The EMD server 3 is a Web server having the following first to seventh functions. Incidentally, the Web server refers to a server using W.W.W (World Wide Web) (a server for providing various contents (including web sites) via the Internet 2).

The first function is to store data of a list of musical pieces sold by EMD service (to be more precise, a list including musical piece information for identifying the musical pieces), and transmit the data of the list of the musical pieces to the EMD client 1 when there is a request from the EMD client 1. Incidentally, details of the data of the list of the musical pieces will be described later with reference to FIG. 13 and so on.

The second function is to store trial listening data of each of the musical pieces included in the musical piece list, and transmit the trial listening data of a requested musical piece to the EMD client 1 when there is a request from the EMD client 1. Incidentally, the trial listening data of a musical piece refers to data corresponding to audio for allowing a user to determine whether to purchase the musical piece. Specifically, suppose in this case that data corresponding to a part of a musical piece is used as the trial listening data of the musical piece, for example.

The third function is to store data of the whole (full length) of each of the musical pieces included in the musical piece list (such data will hereinafter be referred to as full data to be differentiated from trial listening data), and transmit the full data of a requested musical piece to the EMD client 1 when there is a request from the EMD client 1. Incidentally, in the EMD service, contents are musical pieces, and thus the full data of the musical pieces is so-called content data.

The fourth function is to protect a copyright or the like of each musical piece. Thus, techniques for realizing the fourth function are not specifically limited as long as the techniques enable copyrights or the like of digital contents to be managed for distribution (such techniques will hereinafter be referred to as DRM (Digital Rights Managements)), and may be any DRM. In this case, however, a DRM referred to as "OpenMG X" described in a WO02/080446 pamphlet internationally filed and internationally disclosed by the present applicant, and the like will be applied. This "OpenMG X" comprises: a "module for adding copyright management information such as a reproduction period, a number of reproductions and the like to contents and encrypting the contents at a distributing end; a "server module for distributing copyright management information on each content to users"; and a "client module for developing application software compatible with "OpenMG X."" The fourth function corresponds to the first two of the three modules. According to "OpenMG X," to use each content (musical piece in the case of the EMD service) transmitted requires a corresponding license. Thus, the fourth function also includes a function of managing a license corresponding to each musical piece.

The fifth function is to authenticate a user receiving the EMD service and the EMD client 1 used by the user.

The sixth function is to retain information on the user and the EMD client 1 when the EMD service is available to members only, or when a history of past uses or the like needs to be managed.

The seventh function is to collect charges for a musical piece from a financial institution or the like designated by a user (perform a charging process) when the user has purchased the musical piece through the EMD service. Thus, though not shown, the EMD server 3 is also connected to for example networks of credit card companies, financial institutions such as banks and the like to realize the seventh function.

It is to be noted that the first to fourth functions of the first to seventh functions described above are required of the EMD server 3, whereas the fifth to seventh functions are not required depending on the EMD service being used. For example, when it is not necessary to charge each time a musical piece is purchased, the seventh function is not required. Also, when it is not necessary to perform authentication and user management, the fifth function and the sixth function are not required.

Figure 28:
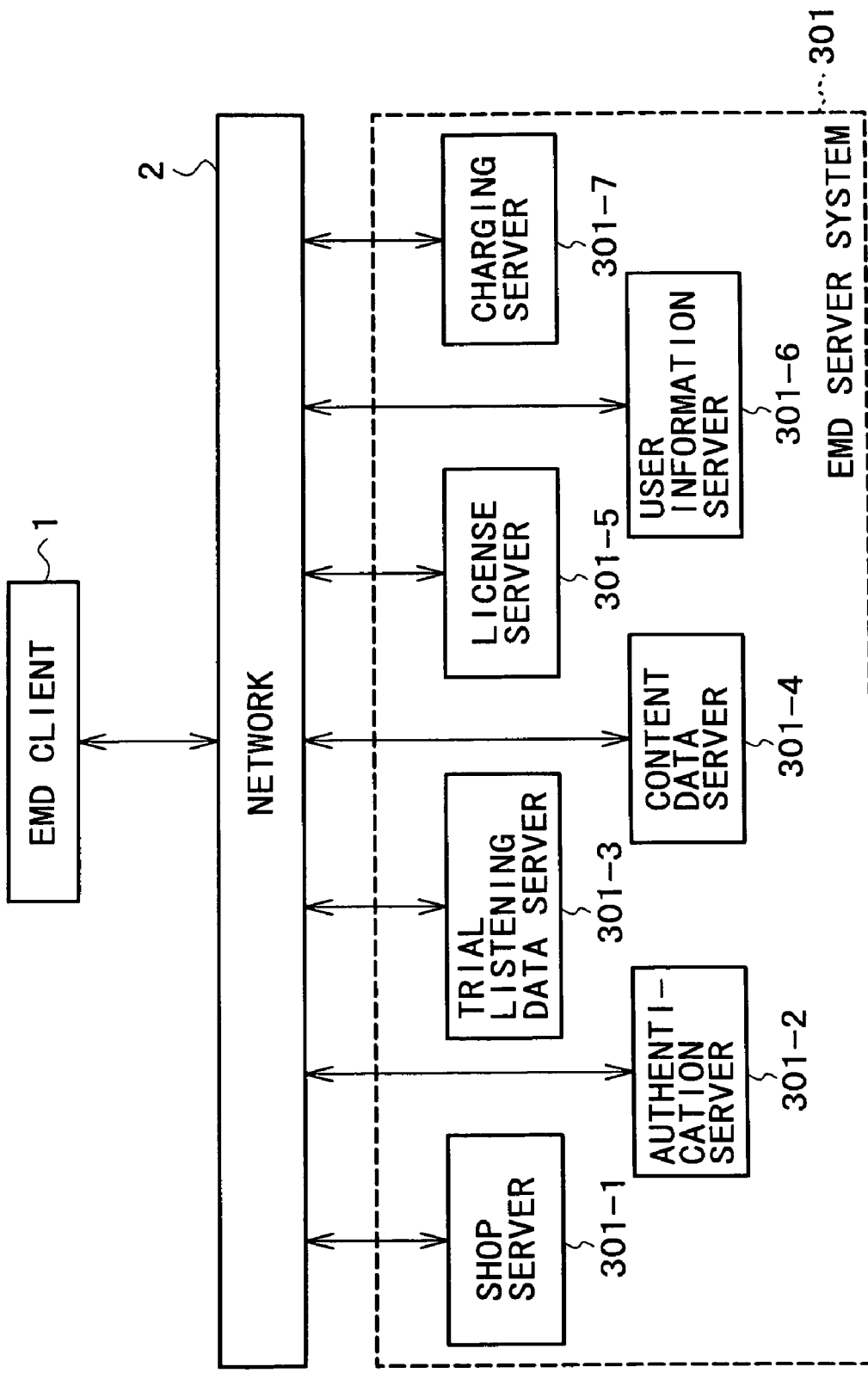
FIG. 28 is a block diagram showing another example of configuration of the EMD system (content distribution system) according to the present embodiment.

Further, while the EMD server 3 in the example of FIG. 1 is of a configuration having all of the first to seventh functions, the present invention is not limited to this configuration, and the first to seventh functions may be distributed to a plurality of servers as shown in FIG. 28 to be described later.

Details of a configuration of the EMD client 1 as the content obtaining device according to the present invention will next be described with reference to FIG. 2 and FIG. 3.

FIG. 2 is a block diagram showing a configuration of hardware within the EMD client 1.

A CPU (Central Processing Unit) 11 in the EMD client 1 of FIG. 2 performs various processing according to a program recorded in a ROM (Read Only Memory) 12 or a program loaded into a RAM (Random Access Memory) 13 from a data storage unit 15 as required. The RAM 13 also stores data necessary for the CPU 11 to perform various processing and the like as required. That is, the RAM 13 is a work area for temporarily storing data transmitted and received by the CPU 11 to and from various devices within the EMD client 1, data transmitted and received between the EMD server 3 (FIG. 1) and a communication unit 19 via a network 2, data for performing various processing, and the like.

Incidentally, the CPU 11 includes a timer 51, and can thus perform clocking operation using the timer 51.

The CPU 11, the ROM 12, and the RAM 13 are connected to each other via a bus 14. The bus 14 is also connected with a file processing unit 16, an input processing unit 18, and the communication unit 19.

The file processing unit 16 is also connected with the data storage unit 15. The data storage unit 15 comprises a hard disk or the like. The data storage unit 15 stores for example full data (content data) of a musical piece downloaded via the network 2 as a file. Thus, the file processing unit 16 writes data to the data storage unit 15 and reads data from the data storage unit 15 under control of the CPU 11.

The input processing unit 18 is also connected with an input unit 17. The input unit 17 has various keys as hardware. By pressing these keys, a user can input a predetermined instruction (signal) to the EMD client 1. The input unit 17 in the example of FIG. 2 includes: a key 41 having a word "PLAY" printed thereon (hereinafter referred to as a PLAY key 41); a key 42 having a word "STOP" printed thereon (hereinafter referred to as a STOP key 42); a key 43 having a word "ENTER" printed thereon (hereinafter referred to as an ENTER key 43); a key 44 having an arrow in an upward direction of the figure printed thereon (hereinafter referred to as an upward key 44); a key 45 having an arrow in a downward direction of the figure printed thereon (hereinafter referred to as a downward key 45); a key 46 having an arrow in a right direction of the figure printed thereon (hereinafter referred to as a right key 46); and a key 47 having an arrow in a left direction of the figure printed thereon (hereinafter referred to as a left key 47). Thus, when a predetermined one of the PLAY key 41 to the left key 47 of the input unit 17 is pressed, the input managing unit 18 detects which key is pressed, and notifies a result of the detection to the CPU 11.

The communication unit 19 performs communication with another network device (for example the EMD server 3 in FIG. 1) via the network 2 under control of the CPU 11. For example, in this case, the network 2 is the Internet, and therefore the communication unit 19 is formed by a device (communication board or the like) controlled by a protocol stack of TCP/IP (Transmission Control Protocol/Internet Protocol), HTTP (HyperText Transfer Protocol) and the like.

The bus 14 is also connected with an audio processing unit 20, a display processing unit 22, and a DRM control unit 24.

When compressed data of audio (a musical piece or the like) is supplied to the audio processing unit 20, the audio processing unit 20 decompresses the compressed audio data, converts the decompressed data (digital signal) into an analog signal having a predetermined level (a level that corresponds to sound volume and is adjusted as required), and then supplies the analog signal to a speaker 21. The speaker 21 outputs sound corresponding to the analog signal supplied from the audio processing unit 20.

The display processing unit 22 converts image data of an image showing information to be notified to the user, an operating status of the EMD client 1, or the like into a signal in a format of a display unit 23, and then supplies the signal to the display unit 23. The display unit 23 displays the image corresponding to the signal supplied thereto (the image showing the information to be notified to the user, the operating status of the EMD client 1, or the like) on a screen of the display unit 23. A point to be noted here is that the display unit 23 is provided to display information to be notified to the user, an operating status of the EMD client 1, or the like and thus size of the screen is not so large (about a few inches) as that of a PC. That is, the EMD client 1 in FIG. 2 is not suitable as a client for the conventional EMD service using CGI as described above, and therefore uses the EMD service according to the present embodiment (EMD service that does not depend on CGI) to be described later.

The DRM control unit 24 performs processing using the above-described DRM. Specifically, when the communication unit 19 receives data whose copyright or the like is protected via the network (Internet) 2, the DRM control unit 24 performs processing necessary to use (reproduce) the content (musical piece) data whose copyright or the like is protected. In this case, for example, since "OpenMG X" is applied as DRM as described above, a content whose copyright or the like is protected is distributed as encrypted content data. Accordingly, the DRM control unit 24 exchanges a corresponding encryption key (=decryption key) with the EMD server 3 safely, and decrypts the content data using the key. In addition, the DRM control unit 24 performs evaluation of content use conditions and the like.

Figure 3:
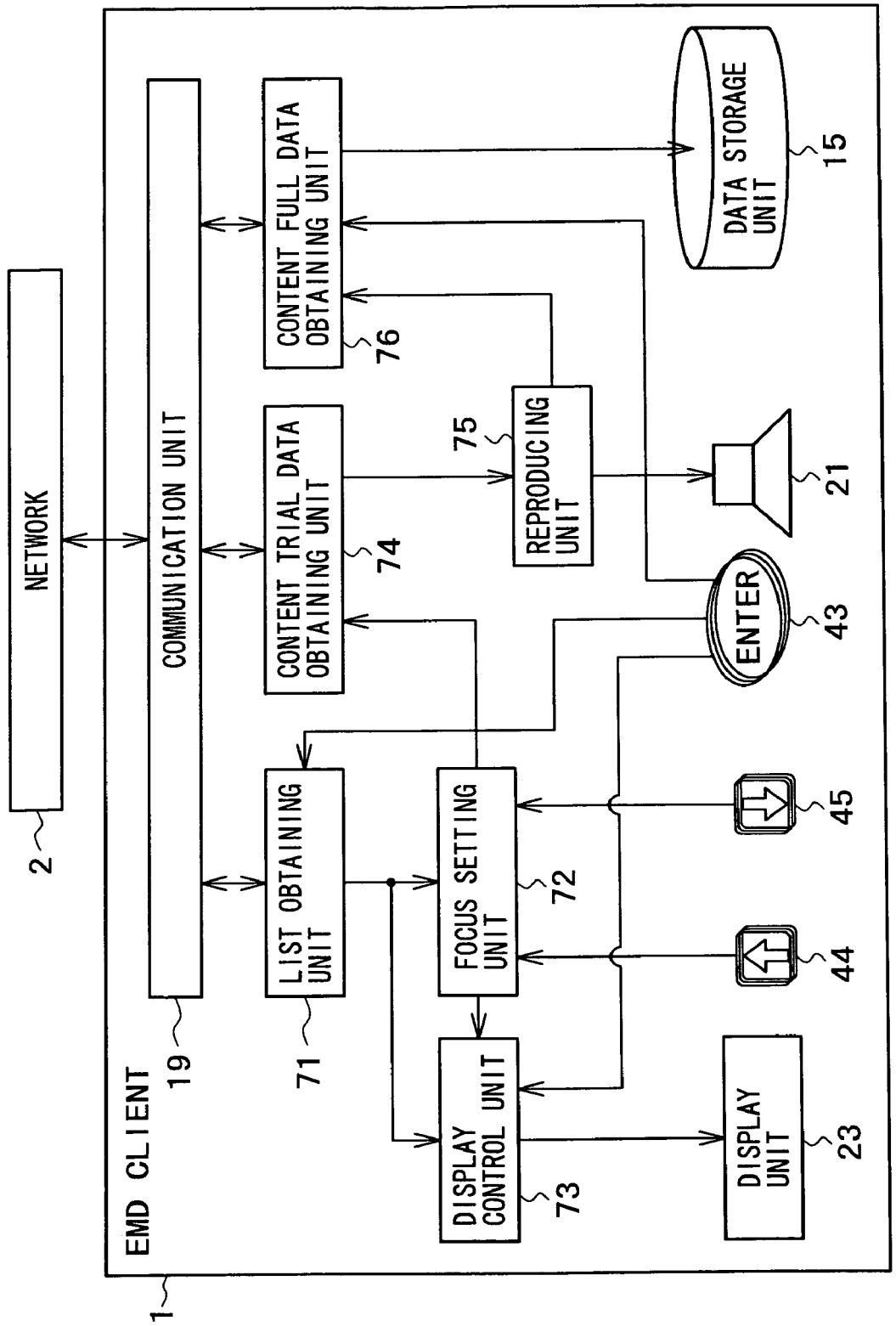
FIG. 3 is a functional block diagram of assistance in explaining a functional configuration of the EMD client of FIG. 2.

FIG. 3 shows an example of functional configuration for realizing functions up to purchase (downloading) of full data (content data) of a musical piece from the EMD server 3 among functions of the EMD client 1 in FIG. 2.

A list obtaining unit 71, a focus setting unit 72, a display control unit 73, a content trial data obtaining unit 74, a reproducing unit 75, and a content full data obtaining unit 76 in FIG. 3 are formed by software, for example. That is, the list obtaining unit 71, the focus setting unit 72, the display control unit 73, the content trial data obtaining unit 74, the reproducing unit 75, and the content full data obtaining unit 76 are for example recorded in advance in the ROM 12 in FIG. 2, and read and executed as required by the CPU 11.

The list obtaining unit 71, the focus setting unit 72, the display control unit 73, the content trial data obtaining unit 74, the reproducing unit 75, and the content full data obtaining unit 76 exchange information (data) with the various pieces of hardware shown in FIG. 2 as described above. Of these pieces of hardware, FIG. 3 shows only sources that supply the information (that is, the ENTER key 43, the upward key 44, and the downward key 45 provided to the input unit 17) and final destinations to which the information is supplied (that is, the data storage unit 15, the speaker 21, and the display unit 23). The intermediate hardware (that is, the file processing unit 16, the input processing unit 18, the audio processing unit 20, the display processing unit 22, the bus 14 and the like) is omitted. Information exchange between units of the list obtaining unit 71 to the content full data obtaining unit 76, that is, between pieces of software is performed on the RAM 13, for example.

The list obtaining unit 71 transmits first request information for requesting a list including content information for identifying each of one or more musical pieces from the communication unit 19 to the EMD server 3 (FIG. 1) via the network 2. When the list (data) is thereafter transmitted as a response to the first request information from the EMD server 3 via the network 2, the list obtaining unit 71 receives the list (data) via the communication unit 19, and then supplies the list (data) to the display control unit 73 and the focus setting unit 72.

More specifically, the EMD server 3 has a plurality of lists (data), for example. When the EMD client 1 makes a first access to the EMD server 3, the EMD server 3 transmits information for presenting the lists retained to the user to the EMD client 1 via the network 2.

Figure 4:
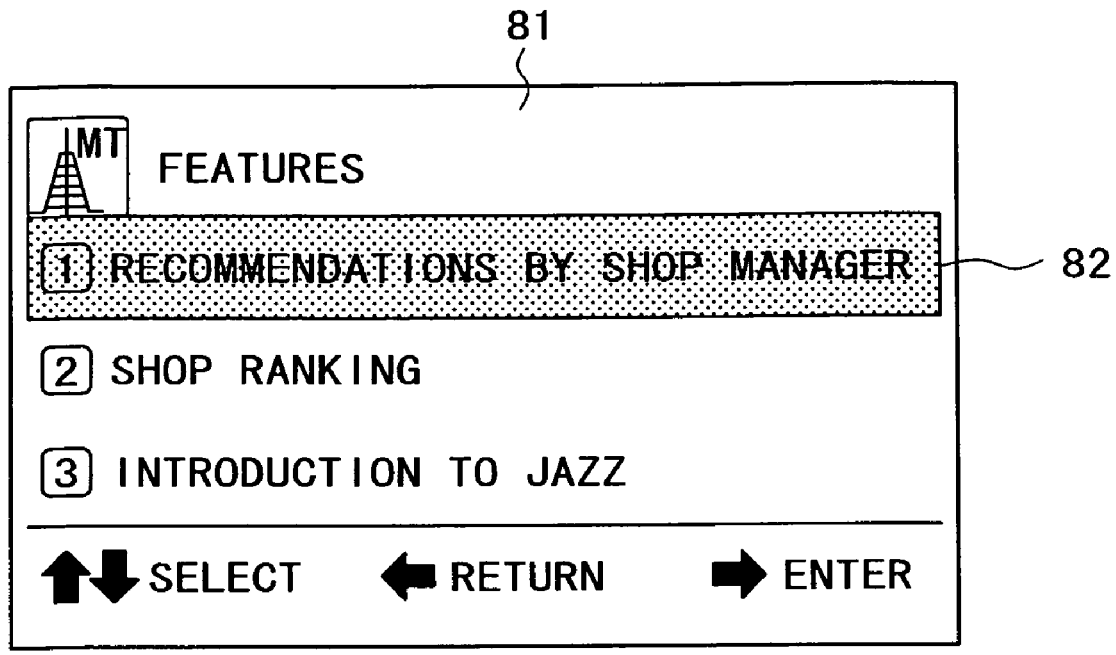
FIG. 4 is a diagram showing an example of display of a top page.

The list obtaining unit 71 obtains this information via the communication unit 19, and supplies the information to the focus setting unit 72 and the display control unit 73. Then, the display control unit 73 displays an image 81 as shown in FIG. 4, for example, on the display unit 23.

The image to be displayed first when the EMD client 1 accesses the EMD server 3 will hereinafter be referred to as a top page. Also, data for displaying the top page will be referred to as top page information. In this case, since the EMD server 3 is a Web server, as described above, the top page information is for example a data file (hereinafter referred to as an HTML document) of a home page described in an HTML format, for example.

The top page information includes an operating guide as well as titles of the lists to be displayed on the screen of the EMD client 1, locations (for example URL (Uniform Resource Locator) addresses) where data of the lists is present, and the like as information for identifying the lists retained by the EMD server 3.

Thus, in this case, the information (HTML document) of the top page 81 is supplied to the display control unit 73. The display control unit 73 interprets this HTML document, and then displays the top page 81 as shown in FIG. 4 on the display unit 23.

Figure 11:
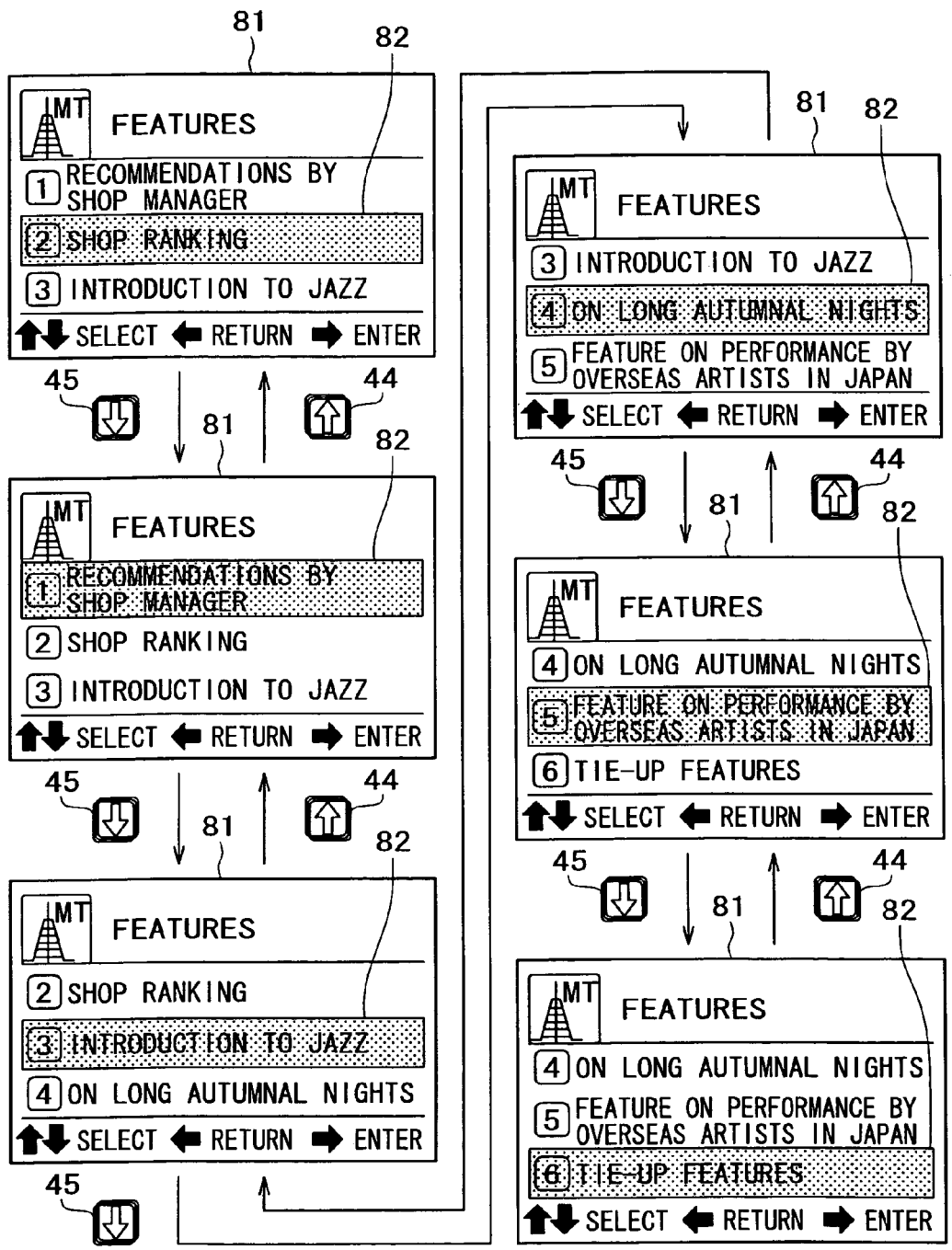
FIG. 11 is a diagram of assistance in explaining an example of operation for effecting a transition in top page display.

By viewing the top page 81 displayed on the display unit 23, the user can recognize that data of three lists having respective titles of "RECOMMENDATIONS BY SHOP MANAGER," "SHOP RANKING," AND "INTRODUCTION TO JAZZ" is retained in the EMD server 3 (incidentally, six lists are retained in actuality as shown in FIG. 11 to be described later). Accordingly, the user obtains a desired list from among the three lists (makes the EMD client 1 obtain the data).

Specifically, for example, as later described, the focus setting unit 72 sets a focus on a list specified by the user from among the three lists (however, the focus setting unit 72 sets the focus on a list selected by the focus setting unit 72 itself in a case of initial setting). When the user presses the ENTER key 43, the list obtaining unit 71 makes a request to the EMD server 3 for the list on which the focus is set at that time. It can also be said that since the focus setting unit 72 sets the specified one of the three lists as a list of interest to be processed (hereinafter referred to as a list of interest), the list obtaining unit 71 makes a request to the EMD server 3 for the list of interest at the time when the user presses the ENTER key 43.

At this time, the display control unit 73 displays the title of the list (list of interest) on which the focus is set in the top page 81 in a different display form on the display unit 23. For example, when the focus is set on the list under the title of "RECOMMENDATIONS BY SHOP MANAGER" (when that list is set as a list of interest), the display control unit 73 displays "RECOMMENDATIONS BY SHOP MANAGER" in inverse video 82 (hereinafter referred to as a cursor 82) as shown in FIG. 4 on the display unit 23.

When the user presses the ENTER key 43 in a state in which the top page 81 is displayed on the display unit 23 as shown in FIG. 4, for example, the list obtaining unit 71 transmits first request information for requesting the list "RECOMMENDATIONS BY SHOP MANAGER" from the communication unit 19 to the EMD server 3 (FIG. 1) via the network 2. Then, when the EMD client 1 is authenticated, the data of the list "RECOMMENDATIONS BY SHOP MANAGER" is transmitted as a response to the first request information from the EMD server 3 via the network 2. The list obtaining unit 71 obtains the data of the list via the communication unit 19, and then supplies the data of the list to the display control unit 73 and the focus setting unit 72.

Then, the display control unit 73 displays an image 91 as shown in FIG. 5, for example, on the display unit 23. Incidentally, in this case, the data of the list is an HTML document as in the case of the top page information. Specifically, in this case, an HTML document 221 in FIG. 13 to be described later, for example, is supplied to the display control unit 73. Thus, the display control unit 73 interprets this HTML document 221, and then displays the image 91 as shown in FIG. 5.

In the image 91, a title of a musical piece (shown on a right side of a note symbol in FIG. 5) and a name of a player, a singer or the like (artist) of the musical piece (shown on a right side of a symbol of an upper half of a human body in FIG. 5) are arranged for each musical piece as musical piece information corresponding to each musical piece (arranged in order from the top). For example, a title "49 DANCE" and an artist "DC U . . . " are shown as musical piece information at a position of a cursor 92. That is, it can also be said that the cursor 92 indicates a musical piece with the title "49 DANCE" among musical pieces of the artist "DC U . . . "

Incidentally, an image as a list of musical piece information such as the image 91 in FIG. 5 can be said to be an image for presenting musical pieces that can be sold (distributed) by the EMD server 3, and will therefore be referred to hereinafter as a musical piece presenting page.

As described above, since the information of the musical piece presenting page 91 (that is, the HTML document 221 in FIG. 13 to be described later) is also supplied to the focus setting unit 72, the focus setting unit 72 sets a focus on the musical piece identified by the specified one (musical piece information of "49 DANCE" and "DC U . . . " in the example of FIG. 5) of one or more pieces of musical piece information included in the information of the musical piece presenting page 91 as in the case of the top page 82. In other words, the focus setting unit 72 sets the specified one of the one or more pieces of musical piece information included in the information of the musical piece presenting page 91 as a musical piece of interest to be processed (hereinafter referred to as a musical piece of interest).

Thus, in this case, the musical piece (content) on which the focus is set and the musical piece of interest (content of interest) can be said to be words synonymous with each other, and the words will hereinafter be unified into the words "musical piece of interest."

As in the case of the top page 82, the display control unit 73 displays the musical piece information corresponding to the musical piece of interest in the musical piece presenting page 91 in a different display form (a display form in which the cursor 92 is disposed on the musical piece information) on the display unit 23. For example, when the musical piece with the title "49 DANCE" among musical pieces of the artist "DC U . . . " is set as a musical piece of interest, the display control unit 73 displays the musical piece presenting page 91 in which the cursor 92 is disposed on "49 DANCE" and "DC U . . . " as shown in FIG. 5 on the display unit 23.

When the focus setting unit 72 thus sets the specified musical piece as the musical piece of interest, the focus setting unit 72 notifies this to the content trial data obtaining unit 74. Then, the content trial data obtaining unit 74 automatically transmits second request information for requesting trial listening data of the notified content of interest from the communication unit 19 to the EMD server 3 (FIG. 1) via the network 2. Thereafter the trial listening data of the musical piece of interest is transmitted as a response to the second request information from the EMD server 3 via the network 2. The content trial data obtaining unit 74 receives the trial data via the communication unit 19, and then supplies the trial data to the reproducing unit 75.

The reproducing unit 75 automatically reproduces the musical piece of interest (a part of the musical piece of interest) corresponding to the trial data supplied thereto from a speaker 21. In this case, since the musical piece of interest is the musical piece with the title "49 DANCE" among the musical pieces of the artist "DC U . . . " as shown in FIG. 5, the musical piece (a part of the musical piece) is reproduced from the speaker 21 as shown in a topmost figure in FIG. 6.

Incidentally, an automatic process among processes performed by a predetermined device (or a component of the device) refers to a process performed on a judgment of the device (or a component thereof) itself without manual operation of a user.

A form of second request information for requesting the trial data of a musical piece of interest is not specifically limited. In this case, however, as described above, the information of the musical piece presenting page for example includes a location where trial data of each musical piece is present (for example a URL address interposed between SAMPLEDATA tags (<SAMPLEDATA> and </SAMPLE-DATA>) in a ninth line in the HTML document 221 in FIG. 13) as one piece of musical piece information. A path is set such that when the EMD client 1 requests access to the location specified by the URL address, the trial data is downloaded from the location. Thus, the second request information in this case is an access request used when the EMD client 1 accesses the location where the corresponding trial data is present.

As shown in FIG. 6, the user can change the musical piece of interest by pressing the upward key 44 or the downward key 45. Specifically, when the upward key 44 or the downward key 45 is pressed, the focus setting unit 72 selects the specified musical piece from among the musical pieces identified by the respective pieces of musical piece information included in the information of the musical piece presenting page 91, and sets the newly selected musical piece as a musical piece of interest. Thus, when the upward key 44 or the downward key 45 is pressed, the focus setting unit 72 updates the musical piece of interest.

Specifically, when the downward key 45 is pressed in a state where a musical piece presenting page 91 in the topmost figure in FIG. 6 is displayed on the display unit 23, for example, the focus setting unit 72 sets, as the musical piece of interest, a musical piece identified by musical piece information ("BIG CHOP" and "ZAKU") immediately succeeding (in order of the list) the musical piece information ("49 DANCE" and "DC U . . . ") corresponding to the musical piece of interest up to this time among the pieces of musical piece information included in the information of the musical piece presenting page 91, and then supplies this information (indicating that the musical piece of interest is updated) to the content trial data obtaining unit 74 and the display control unit 73.

Then, the display control unit 73, the content trial data obtaining unit 74, and the reproducing unit 75 each repeat the series of processes described above automatically. Thus, a musical piece presenting page 91 in a second figure from the top of FIG. 6 (a musical piece presenting page 91 in which the cursor 92 is disposed on "BIG CHOP" and "ZAKU") is automatically displayed on the display unit 23, and the musical piece (a part of the musical piece) with the title "BIG CHOP" among musical pieces of the artist "ZAKU" is automatically reproduced from the speaker 21.

Similarly, when the downward key 45 is pressed in a state where the musical piece presenting page 91 in the second figure from the top of FIG. 6 is displayed on the display unit 23, for example, the focus setting unit 72 sets, as the musical piece of interest, a musical piece identified by musical piece information ("DOWN TUNE" and "MIKAN") immediately succeeding (in order of the list) the musical piece information ("BIG CHOP" and "ZAKU") corresponding to the musical piece of interest up to this time among pieces of musical piece information included in the information of the musical piece presenting page 91, and then supplies this information (indicating that the musical piece of interest is updated) to the content trial data obtaining unit 74 and the display control unit 73.

Then, the display control unit 73, the content trial data obtaining unit 74, and the reproducing unit 75 each repeat the series of processes described above automatically. Thus, a musical piece presenting page 91 in a bottommost figure in FIG. 6 (a musical piece presenting page 91 in which the cursor 92 is disposed on "DOWN TUNE" and "MIKAN") is automatically displayed on the display unit 23, and the musical piece (a part of the musical piece) with the title "DOWN TUNE" among musical pieces of the artist "MIKAN" is automatically reproduced from the speaker 21.

As shown in FIG. 6, the display unit 23 in this example can display only musical piece information corresponding to three musical pieces (that is, only three lines) because of a limitation of screen size of the display unit 23. Accordingly, the position of the musical piece information "DOWN TUNE" and "MIKAN" in the musical piece presenting page 91 in the bottommost figure in FIG. 6 is moved up by one line with respect to the position of the musical piece information "DOWN TUNE" and "MIKAN" in the musical piece presenting page 91 in the second figure in FIG. 6. The musical piece presenting page 91 in the bottommost figure in FIG. 6 consequently includes new musical piece information ("GREEN SLEEVS") immediately succeeding (in order of the list) the musical piece information "DOWN TUNE" and "MIKAN." Thus, by repeating the operation of pressing the downward key 45, the user can scroll down display of the musical piece presenting page 91 while updating the musical piece of interest.

On the other hand, when the upward key 44 is pressed in a state where the musical piece presenting page 91 in the bottommost figure in FIG. 6 is displayed on the display unit 23, for example, the focus setting unit 72 sets, as the musical piece of interest, the musical piece identified by the musical piece information ("BIG CHOP" and "ZAKU") immediately preceding (in order of the list) the musical piece information ("DOWN TUNE" and "MIKAN") corresponding to the musical piece of interest up to this time among the pieces of musical piece information included in the information of the musical piece presenting page 91, and then supplies this information (indicating that the musical piece of interest is updated) to the content trial data obtaining unit 74 and the display control unit 73.

Then, the display control unit 73, the content trial data obtaining unit 74, and the reproducing unit 75 each repeat the series of processes described above automatically. Thus, the musical piece presenting page 91 in the second figure from the top of FIG. 6 (the musical piece presenting page 91 in which the cursor 92 is disposed on "BIG CHOP" and "ZAKU") is automatically displayed on the display unit 23, and the musical piece (a part of the musical piece) with the title "BIG CHOP" among musical pieces of the artist "ZAKU" is automatically reproduced again from the speaker 21.

At this time, the position of the musical piece information "DOWN TUNE" and "MIKAN" in the musical piece presenting page 91 in the second figure from the top of FIG. 6 is moved down by one line with respect to the position of the musical piece information "DOWN TUNE" and "MIKAN" in the musical piece presenting page 91 in the bottommost figure in FIG. 6. Consequently the musical piece information ("GREEN SLEEVS") immediately succeeding (in order of the list) the musical piece information "DOWN TUNE" and "MIKAN" is erased. Thus, by repeating the operation of pressing the upward key 44, the user can scroll up display of the musical piece presenting page 91 while updating the musical piece of interest.

Thus, since the EMD client 1 has the list obtaining unit 71, the focus setting unit 72, and the content trial data obtaining unit 74, the EMD client 1 can automatically make a request to the EMD server 3 for downloading trial listening data of a musical piece of interest without an operation of the user (for example an operation of pressing a software button using a pointing device as in the conventional operation), and consequently start trial listening reproduction (reproduction of the trial listening data) automatically.

That is, as described above, when purchasing a musical piece using EMD service, the user is conventionally required to perform an operation for starting trial listening (for example an operation of pressing a software button using a pointing device) after selecting a desired musical piece from a list of musical pieces (musical piece information of the musical pieces) displayed on the screen of the EMD client in order to determine which musical piece to purchase.

On the other hand, when purchasing a musical piece (a purchasing operation and the like will be described later) using the EMD service according to the present embodiment (that is, service in which the musical piece is purchased from the above-described EMD server 3 using the above-described EMD client 1), the user does not need to perform a manual operation for starting trial listening (the conventional operation). That is, when the user listens to a sample of a musical piece automatically reproduced by the EMD client 1 and likes the musical piece, the user needs only to perform a process for purchasing (downloading) the musical piece (this process will be described later). When the user does not like the musical piece, the user needs only to perform an operation for selecting another musical piece (that is, the above-described operation of pressing the upward key 44 or the downward key 45).

A point to be noted here is that while description above has been made with reference to the images displayed on the display unit 23 of the EMD client 1 for simplicity of the description, the user does not need to look carefully at the screen of the display unit 23 in actual operation. Hence, even if the EMD client 1 is not provided with the display unit 23, the user can receive EMD service (the EMD service according to the present embodiment) using the EMD client 1.

In other words, the conventional EMD service requires, as essential components of an EMD client, a display unit having a large screen that allows comfortable GUI operation and a pointing device (a mouse or the like) for pointing to an arbitrary position on the screen. On the other hand, the EMD service according to the present embodiment totally eliminates the need for a display unit having such a large screen and a pointing device as components of the EMD client 1.

That is, a target to which to provide the conventional EMD service (EMD client) is a PC or the like having a large display unit and a pointing device. On the other hand, the EMD service according to the present embodiment can extend a range of its targets to not only such PCs but also EMD clients 1 (for example audio devices and the like) having a small display unit (or having no display unit) and having no pointing device.

Thus, by using the EMD service according to the present embodiment, that is, by using the above-described EMD client 1 according to the present embodiment, the user does not need to rely on screen display as in the conventional EMD service (that is, the user needs only to rely on sound) when performing operation to receive the EMD service. Therefore another effect can be obtained in that the user can concentrate on listening to music.

When the user likes a given musical piece after listening to samples of various musical pieces while pressing the upward key 44 or the downward key 45 as described above, the user needs to perform an operation for purchasing (downloading) the musical piece. FIG. 7 illustrates an example of an outline of this operation. Thus an outline of this operation will be described with reference to FIG. 7.

Suppose that as shown in a musical piece presenting page 91 in a topmost figure in FIG. 7, for example, a musical piece identified by "POWER DRIVE" (having such a title) on which a cursor 92 is disposed is set as a musical piece of interest and that trial listening reproduction of the musical piece of interest (reproduction of a part corresponding to trial listening data) is being performed.

In this case, when the user decides to purchase the musical piece of interest and presses the ENTER key 43 as shown in FIG. 7, an image 93 that prompts the user to make purchase confirmation (hereinafter referred to as a purchase confirmation image 93) as shown below the musical piece presenting page 91 in the topmost figure in FIG. 7 can be displayed on the display unit 23.

When the user presses the ENTER key 43 again in this state (a state in which the purchase confirmation image 93 is displayed) as shown in FIG. 7, the user can purchase the musical piece of interest (download the musical piece of interest to the EMD client 1). Incidentally, at this time, an image 95 indicating that the musical piece of interest is being downloaded (hereinafter referred to as a downloading image 95) as shown below the purchase confirmation image 93 in FIG. 7 is displayed on the display unit 23.

Specifically, when the content full data obtaining unit 76 in FIG. 3 detects that the ENTER key 43 has been pressed twice, the content full data obtaining unit 76 determines that an instruction to obtain the musical piece of interest (the musical piece with the title "POWER DRIVE" in this case) is issued from the user, and then transmits third request information for requesting full data of the musical piece of interest from the communication unit 19 to the EMD server 3 (FIG. 1) via the network 2. Thereafter the full data of the musical piece of interest is transmitted as a response to the third request information from the EMD server 3. Then, the content full data obtaining unit 76 obtains the full data of the musical piece of interest via the communication unit 19, and stores the full data of the musical piece of interest in the data storage unit 15.

It is to be noted that a form of third request information for requesting the full data of a musical piece of interest is not specifically limited. In this case, however, as described above, the information of the musical piece presenting page for example includes a location where full data of each musical piece is present (for example a URL address interposed between CONTENTDATA tags (<CONTENTDATA> and </CONTENTDATA>) in a twelfth line in the HTML document 221 in FIG. 13) as one piece of musical piece information. A path is set such that when the EMD client 1 requests access to the location specified by the URL address, the full data is downloaded from the location. Thus, the third request information in this case is an access request used when the EMD client 1 accesses the location where the corresponding full data is present.

At this time, as shown in FIG. 7 described above, the display control unit 73 displays the purchase confirmation image 93 on the display unit 23 when the ENTER key 43 is pressed once, and displays the downloading image 95 on the display unit 23 when the ENTER key 43 is pressed once again. When the downloading of the full data of the content of interest is thereafter completed (when in practice, all of a process for obtaining a license corresponding to the content of interest, and the like are also completed, as described above), the display control unit 73 displays an image 96 indicating the completion of the download (hereinafter referred to as a download completion image 96) as shown in a bottommost figure in FIG. 7 on the display unit 23.

A point to be noted here is that as in operation for trial listening reproduction of a musical piece of interest (operation for having trial listening data obtained and reproduced automatically), the user can purchase (download) a musical piece of interest by simply pressing the ENTER key 43. That is, while description above has been made with reference to the images displayed on the display unit 23 of the EMD client 1 for simplicity of the description, the user does not need to look carefully at the screen of the display unit 23 in actual downloading operation. Hence, even if the EMD client 1 is not provided with the display unit 23, by simply pressing the ENTER key 43, the upward key 44, or the downward key 45, the user can receive EMD service (the EMD service according to the present embodiment) using the EMD client 1.

Incidentally, when the ENTER key 43 is pressed after the completion of the download, the musical piece presenting page 91 is displayed again as shown in FIG. 7, and the musical piece set as a musical piece of interest at this time (the musical piece with the title "POWER DRIVE" on which the cursor 92 is disposed in the example of FIG. 7) is automatically reproduced again for trial listening. That is, the user can thereafter purchase (download) another musical piece by repeating the series of operations described above.

When the user does not intend to purchase the content of interest even in a state in which the purchase confirmation image 93 is displayed, the user can restore the original state (that is, have the musical piece presenting page 91 displayed again and have the musical piece set as a musical piece of interest at this time (the musical piece with the title "POWER DRIVE" on which the cursor 92 is disposed in the example of FIG. 7) automatically reproduced again for trial listening), by disposing (moving) a cursor 94 to a character string of "RETURN" by pressing the downward key 45, and further pressing the ENTER key 43.

Further, when the user intends to purchase the content of interest even in a state in which the cursor 94 is disposed on the character string of "RETURN" in the purchase confirmation image 93, the user can resume the operation for purchasing (downloading) the musical piece of interest by disposing (moving) the cursor 94 to a character string of "PURCHASE (300 YEN)" by pressing the upward key 44, and further pressing the ENTER key 43.

Since the present embodiment has an object of realizing downloading operation that does not rely on GUI operation, it is desirable that while the full data of the musical piece of interest is being downloaded, sound (music or a message) notifying the user that the full data of the musical piece of interest is being downloaded be outputted from the speaker 21. It is also desirable that when the download is completed, sound (music or a message) notifying the user that the download is completed be outputted from the speaker 21. Thereby the user can easily and surely recognize that the full data of the musical piece of interest is being downloaded or that the download is completed without looking carefully at the display unit 23.

Details of the configuration and an outline of the processes (operations) of the EMD client 1 in the EMD system in FIG. 1 have been described above with reference to FIGS. 2 to 7. Incidentally, details of the processes of the EMD client 1 will be described later with reference to flowcharts of FIG. 9 and subsequent figures.

Figure 8:
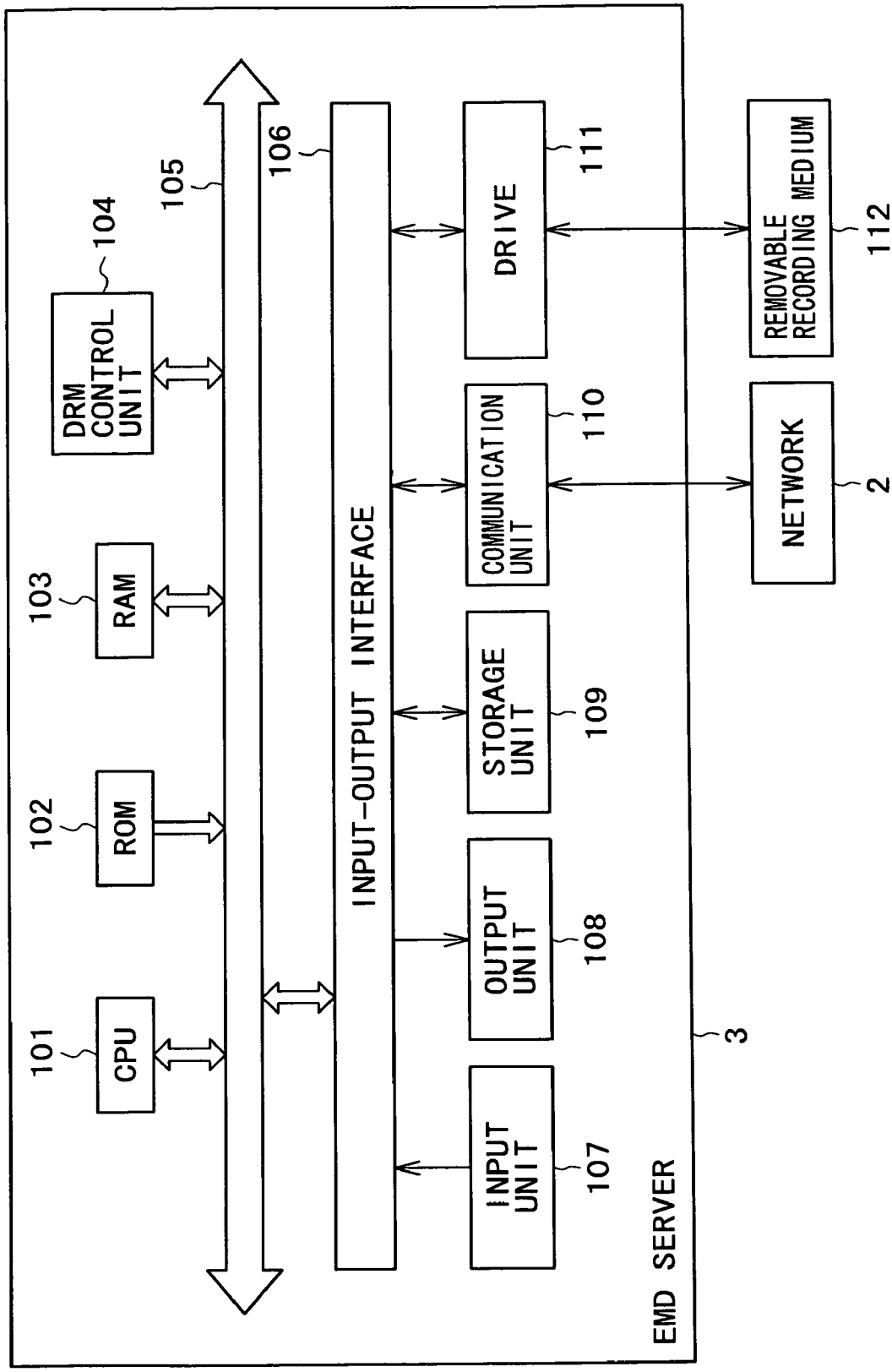
FIG. 8 is a block diagram showing an example of configuration of an EMD server in the EMD system of FIG. 1.

A configuration of the EMD server 3 in the EMD system in FIG. 1 will next be described with reference to FIG. 8. FIG. 8 shows an example of configuration of the EMD server 3.

A CPU 101 in FIG. 8 performs various processing according to a program stored in a ROM 102 or a program loaded into a RAM 103 from a storage unit 109. The RAM 103 also stores data necessary for the CPU 101 to perform various processing and the like as required.

A DRM control unit 104 performs processing using the above-described DRM. In this case, for example, since "OpenMG X" is applied as DRM as described above and therefore content data whose copyright or the like is protected needs to be encrypted, the DRM control unit 104 encrypts the content data. Also, the DRM control unit 104 decrypts encrypted content data as required, and encodes content data by an ATRAC (Adaptive Transform Acoustic Coding) 3 system or the like as required.

The CPU 101, the ROM 102, the RAM 103, and the DRM control unit 104 are connected to each other via a bus 105. The bus 105 is also connected with an input-output interface 106.

The input-output interface 106 is connected with an input unit 107 comprising a keyboard, a mouse and the like, an output unit 108 comprising a display, a speaker and the like, a storage unit 109 comprising a hard disk or the like, and a communication unit 110 comprising a modem, a terminal adapter or the like. The communication unit 110 performs communication processing via the network (Internet) 2. The communication unit 110 also performs communication processing of analog signals or digital signals with a client or the like (for example the EMD client 1 in FIG. 1).

When necessary, the input-output interface 106 is also connected with a drive 111, into which a removable recording medium 112 comprising a magnetic disk, an optical disk, a magneto-optical disk, a semiconductor memory or the like is inserted as required. A computer program read from the removable recording medium 112 is installed in the storage unit 109 as required.

Figure 9:
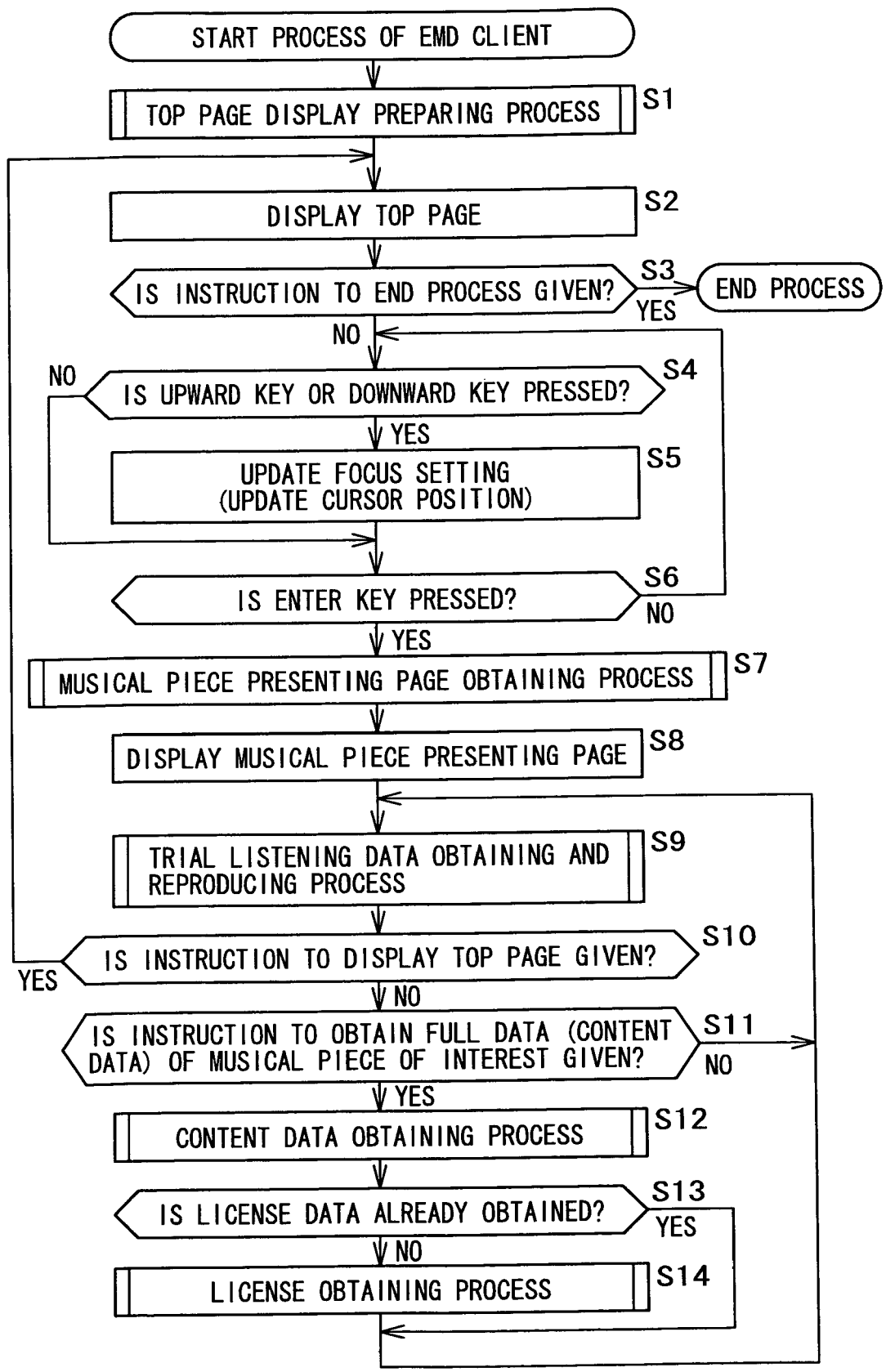
FIG. 9 is a flowchart of assistance in explaining an example of a process of the EMD client side in the EMD system of FIG. 1.
Figure 18:
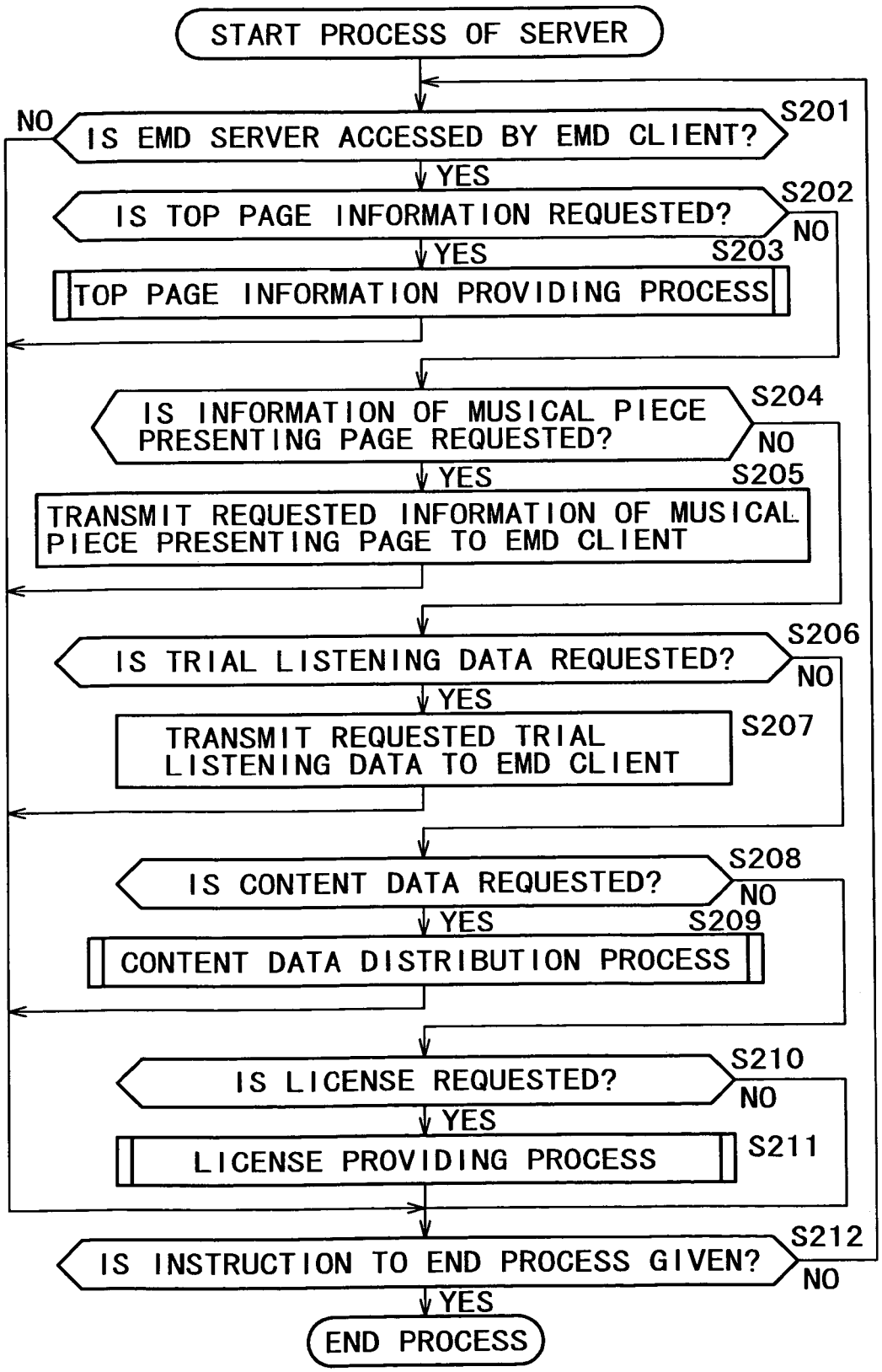
FIG. 18 is a flowchart of assistance in explaining an example of a process of the EMD server side in the EMD system of FIG. 1.
Figure 24:
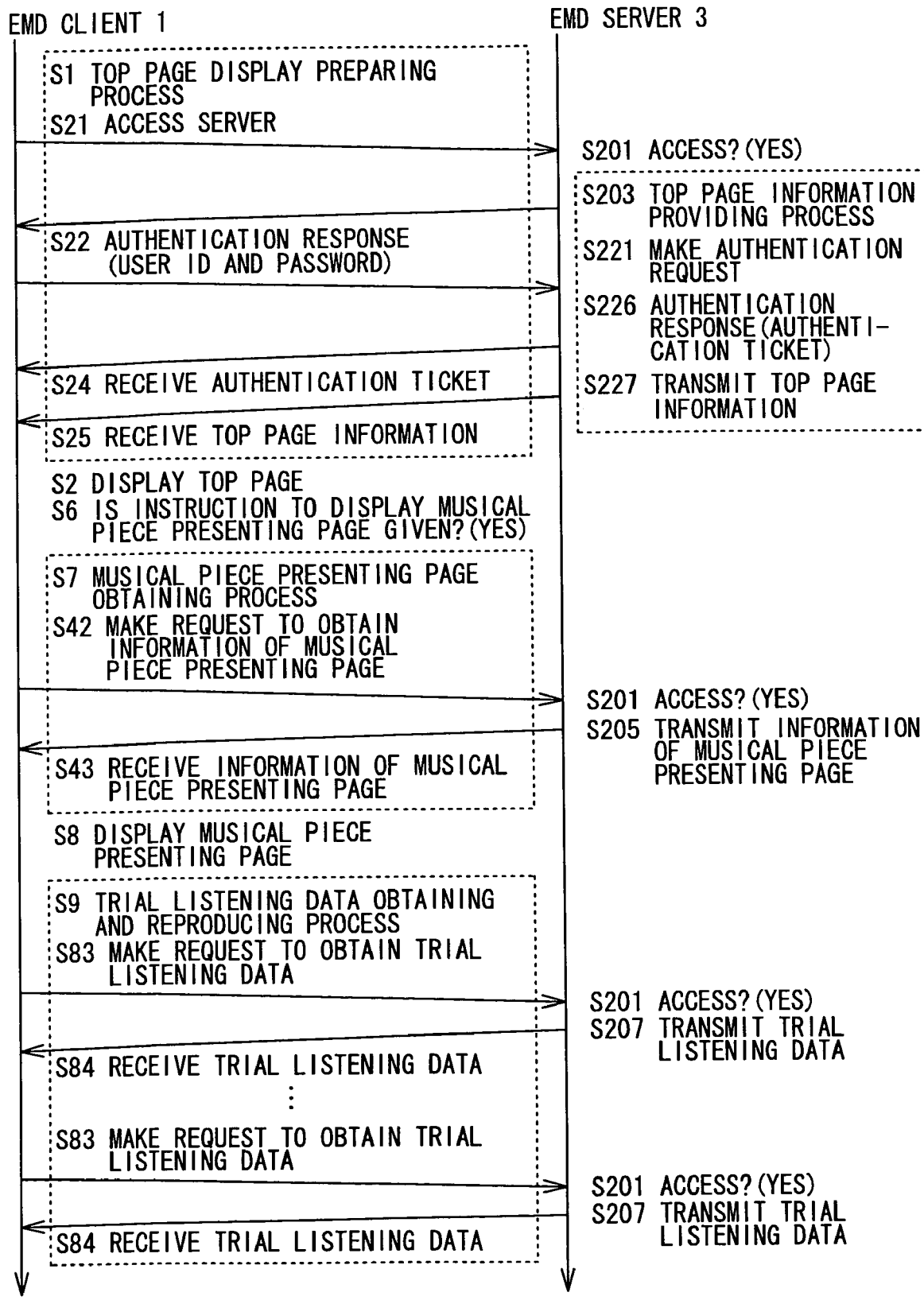
FIG. 24 is an arrow chart of process relations between the EMD client and the EMD server in FIG. 1.
Figure 25:
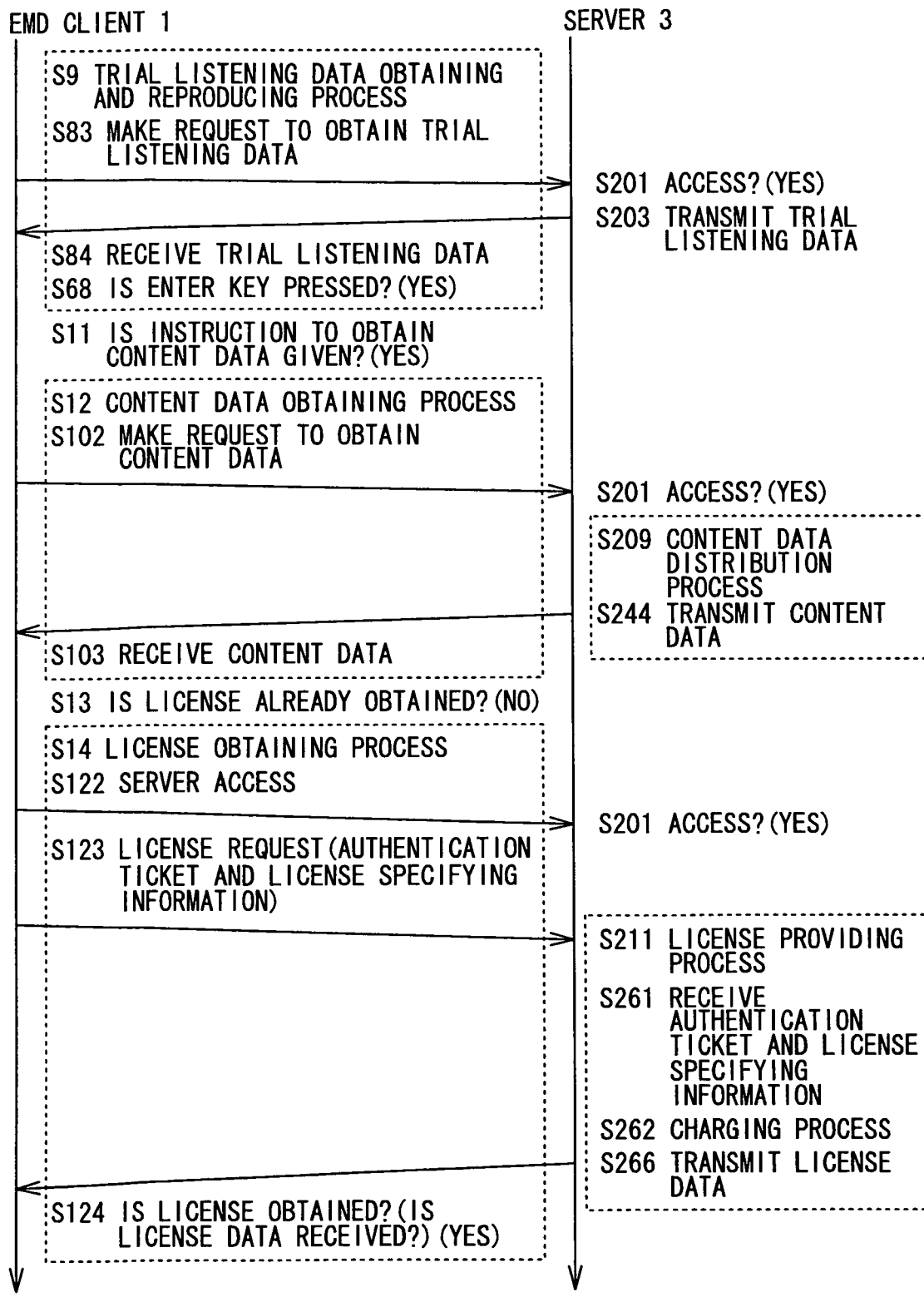
FIG. 25 is an arrow chart of process relations between the EMD client and the EMD server in FIG. 1.

Processes of the EMD service in the content distribution system (EMD system) in FIG. 1 according to the present embodiment will next be described with reference to flowcharts of FIG. 9 and FIG. 18 and arrow charts of FIG. 24 and FIG. 25. The flowchart of FIG. 9 represents an example of a process on the EMD client 1 side. FIG. 18 represents an example of a process on the EMD server 3 side. FIG. 24 and FIG. 25 show relations in processes between the EMD client 1 and the EMD server 3.

The respective processes of the EMD client 1 and the EMD server 3 will hereinafter be described individually in that order with reference to FIG. 9 and FIG. 18. Mutual relations in the processes between these devices can be readily understood by reference to corresponding steps in FIG. 24 or FIG. 25.

First, in step S1 in FIG. 9, the EMD client 1 accesses the EMD server 3 to obtain the information of the top page 81 in FIG. 4 as described above. Then, in step S2, the EMD client 1 displays the top page 81 on the display unit 23 included in the EMD client 1 on the basis of the obtained information.

Thus, the process in step S1 can also be said to be a pre-process for display of the top page 81, and therefore the process in step S1 will hereinafter be referred to as a "top page display preparing process." Details of the "top page display preparing process" are shown in a flowchart of FIG. 10. The details of the "top page display preparing process" will now be described in the following with reference to the flowchart of FIG. 10.

Incidentally, suppose in this case that the "top page display preparing process" is performed by the list obtaining unit 71 in FIG. 3 (that the "top page display preparing process" is one of functions of the list obtaining unit 71).

For example, when power (not shown) to the EMD client 1 is turned on, the CPU 11 starts each of the list obtaining unit 71 to the content full data obtaining unit 76.

Then, in step S21, the list obtaining unit 71 accesses the EMD server 3 via the communication unit 19 and the network 2. That is, the list obtaining unit 71 instructs the communication unit 19 to be connected to the EMD server 3.

Incidentally, suppose in this case that the EMD service is available to members only. In this case, since the user needs to be authenticated, the EMD server 3 makes an authentication request to the EMD client 1 (step S221 in FIG. 19 and FIG. 24 to be described later).

Then, in step S22, the list obtaining unit 71 responds to the authentication request from the EMD server 3. That is, the list obtaining unit 71 transmits a user ID and a password to the EMD server 3 via the communication unit 19 and the network 2.

When receiving the user ID and the password, the EMD server 3 authenticates the EMD client 1 (steps S222 and S223 in FIG. 19 to be described later).

When the EMD server determines that the user using the EMD client 1 is not a valid user or that the EMD client 1 is not a valid client, the EMD server transmits predetermined error information to the EMD client 1 via the network 2 (steps S224 (NO) and S225 in FIG. 19 to be described later).

When the list obtaining unit 71 receives this error information via the communication unit 19, the list obtaining unit 71 determines in step S23 that an authentication ticket is not transmitted, and returns the process to step S21 to repeat the process from step S21 on down. That is, the user ID and the password are transmitted to the EMD server 3 again.

On the other hand, when the EMD server 3 determines that the user using the EMD client 1 is a valid user and that the EMD client 1 is a valid client, the EMD server 3 issues an authentication ticket certifying that the user using the EMD client 1 and the EMD client 1 has been authenticated, and transmits the authentication ticket to the EMD client 1 via the network 2 (step S224 (YES) in FIG. 19 and step S226 in FIG. 19 and FIG. 24 to be described later).

Then, the list obtaining unit 71 determines in step S23 that the authentication ticket is transmitted, receives the authentication ticket via the communication unit 19, and then stores the authentication ticket in the RAM 13. Thereby connection between the EMD client 1 and the EMD server 3 is established.

Incidentally, when the EMD service is not a membership-only service, the above-described process from step S22 to step S24 is omitted.

When the connection is thus established, the EMD server 3 transmits the information of a top page 81 to the EMD client 1 via the network 2 (step S227 in FIG. 19 and FIG. 24 to be described later).

Then, in step S25, the list obtaining unit 71 receives the information of the top page 81 via the communication unit 19, and stores the information of the top page 81 in the RAM 13 (supplies the information of the top page 81 to the display control unit 73 and the focus setting unit 72).

Returning to FIG. 9, in step S2, the display control unit 73 interprets the information of the top page 81, and then displays the top page 81 as shown in FIG. 4 on the display unit 23.

In step S3, the display control unit 73 determines whether an instruction to end the process is given.

When the power to the EMD client 1 is turned off, for example, the display control unit 73 determines in step S3 that an instruction to end the process is given, whereby the process of the EMD client 1 is ended.

Directing attention to the process of step S2 again, more specifically, immediately before the process of step S2, the focus setting unit 72 sets (initially sets) a focus on a predetermined one ("RECOMMENDATIONS BY SHOP MANAGER" in the example of FIG. 4) of titles of musical piece presenting pages included in the information of the top page 81, and notifies this to the display control unit 73. Accordingly, in step S2, the display control unit 73 displays the top page 81 (FIG. 4) in which the cursor 82 is disposed at the position of that title ("RECOMMENDATIONS BY SHOP MANAGER") on the display unit 23.

That is, as described above, the focus is set on a list (musical piece presenting page) with the title on which the cursor 82 is disposed. By pressing the ENTER key 43, the user can display the list (musical piece presenting page) with the title on which the cursor 82 is disposed on the display unit 23.

In addition, as shown in FIG. 11, the user can effect a transition in the cursor 82 of the top page 81 by pressing the downward key 45 or the upward key 44. That is, each time the downward key 45 or the upward key 44 is pressed once, the focus setting unit 72 updates the setting of the focus on the title of the musical piece presenting page included in the information of the top page 81.

Such a process is performed in steps S4 to S6.

Specifically, when it is determined in step S3 that an instruction to end the process is not given yet, the focus setting unit 72 determines in step S4 whether the upward key 44 or the downward key 45 is pressed.

When the upward key 44 or the downward key 45 is pressed (when the focus setting unit 72 determines in step S4 that the upward key 44 or the downward key 45 is pressed), the focus setting unit 72 updates the setting of the focus in step S5. That is, the display control unit 73 displays the top page 81 in which the position of the cursor 82 is updated (the top page 81 in which the position of titles of musical piece presenting pages disposed is also updated as shown in FIG. 11 as required). The process thereafter proceeds to step S6.

On the other hand, when neither of the upward key 44 and the downward key 45 is pressed (when the focus setting unit 72 determines in step S4 that the upward key 44 or the downward key 45 is not pressed), the process proceeds to step S6 without the process in step S5 being performed (that is, without the focus and the cursor 82 being updated).

In step S6, the list obtaining unit 71 determines whether the ENTER key 43 is pressed.

When the ENTER key 43 is not pressed (when the list obtaining unit 71 determines in step S6 that the ENTER key 43 is not pressed), the process is returned to step S4 to repeat the process from step S4 on down. That is, the process from step S4 to step S6 is repeated unless the ENTER key 43 is pressed, and the display unit 23 displays one of top pages 81 shown in FIG. 11 (top pages 81 in which the cursor 82 is disposed at different positions).

On the other hand, when the ENTER key 43 is pressed (when the list obtaining unit 71 determines in step S6 that the ENTER key 43 is pressed), the list obtaining unit 71 in step S7 performs a process of obtaining information of a musical piece presenting page with a title on which the focus is set (a title on which the cursor 82 is disposed) at this time. The process in step S7 will hereinafter be referred to as a musical piece presenting page obtaining process. Details of the musical piece presenting page obtaining process are shown in a flowchart of FIG. 12. The details of the "musical piece presenting page obtaining process" will now be described in the following with reference to the flowchart of FIG. 12.

Incidentally, suppose in this case that the "musical piece presenting page obtaining process" is performed by the list obtaining unit 71 in FIG. 3 (that the "musical piece presenting page obtaining process" is one of functions of the list obtaining unit 71).

As described above, the information of the top page 81 includes a URL address of each musical piece presenting page. Thus, in first step S41, the list obtaining unit 71 identifies the URL address of a musical piece presenting page with a title on which the focus is set ("RECOMMENDATIONS BY SHOP MANAGER" in the example of FIG. 4).

In this case, since the URL address is specified on the EMD server 3 (incidentally, the URL address is specified on a shop server 301-1 in the example of FIG. 28 to be described later), the list obtaining unit 71 in step S42 accesses the EMD server 3 specified by the identified URL address (via the communication unit 19 and the network 2) to make a request to obtain data (information of the musical piece presenting page) present at the URL address.

The EMD server 3 transmits the requested information of the musical piece presenting page to the EMD client 1 via the network 2 (step S205 in FIG. 18 and FIG. 24 to be described later).

Then, in step S43, the list obtaining unit 71 receives the information of the musical piece presenting page via the communication unit 19, and stores the information of the musical piece presenting page in the RAM 13 (supplies the information of the musical piece presenting page to the display control unit 73 and the focus setting unit 72).

At this time, the list obtaining unit 71 obtains an HTML document 221 as shown in FIG. 13, for example, as the information of the musical piece presenting page (list of musical pieces).

The information of the musical piece presenting page (HTML document) 221 will be described in the following with reference to FIG. 13.

Incidentally, while the HTML document 221 in FIG. 13 has line numbers added on a leftmost side in the figure, the line numbers are added for simplicity of description, and often are not added in practice.

A part interposed between "<" and ">" in the HTML document 221 is referred to as a tag, and markup is performed by using the tag.

A part (a part from a third line to a $17^{th}$ line or a part from a $19^{th}$ line to a $33^{rd}$ line) interposed between MUSIC tags (<MUSIC> and </MUSIC>) includes various information related to one musical piece (musical piece information for identifying the musical piece as well as a license fee for the musical piece, a permitted number of repetitive trial listening reproductions and the like as later described).

That is, each musical piece is listed by MUSIC tags in the information 221 of the musical piece presenting page.

A character string interposed between TITLE tags (<TITLE> and </TITLE>) represents the title of the musical piece. For example, a character string interposed between TITLE tags in a fourth line is "49 DANCE," and therefore the title of the musical piece is identified as "49 DANCE." A character string interposed between ARTIST tags (<ARTIST> and </ARTIST>) represents the name of an artist, that is, a player, a singer or the like of the musical piece. For example, a character string interposed between ARTIST tags in a fifth line is "DC UNIT," and therefore the name of the artist is identified as "DC UNIT." Incidentally, as shown in the musical piece presenting page 91 in FIG. 5, the character string (title) interposed between the TITLE tags and the character string (artist name) interposed between the ARTIST tags are displayed as musical piece information on the display unit 23.

A numeral string interposed between PRICE tags (<PRICE> and </PRICE>) represents a license fee [yen] of the musical piece. For example, a numeral string interposed between PRICE tags in a sixth line is "100," and therefore the license fee for the musical piece is identified as "100 yen."

A part interposed between SAMPLE tags (<SAMPLE> and </SAMPLE>) includes information on trial listening data of the musical piece. Specifically, a numeral string interposed between REPEAT tags (<REPEAT> and </REPEAT>) represents a numeral indicating how many times trial listening reproduction of the musical piece is permitted to be repeated (such a numeral will hereinafter be referred to as a permitted number of repetitive trial listening reproductions). Incidentally, the permitted number of repetitive trial listening reproductions will be described later. A character string interposed between SAMPLEDATA tags (<SAMPLEDATA> and </SAMPLEDATA>) represents a URL address (a URL address in an HTTP protocol) where the trial listening data is present.

A part interposed between CONTENT tags (<CONTENT> and </CONTENT>) includes information on full data (content data) of the musical piece. Specifically, a character string interposed between CONTENTDATA tags (<CONTENTDATA> and </CONTENTDATA>) represents a URL address (a URL address in the HTTP protocol) where the full data is present.

A part interposed between LICENSE tags (<LICENSE> and </LICENSE>) includes information on a license corresponding to the musical piece. Specifically, a character string interposed between LICENSEDATA tags (<LICENSEDATA> and </LICENSEDATA>) represents a URL address (a URL address in the HTTP protocol) to be accessed when data of the license is to be obtained.

Incidentally, a different server URL address (one of http://sample.foobar.com/, http://content.foobar.com/, and http://license.foobar.com/) is specified for each of the trial listening data, the full data, and the license data of a predetermined musical piece in the example of FIG. 13. This is for correspondences to an example of FIG. 28 to be described later. That is, in this case, though not shown, a URL address of the EMD server 3 (for example http://(a domain name of the EMD server 3).com/ or the like) is specified for each of the trial listening data, the full data, and the license data of a predetermined musical piece.

Returning to FIG. 9, when the "musical piece presenting page obtaining process (process in step S7)" is performed and the information (HTML document) 221 of the musical piece presenting page is supplied to the display control unit 73 and the focus setting unit 72, the display control unit 73 in step S8 interprets the information (HTML document) 221 of the musical piece presenting page, and then displays a musical piece presenting page 91 as shown in FIG. 5 on the display unit 23. Specifically, immediately before step S8, the focus setting unit 72 sets a specified one (the musical piece identified by the MUSIC tags in the $3^{rd}$ line and the $17^{th}$ line in FIG. 13 in the example of FIG. 5) of musical pieces (musical pieces identified by MUSIC tags) included in the information (HTML document) 221 of the musical piece presenting page 91 as a musical piece of interest, and notifies this to the display control unit 73. Then, in the process of step S8, the display control unit 73 displays on the display unit 23 the musical piece presenting page 91 in which a cursor 92 is disposed at a position of musical piece information ("49 DANCE" and "DC U . . . " in the example of FIG. 5) of the notified musical piece of interest.

In step S9, as described above, the EMD client 1 automatically obtains the trial listening data of the musical piece of interest from the EMD server 3 via the network 2, and automatically reproduces the trial listening data of the musical piece of interest from the speaker 21.

Such a process in step S9 will hereinafter be referred to as a "trial listening data obtaining and reproducing process." Details of the "trial listening data obtaining and reproducing process" are shown in a flowchart of FIG. 14. The details of the "trial listening data obtaining and reproducing process" will now be described in the following with reference to the flowchart of FIG. 14.

Incidentally, suppose in this case that a main part of the "trial listening data obtaining and reproducing process" is performed by the content trial data obtaining unit 74 in FIG. 3 (one of functions of the content trial data obtaining unit 74). A few processes in the "trial listening data obtaining and reproducing process" are carried out by the focus setting unit 72 and the display control unit 73.

First, in step S61, the content trial data obtaining unit 74 starts a "one musical piece sample listening process" for a musical piece initially set as musical piece of interest. The "one musical piece sample listening process" refers to a process (a concrete trial listening reproduction process) for automatically obtaining trial listening data of a predetermined musical piece and automatically reproducing the musical piece (one part) corresponding to the trial listening data. The "one musical piece sample listening process" will be described later in detail with reference to a flowchart of FIG. 15.

In the present embodiment, trial listening reproduction of a plurality of musical pieces is not performed simultaneously, and therefore the "one musical piece sample listening process" for each of the plurality of musical pieces is not performed simultaneously. However, since a musical piece for trial listening (that is, a musical piece of interest) is changed by pressing the upward key 44 or the downward key 45 as shown in FIG. 6 described above, the musical piece (musical piece of interest) for the "one musical piece sample listening process" also needs to be changed according to that change. However, the following problems occur when timing of pressing the upward key 44 or the downward key 45 is made to simply coincide with timing of updating the musical piece (musical piece of interest) for the "one musical piece sample listening process." Specifically, when the user repeatedly hits the upward key 44 or the downward key 45 at short time intervals, for example, the EMD client 1 transmits unnecessary requests for trial listening data to the EMD server 3, thus not only wasting a line on the network 2 but also imposing a load on the EMD server.

In order to solve this problem, when the upward key 44 or the downward key 45 is pressed again within a specified time (for example 500 msec) of pressing the upward key 44 or the downward key 45, the EMD client 1 according to the present embodiment updates the musical piece of interest (updates the position of the cursor 92 in the musical piece presenting page 91 as shown in FIG. 6), but does not perform the "one musical piece sample listening process" for the musical piece of interest (that is, continues performing the "one musical piece sample listening process" for the musical piece being reproduced for trial listening at a present time without transmitting a request for the trial listening data of the musical piece of interest to the EMD server 3).

In other words, in order to solve the problem, the EMD client 1 according to the present embodiment performs a process of controlling the musical piece for the "one musical piece sample listening process" (for trial listening) according to operation of the user. That is, this process is the "trial listening data obtaining and reproducing process" in FIG. 14 now being described. In other words, the "trial listening data obtaining and reproducing process" controls timing of a start and an end of the "one musical piece sample listening process." Thus, the "trial listening data obtaining and reproducing process" and the "one musical piece sample listening process" for a predetermined musical piece are performed independently of each other (in parallel with each other).

Directing attention to step S61 again, after the "one musical piece sample listening process" for the musical piece of interest (initial setting) is performed in the process of step S61, the focus setting unit 72 determines in step S62 whether the upward key 44 or the downward key 45 is pressed.

When the upward key 44 or the downward key 45 is pressed (when the focus setting unit 72 determines in step S62 that the upward key 44 or the downward key 45 is pressed), the focus setting unit 72 in step S63 updates the musical piece of interest (focus setting). That is, as shown in FIG. 6, the display control unit 73 displays the musical piece presenting page 91 in which the position of the cursor 92 is updated (the musical piece presenting page 91 in which the position of musical piece information is also updated as is understood from a mutual relation between the two lower musical piece presenting pages 91 in FIG. 6). The process thereafter proceeds to step S64.

On the other hand, when neither of the upward key 44 and the downward key 45 is pressed (when the focus setting unit 72 determines in step S62 that the upward key 44 or the downward key 45 is not pressed), the process proceeds to step S64 without the process in step S63 being performed (that is, without the focus and the cursor 92 being updated).

In step S64, the content trial data obtaining unit 74 determines whether the timer 51 is performing clocking operation.

That is, in this case, the timer 51 clocks the above-described specified time (for example 500 msec). As later described, the timer 51 starts clocking operation (step S81 in FIG. 15 to be described later) when the upward key 44 or the downward key 45 is pressed and the "one musical piece sample listening process" is started for a predetermined musical piece, and the timer 51 ends the clocking operation when clocking the specified time.

Hence, when the timer 51 is performing clocking operation (when it is determined in step S64 that the timer 51 is performing clocking operation), it is determined that the specified time has not passed since a time of the immediately preceding operation (the operation of pressing the upward key 44 or the downward key 45), and the "one musical piece sample listening process" for the musical piece currently being reproduced for trial listening continues being performed. That is, the process in steps S65 to S67 to be described later is not performed (consequently the musical piece currently being reproduced for trial listening continues being reproduced for trial listening), and the process proceeds to step S68.

On the other hand, when the timer 51 is not performing clocking operation (when it is determined in step S64 that the timer 51 is not performing clocking operation), the content trial data obtaining unit 74 determines that at least the specified time has passed since the time of the immediately preceding operation (the operation of pressing the upward key 44 or the downward key 45). In step S65, the content trial data obtaining unit 74 determines whether the musical piece currently being reproduced for trial listening is the musical piece of interest at a present time.

When the musical piece currently being reproduced for trial listening is the musical piece of interest at the present time (when the content trial data obtaining unit 74 determines in step S65 that the musical piece currently being reproduced for trial listening is the musical piece of interest at the present time), the "one musical piece sample listening process" for the musical piece of interest (the musical piece currently being reproduced for trial listening) continues being performed. That is, the process in steps S66 and S67 to be described later is not performed (consequently the musical piece of interest that has been reproduced up to the present time for trial listening continues being reproduced for trial listening), and the process proceeds to step S68.

On the other hand, when the musical piece currently being reproduced for trial listening is different from the musical piece of interest (when the content trial data obtaining unit 74 determines in step S65 that the musical piece currently being reproduced for trial listening is not the musical piece of interest at the present time), the content trial data obtaining unit 74 forcefully terminates the "one musical piece sample listening process" for the musical piece currently being reproduced for trial listening in step S66, starts the "one musical piece sample listening process" for the musical piece of interest at the present time in step S67, and then advances the process to step S68. Thus, the trial listening data of the musical piece of interest at the present time is obtained automatically, and the musical piece of interest (one part) corresponding to the trial listening data is automatically reproduced for trial listening.

In step S68, the display control unit 73 determines whether the ENTER key 43 or the left key 47 (return key) is pressed.

As shown in FIG. 7 described above, when the ENTER key 43 is pressed, contents displayed on the display unit 23 are updated from the musical piece presenting page 91 to the purchase confirmation image 93.

On the other hand, when the left key 47 (return key) is pressed, the display control unit 73 determines that an instruction to display the top page 81 again is given. Thus the contents displayed on the display unit 23 are updated from the musical piece presenting page 91 in FIG. 5 to the top page 81 in FIG. 4.

When neither of the ENTER key 43 and the left key 47 (return key) is pressed (when the display control unit 73 determines in step S68 that the ENTER key 43 or the left key 47 (return key) is not pressed), the process returns to step S62 to repeat the process from step S62 on down. That is, until the ENTER key 43 or the left key 47 (return key) is pressed, the process from step S62 to step S68 is repeated (the process shown in FIG. 6 is performed according to the user operation of pressing the upward key 44 or the downward key 45).

On the other hand, when the ENTER key 43 or the left key 47 (return key) is pressed (when the display control unit 73 determines in step S68 that the ENTER key 43 or the left key 47 (return key) is pressed), the "trial listening data obtaining and reproducing process" is ended. Then a process in step S10 in FIG. 9 is performed.

Specifically, the display control unit 73 determines in step S10 whether an instruction to display the top page 81 is given.

For example, when the left key 47 (return key) is pressed, the display control unit 73 determines in step S10 that an instruction to display the top page 81 is given, returns the process to step S2, and displays the top page 81 in FIG. 4 on the display unit 23.

On the other hand, for example, when the ENTER key 43 is pressed, the display control unit 73 determines in step S10 that an instruction to display the top page 81 is not given, and displays the purchase confirmation image 93 shown in FIG. 7 on the display unit 23. Then, the display control unit 73 determines in step S11 whether an instruction to obtain the full data (content data) of the musical piece of interest is given.

Specifically, when the ENTER key 43 is pressed again in this state (the state of the purchase confirmation image 93 being displayed) as shown in FIG. 7, the display control unit 73 determines in step S11 that an instruction to obtain the full data (content data) of the musical piece of interest is given. In step S12, the full data of the musical piece of interest is downloaded. Incidentally, such a process in step S12 will hereinafter be referred to as a "content data obtaining process." Details of the "content data obtaining process" will be described later with reference to FIG. 16.

On the other hand, when the downward key 45 is pressed and further the ENTER key 43 is pressed in this state (the state of the purchase confirmation image 93 being displayed), the display control unit 73 determines in step S11 that an instruction to obtain the full data (content data) of the musical piece of interest is not given. The process returns to step S9 to perform the "trial listening data obtaining and reproducing process" again. Specifically, as shown in FIG. 7, the contents displayed on the display unit 23 are returned from the purchase confirmation image 93 to the musical piece presenting page 91, and a predetermined musical piece is automatically reproduced for trial listening again.

Details of the "one musical piece sample listening process" will be described in the following with reference to the flowchart of FIG. 15.

Incidentally, suppose in this case that the "one musical piece sample listening process" is performed by the content trial data obtaining unit 74 and the reproducing unit 75 in FIG. 3 (that the "one musical piece sample listening process" is one of functions of each of the content trial data obtaining unit 74 and the reproducing unit 75).

First, for the timer 51 to clock the above-mentioned specified time, the content trial data obtaining unit 74 starts the timer 51 (makes the timer 51 start clocking operation) in step S81.

In step S82, the content trial data obtaining unit 74 identifies the URL address of the trial listening data of the musical piece of interest. As described above, in this case, the URL address of the trial listening data of the musical piece of interest is included in the information (HTML document) 221 of the musical piece presenting page in FIG. 13. The character string interposed between SAMPLEDATA tags (see the $9^{th}$ line and the $25^{th}$ line) is the URL address of the trial listening data of the musical piece of interest.

In this case, since as described above, the URL address is specified on the EMD server 3 (incidentally, the URL address is specified on a trial listening data server 301-3 in the example of FIG. 28 to be described later), the content trial data obtaining unit 74 in step S83 accesses the EMD server 3 specified by the identified URL address (via the communication unit 19 and the network 2) to make a request to download (obtain) data (trial listening data) present at the URL address.

The EMD server 3 transmits the requested trial listening data to the EMD client 1 via the network 2 (step S207 in FIG. 18 and FIG. 24 to be described later).

Then, in step S84, the content trial data obtaining unit 74 receives the trial listening data transmitted from the EMD server 3 via the communication unit 19, and writes the trial listening data in the RAM 13 in fixed amounts (supplies the trial listening data to the reproducing unit 75).

In step S85, the reproducing unit 75 determines whether the trial listening data is encrypted.

When the trial listening data is encrypted (when the reproducing unit 75 determines in step S85 that the trial listening data is encrypted), the reproducing unit 75 in step S86 reads the encrypted trial listening data from the RAM 13, decrypts the encrypted trial listening data (makes the DRM control unit 24 decrypt the encrypted trial listening data, to be exact), and writes the trial listening data back to the RAM 13. In step S87, the reproducing unit 75 reproduces the musical piece of interest (one part thereof) corresponding to the trial listening data written in the RAM 13 from the speaker 21.

Incidentally, when the trial listening data is not encrypted (when the reproducing unit 75 determines in step S85 that the trial listening data is not encrypted), the process in step S86

(decrypting process) is not performed, and the musical piece of interest (one part thereof) corresponding to the trial listening data written in the RAM 13 is reproduced in step S87.

In step S88, the reproducing unit 75 determines whether all the trial listening data is obtained (downloaded).

When not all the trial listening data is obtained (downloaded) (when the reproducing unit 75 determines in step S88 that not all the trial listening data is obtained (downloaded)), the process returns to step S84 to repeat the process from step S84 on down. That is, remaining trial listening data is obtained sequentially, and a remaining part (a part corresponding to the trial listening data) of the musical piece of interest is reproduced sequentially.

The number of repetitive trial listening reproductions for one musical piece is not specifically limited. However, since trial listening data is written to the RAM 13 temporarily, the EMD client 1 needs to request the trial listening data from the EMD server 3 a number of times equal to the number of repetitive trial listening reproductions. Thus, requesting the trial listening data more than necessary results in a problem of unnecessarily using a capacity of a connecting line on the network 2.

Accordingly, in order to solve this problem, a permitted number of repetitive trial listening reproductions is defined as a protocol between the EMD client 1 and the EMD server 3 in the present embodiment as described above, and a permitted number of repetitive trial listening reproductions for each musical piece is included in the information (HTML document) 221 of the musical piece presenting page in FIG. 13. Specifically, a numeral interposed between REPEAT tags (see the eighth line and the $24^{th}$ line) is the permitted number of repetitive trial listening reproductions of trial listening data of the musical piece of interest.

Accordingly, the reproducing unit 75 determines in step S89 whether trial listening reproduction has been performed a specified number of times (that is, a permitted number of repetitive trial listening reproductions). When trial listening reproduction has not been performed the specified number of times (when the reproducing unit 75 determines that trial listening reproduction has not been performed the specified number of times), the process returns to step S83 to repeat the process from step S83 on down. The reproducing unit 75 repeats the process from step S83 to step S89 a number of times corresponding to the specified number of times. When the musical piece of interest has been reproduced for trial listening the specified number of times, it is determined in step S89 that trial listening reproduction has been performed the specified number of times, whereby the "one musical piece sample listening process" for the musical piece of interest is ended.

It is to be noted that as described above, when the process in step S66 (FIG. 14) in the "trial listening data obtaining and reproducing process" is performed, the "one musical piece sample listening process" for a predetermined musical piece is forcefully terminated regardless of which of the processes in steps S81 to S89 is being performed.

Details of the "content data obtaining process" will next be described with reference to a flowchart of FIG. 16.

Incidentally, suppose in this case that the "content data obtaining process" is performed by the content full data obtaining unit 76 in FIG. 3 (that the "content data obtaining process" is one of functions of the content full data obtaining unit 76).

Figure 16:
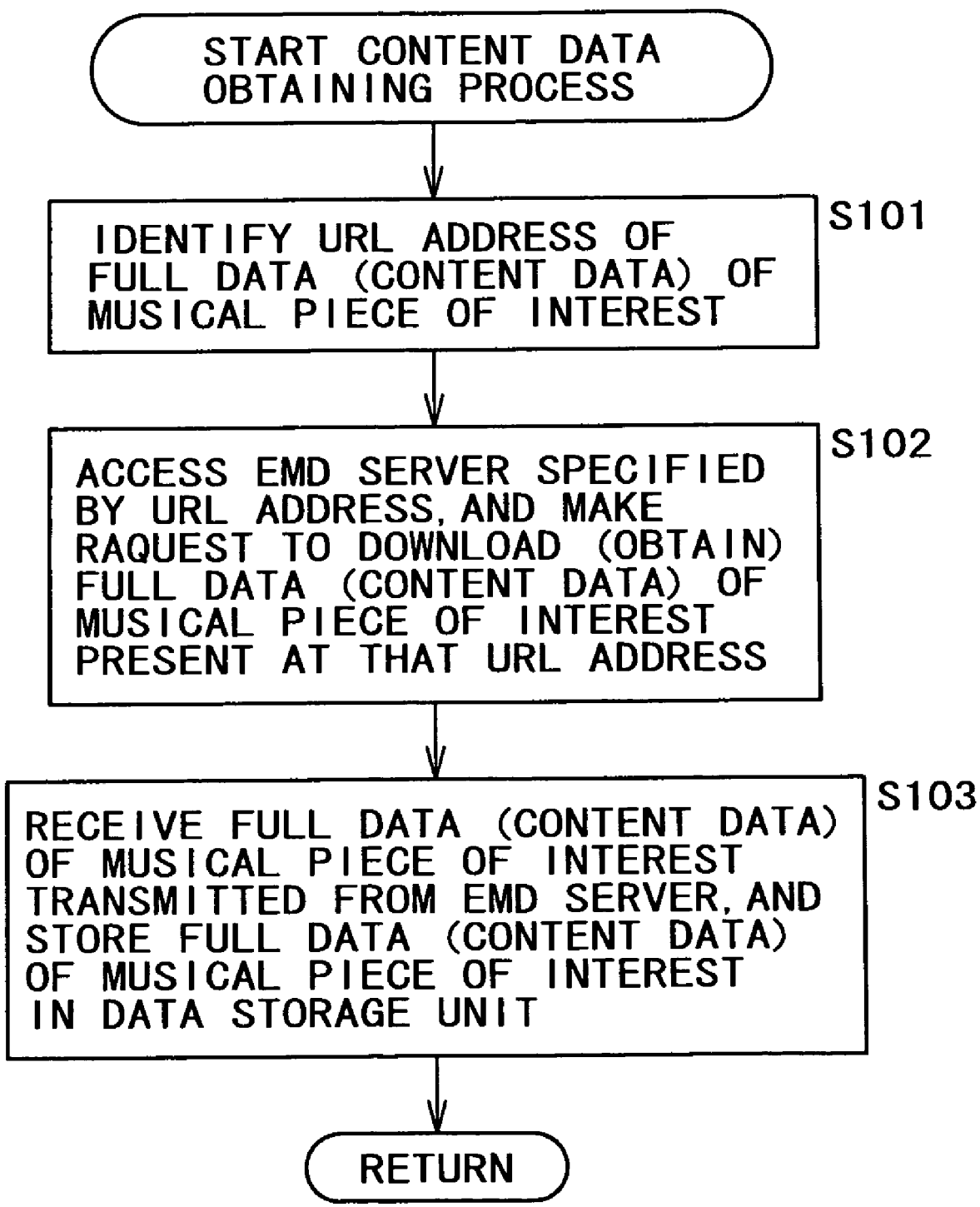
FIG. 16 is a flowchart of assistance in explaining a detailed example of a content data obtaining process in the process of the EMD client in FIG. 9.

When the ENTER key 43 is pressed twice in a state of a predetermined musical piece (musical piece of interest) being reproduced for trial listening as shown in FIG. 7 described above, it is determined in step S11 (FIG. 9) that an instruction to obtain the full data (content data) of the musical piece of interest is given, and then a process in step S12, that is, the "content data obtaining process" in FIG. 16 is performed.

Specifically, in step S101, the content full data obtaining unit 76 identifies the URL address of the full data of the musical piece of interest. As described above, in this case, the URL address of the full data of the musical piece of interest is included in the information (HTML document) 221 of the musical piece presenting page in FIG. 13. Specifically, a character string interposed between CONTENTDATA tags (see the $12^{th}$ line and the $28^{th}$ line) is the URL address of the full data of the musical piece of interest.

In this case, since as described above, the URL address is specified on the EMD server 3 (incidentally, the URL address is specified on a content data server 301-4 in the example of FIG. 28 to be described later), the content full data obtaining unit 76 in step S102 accesses the EMD server 3 specified by the identified URL address (via the communication unit 19 and the network 2) to make a request to download (obtain) data (the full data of the musical piece of interest) present at the URL address.

The EMD server 3 transmits the requested full data of the musical piece of interest to the EMD client 1 via the network 2 (step S209 in FIG. 18 and FIG. 25 to be described later (see FIG. 20 for details)).

Then, in step S103, the content full data obtaining unit 76 receives the full data of the musical piece of interest which data is transmitted from the EMD server 3 via the communication unit 19, and stores the full data of the musical piece of interest in the data storage unit 15. Thereby the "content data obtaining process" is ended.

After the "content data obtaining process" is ended, a charging process and the like for the full data of the musical piece of interest are performed depending on contents of the EMD service and the DRM used by each of the EMD client 1 and the EMD server 3. Though not specifically limited, the process performed after the "content data obtaining process" in the present embodiment is as follows.

Figure 10:
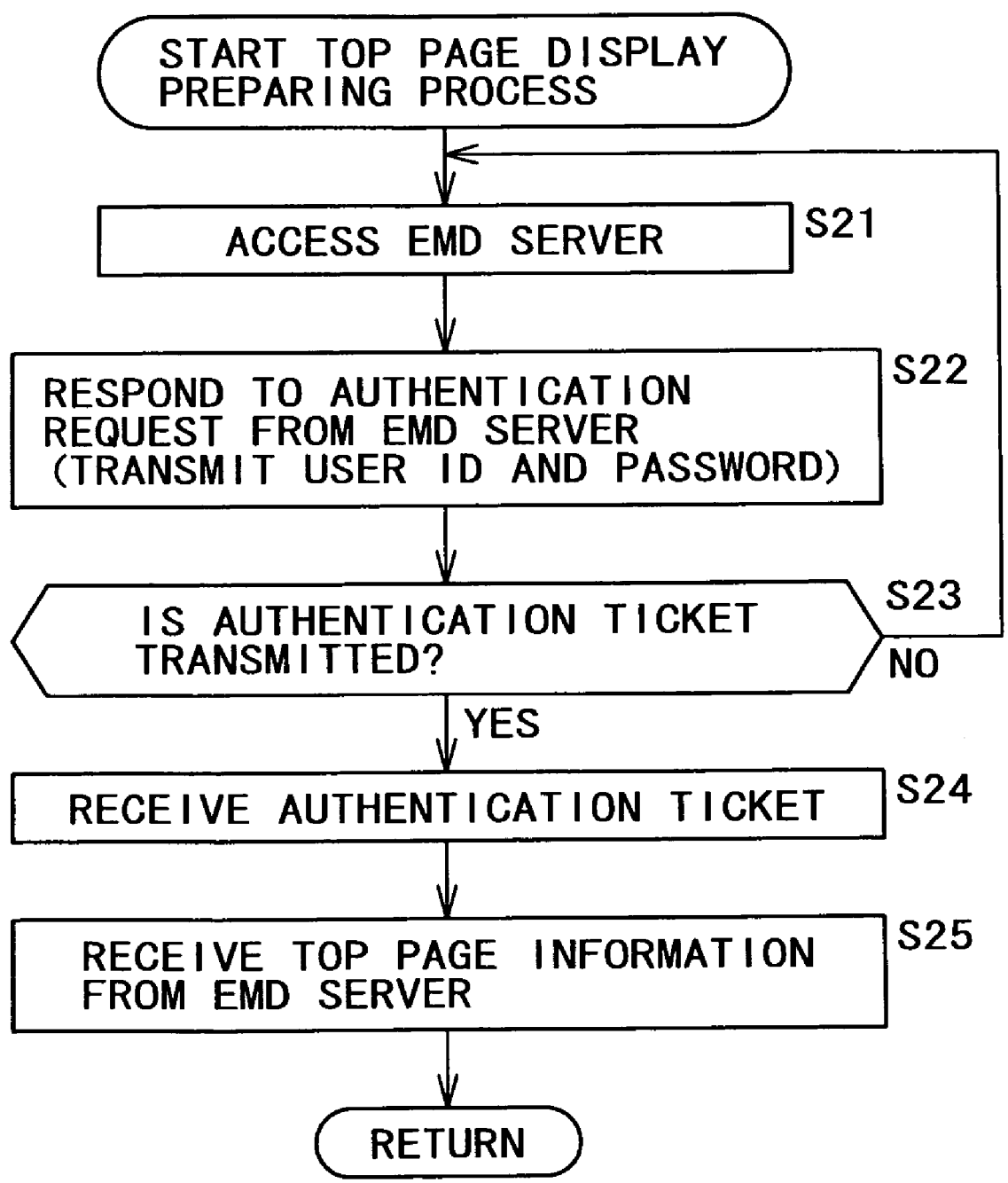
FIG. 10 is a flowchart of assistance in explaining a detailed example of a top page display preparing process in the process of the EMD client in FIG. 9.

In the present embodiment, as described above, "OpenMG X" is applied as DRM, and an authentication ticket is issued from the EMD server 3 at the time of authentication of the EMD client 1 and is retained by the EMD client 1 (step S24 in FIG. 10 as described above). Hence, after the "content data obtaining process" in step S12, processes in steps S13 and S14 in FIG. 9 are performed.

The processes in steps S13 and S14 are based on the following two assumptions. The first assumption is that as described above, it is essential to obtain a license (data of the license) in order to use (reproduce) content data (full data of a musical piece) and that a charging process is performed at a time of obtaining the data of the license. The second assumption is that in order to omit the process of authenticating the EMD client 1 at the time of the charging process in consideration of convenience of the user, the EMD client 1 sends the authentication ticket to the EMD server 3 when requesting the data of the license, and that when receiving the authentication ticket, the EMD server 3 checks validity of the authentication ticket and then sends the data of the license to the EMD client 1 when the authentication ticket is valid.

Specifically, in step S13, the content full data obtaining unit 76 determines whether license data is already obtained.

When the license data is already obtained (when the content full data obtaining unit 76 determines in step S13 that the license data is already obtained), it is determined from the first assumption described above that a charging process has already been performed, and therefore the process returns to step S9 to repeat the process from step S9 on down. Specifically, as shown in FIG. 7, after the download completion image 96 is displayed on the display unit 23 and it is confirmed that the ENTER key 43 is pressed, the musical piece presenting page 91 is displayed on the display unit 23 again, and a predetermined musical piece is automatically reproduced again for trial listening from the speaker 21.

On the other hand, when the license data is not obtained yet (when the content full data obtaining unit 76 determines in step S13 that the license data is not obtained yet), a process of obtaining the license data is performed in step S14 on the basis of the second assumption described above. Incidentally, such a process in step S14 will hereinafter be referred to as a "license obtaining process." Details of the "license obtaining process" are shown in a flowchart of FIG. 17. The details of the "license obtaining process" will now be described in the following with reference to the flowchart of FIG. 17.

Incidentally, suppose in this case that the "license obtaining process" is performed by the content full data obtaining unit 76 in FIG. 3 (that the "license obtaining process" is one of functions of the content full data obtaining unit 76).

First, in step S121, the content full data obtaining unit 76 identifies a URL address to be accessed to obtain the license data. As described above, in this case, the URL address is included (interposed) between LICENSEDATA tags (see a $15^{th}$ line and a $31^{st}$ line) of the corresponding musical piece in the information (HTML document) 221 of the musical piece presenting page in FIG. 13. As described above, since "OpenMG X" is applied in the present embodiment, a header of the full data of the musical piece (see FIG. 21 and the like to be described later) also includes this URL address. Thus, when the content full data obtaining unit 76 identifies the URL address to be accessed to obtain the license data, the content full data obtaining unit 76 may refer to the information (HTML document) 221 of the musical piece presenting page, or refer to the header of the full data of the musical piece.

In either case, since as described above, the URL address is specified on the EMD server 3 in this case (incidentally, the URL address is specified on a license server 301-5 in the example of FIG. 28 to be described later), the content full data obtaining unit 76 in step S122 accesses the EMD server 3 specified by the identified URL address (via the communication unit 19 and the network 2). In step S123, the content full data obtaining unit 76 transmits the authentication ticket and information for specifying the license of the musical piece of interest (hereinafter referred to as license specifying information) to the EMD server 3.

When receiving the authentication ticket and the license specifying information via the network 2, the EMD server 3 performs a predetermined charging process using the authentication ticket (steps S261 and S262 in FIG. 22 and FIG. 25 to be described later).

When the EMD server 3 has failed in the charging process, the EMD server 3 transmits predetermined error information to the EMD client 1 via the network 2 (step S263 (NO) and S264 in FIG. 22 to be described later).

When receiving the error information via the communication unit 19, the content full data obtaining unit 76 determines in step S124 that no license is obtained (no license data is received), and then performs a predetermined error process in step S126. Thereby the "license obtaining process" is ended.

On the other hand, when the EMD server 3 has succeeded in the charging process, the EMD server 3 transmits the data of the license (see FIG. 23 to be described later) to the EMD client 1 via the network 2 (see steps S263 (YES) and S265 to S267 in FIG. 22 to be described later, of which steps only step S266 is described in FIG. 25).

When receiving the data of the license via the communication unit 19, the content full data obtaining unit 76 determines in step S124 that the license is obtained (the data of the license is received), and then stores the data of the license in the data storage unit 15 in step S125. Thereby the "license obtaining process" is ended.

When the EMD client 1 thus obtains the license for the content data (full data of the musical piece of interest), the EMD client 1 is able to use the content (musical piece of interest).

Incidentally, a process itself for using the content data is not directly related to the present invention, and details thereof can be readily understood by those skilled in the art by reference to the above-mentioned WO02/080446 pamphlet and the like. Therefore detailed description of the process will be omitted.

Returning to step S9, when it is determined in the process of step S13 that the license data is already obtained or when the process of step S14 is ended, the process returns to step S9 to perform the "trial listening data obtaining and reproducing process" again. Specifically, as shown in FIG. 7, the contents displayed on the display unit 23 are returned from the purchase confirmation image 93 to the musical piece presenting page 91, and trial listening reproduction of a predetermined musical piece is automatically performed again.

The process of the EMD client 1 side in the EMD system of FIG. 1 has been described above with reference to FIG. 9 and the like.

Next, the process of the EMD server 3 side in the EMD system of FIG. 1 will be described with reference to FIG. 18 and the like.

In step S201 in FIG. 18, the CPU 101 (FIG. 8) of the EMD server 3 determines whether the EMD server 3 is accessed by the EMD client 1.

When the EMD server 3 is not accessed by the EMD client 1 (when the EMD server 3 determines in step S201 that the EMD server 3 is not accessed by the EMD client 1), the EMD server 3 determines in step S212 whether an instruction to end the process is given. When the EMD server 3 determines in step S212 that an instruction to end the process is given, the process is ended. On the other hand, when the EMD server 3 determines in step S212 that an instruction to end the process is not given, the process returns to step S201 to determine again whether the EMD server 3 is accessed by the EMD client 1. That is, the EMD server 3 monitors access thereto from the EMD client 1 at all times (unless an instruction to end the process is given).

When the EMD server 3 is accessed by the EMD client 1 (when the EMD server 3 determines in step S201 that the EMD server 3 is accessed by the EMD client 1), the CPU 101 performs a process (one of processes of steps S203, S205, S207, S209, and S211 to be described later) corresponding to a content of the access (a content of a request). Thereafter the process proceeds to step S212 to perform the process from step S212 on down. That is, after performing a process for response to access from the EMD client 1, the EMD server 3 monitors access thereto from the EMD client 1 again (unless an instruction to end the process is given).

Specifically, for example, when the EMD client 1 performs the "top page display preparing process (detailed in FIG. 10)" in step S1 in FIG. 9 described above, that is, when the EMD client 1 requests the information of the top page 81, the CPU 101 determines in step S202 that the information of the top page 81 is requested. In step S203, the CPU 101 reads the top page 81 from the storage unit 109, and then transmits the top page 81 to the EMD client 1 via the communication unit 110 and the network 2. Incidentally, such a process in step S203 will hereinafter be referred to as a "top page information providing process." Details of the "top page information providing process" will be described later with reference to a flowchart of FIG. 19.

For example, when the EMD client 1 performs the "musical piece presenting page obtaining process (detailed in FIG. 12)" in step S7 in FIG. 9 described above, that is, when the EMD client 1 requests the information of the musical piece presenting page 91, the CPU 101 determines in step S202 that the information of the top page 81 is not requested. Then, in step S204, the CPU 101 determines that the information of the musical piece presenting page 91 is requested. In step S205, the CPU 101 reads the requested information of the musical piece presenting page 91 (HTML document 221 in FIG. 13) from the storage unit 109, and then transmits the information of the musical piece presenting page 91 to the EMD client 1 via the communication unit 110 and the network 2.

For example, when the EMD client 1 performs the "trial listening data obtaining and reproducing process (detailed in FIG. 14)" in step S9 in FIG. 9 described above (when the EMD client 1 performs the "one musical piece sample listening process" in FIG. 15, to be exact), that is, when the EMD client 1 requests the trial listening data of a musical piece of interest, the CPU 101 determines in each of steps S202 and S204 that a request corresponding to the process of each of steps S202 and S204 is not made. Then, in step S206, the CPU 101 determines that the trial listening data is requested. In step S207, the CPU 101 reads the requested trial listening data from the storage unit 109, and then transmits the trial listening data to the EMD client 1 via the communication unit 110 and the network 2.

For example, when the EMD client 1 performs the "content data obtaining process (detailed in FIG. 16)" in step S12 in FIG. 9 described above, that is, when the EMD client 1 requests the full data of the musical piece of interest, the CPU 101 determines in each of steps S202, S204, and S206 that a request corresponding to the process of each of steps S202, S204, and S206 is not made. Then, in step S208, the CPU 101 determines that the content data is requested. In step S209, the CPU 101 reads the requested content data (full data of the musical piece of interest) from the storage unit 109, and then transmits the content data to the EMD client 1 via the communication unit 110 and the network 2. Incidentally, such a process in step S209 will hereinafter be referred to as a "content data distribution process." Details of the "content data distribution process" will be described later with reference to a flowchart of FIG. 20.

For example, when the EMD client 1 performs the "license obtaining process (detailed in FIG. 17)" in step S14 in FIG. 9 described above, that is, when the EMD client 1 requests license data corresponding to the musical piece of interest (the downloaded full data of the musical piece), the CPU 101 determines in each of steps S202, S204, S206, and S208 that a request corresponding to the process of each of steps S202, S204, S206, and S208 is not made. Then, in step S210, the CPU 101 determines that the license is requested. In step S211, the CPU 101 generates the requested license data, and then transmits the license data to the EMD client 1 via the communication unit 110 and the network 2. Incidentally, such a process in step S211 will hereinafter be referred to as a "license providing process." Details of the "license providing process" will be described later with reference to a flowchart of FIG. 22.

Next, details of the "top page information providing process (process in step S203)," the "content data distribution process (process in step S209)," and the "license providing process (process in step S211)" will be described in that order.

First, the "top page information providing process (process in step S203 in FIG. 18)" will be described in detail with reference to a flowchart of FIG. 19.

When the EMD client 1 accesses the EMD server 3 in step S21 in FIG. 10 as described above, the CPU 101 determines in step S202 in FIG. 18 that the information of the top page 81 is requested, and then starts the "top page information providing process" in step S203.

Figure 19:
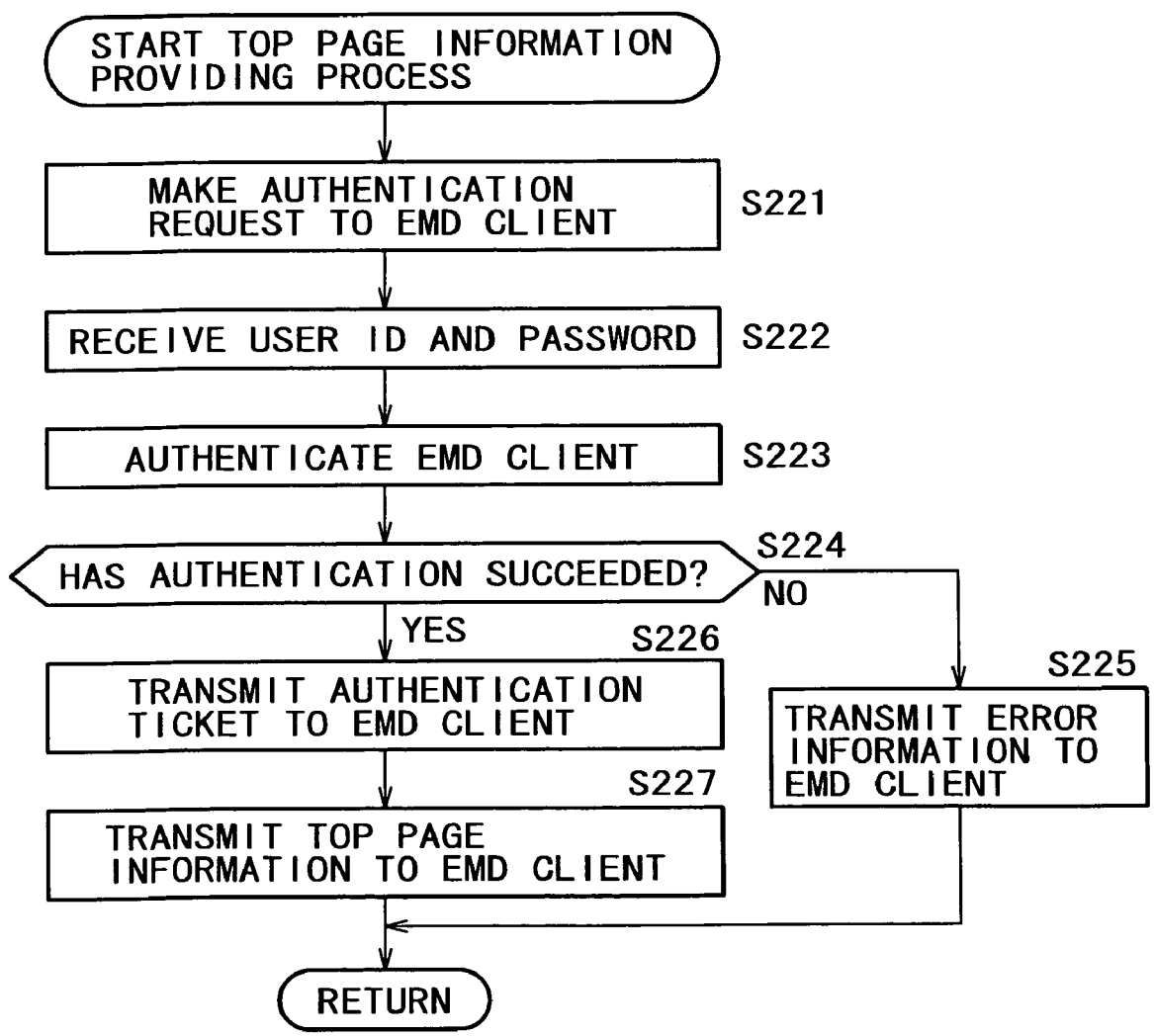
FIG. 19 is a flowchart of assistance in explaining a detailed example of a top page information providing process in the process of the EMD server in FIG. 18.

Specifically, in this case, since the EMD service is available to members only and the EMD server 3 needs to authenticate the user, as described above, the EMD server 3 makes an authentication request to the EMD client 1 in step S221 in FIG. 19.

As described above, the EMD client 1 responds to the authentication request from the EMD server 3 in step S22 in FIG. 10. That is, the EMD client 1 transmits a user ID and a password to the EMD server 3 via the network 2.

Then, the CPU 101 receives the user ID and the password via the communication unit 110 in step S222, authenticates the EMD client 1 in step S223, and determines whether the authentication has succeeded in step S224.

When the authentication has succeeded (when the CPU 101 determines that the authentication has succeeded in step S224), the CPU 101 in step S226 generates an authentication ticket and then transmits the authentication ticket to the EMD client 1 via the communication unit 110 and the network 2. In step S227, the CPU 101 reads the information of the top page 81 from the storage unit 109, and then transmits the information of the top page 81 to the EMD client 1 via the communication unit 110 and the network 2. Thereby the "top page information providing process" is ended.

On the other hand, when the authentication has failed (when the CPU 101 determines that the authentication has not succeeded in step S224), the CPU 101 in step S225 transmits predetermined error information to the EMD client 1 via the communication unit 110 and the network 2. Thereby the "top page information providing process" is ended.

Incidentally, when the EMD service is not a membership-only service, only the above-described process in step S227 is performed.

Next, the "content data distribution process" (process in step S209 in FIG. 18)" will be described in detail with reference to a flowchart of FIG. 20.

When the EMD client 1 makes a request to download (obtain) the full data of the musical piece of interest in step S102 in FIG. 16 as described above, the CPU 101 of the EMD server 3 determines in step S201 in FIG. 18 that the EMD server 3 is accessed by the EMD client 1. The CPU 101 determines in each of steps S202, S204, and S206 that a request corresponding to the process of each of steps S202, S204, and S206 is not made, and then, in step S208, the CPU 101 determines that the content data is requested. In step S209, the CPU 101 performs the "content data distribution process."

Figure 20:
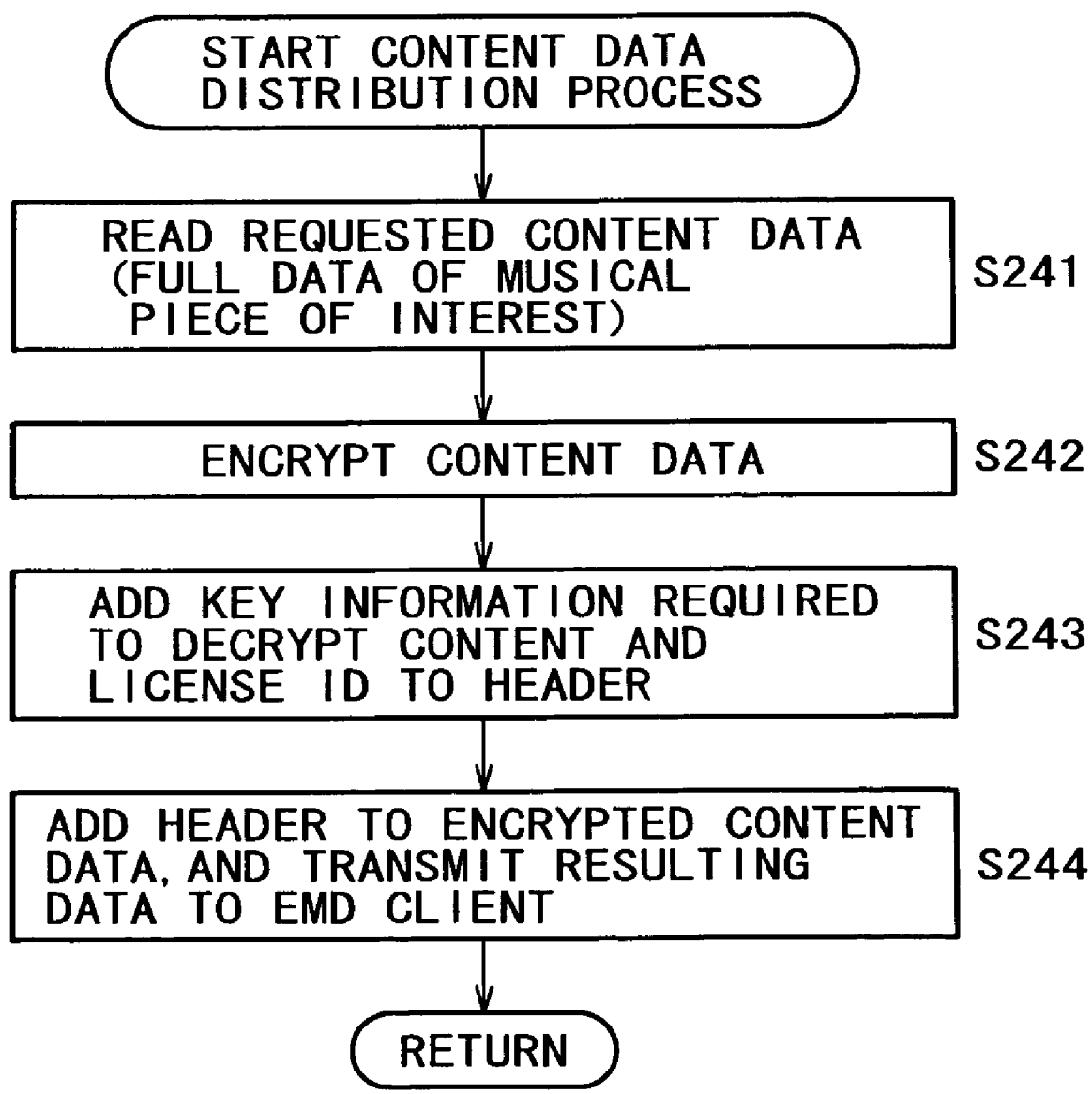
FIG. 20 is a flowchart of assistance in explaining a detailed example of a content data delivering process in the process of the EMD server in FIG. 18.

Specifically, in step S241 in FIG. 20, the CPU 101 of the EMD server 3 reads the requested content data (the full data of the musical piece of interest stored at a location specified by a URL address) from among content data (full data of musical pieces) stored in the storage unit 109.

In step S242, the CPU 101 supplies the content data to the DRM control unit 104 to encrypt the content data using a predetermined encryption key (hereinafter referred to as a content key Kc).

Incidentally, when the content data (full data of the musical piece of interest) stored in the storage unit 109 is not encoded by the ATRAC 3 system, the DRM control unit 104 performs the encryption after encoding the content data by the ATRAC 3 system. Also, content data may be stored in the storage unit 109 in a pre-encrypted state. In this case, the process of step S242 can be omitted.

Next, in step S243, the CPU 101 adds key information (EKB and KEKBC(Kc) in FIG. 21 to be described later) necessary to decrypt the encrypted contents and a license ID for identifying a license necessary to use the contents (musical piece of interest) to a header for forming a format in which the encrypted content data is transmitted.

Then, in step S244, the CPU 101 transmits data obtained by formatting the content data encrypted in the process of step S242 and the header to which the key information and the license ID are added in the process of step S243 to the EMD client 1 via the communication unit 110 and the network 2.

As described above, in step S103 in FIG. 16, the EMD client 1 stores the data (data obtained by formatting the encrypted content data and the header to which the key information and the license ID are added) as the full data of the musical piece of interest in the data storage unit 15.

Figure 21:
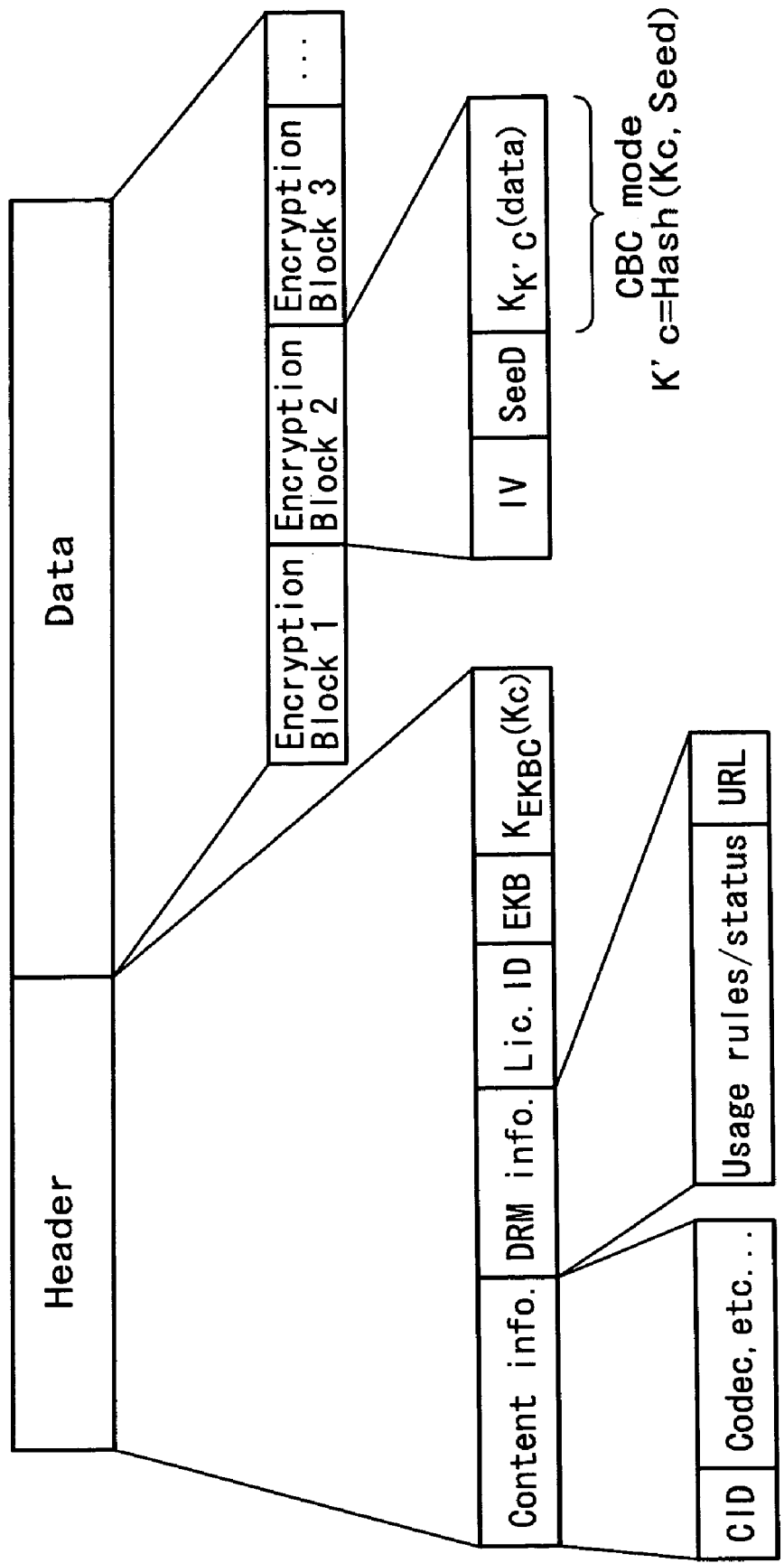
FIG. 21 is a diagram showing an example of structure of content data (full data of a musical piece) distributed by the EMD server.

FIG. 21 shows the format when the content data (the full data of the musical piece of interest) is thus supplied from the EMD server 3 to the EMD client 1.

As shown in FIG. 21, this format comprises a header and data.

The header includes content information, DRM (Digital Right Management) information, a license ID, an EKB (Enabling Key Block), and data KEKBC(Kc) as a content key Kc encrypted using a key KEKBC generated from the EKB.

The content information includes information such as a content ID (CID) as identifying information for identifying the content data formatted as data, and a codec method for coding and decoding the content.

The digital right management information includes usage rules/status of use of the content and a URL address. In the usage rules/status, a number of content reproductions and a number of copies, for example, are described.

The URL address is address information accessed when a license specified by the license ID is obtained, and is the address of the EMD server 3 necessary to receive the license in the example of FIG. 1 (the address of a license server 301-5 in the example of FIG. 28 to be described later). The license ID identifies the license required to use the content recorded as data.

The EKB is information necessary for the EMD client 1 to obtain the above-mentioned content key Kc (key for decrypting the corresponding encrypted content data), and is used together with a device node key (DNK) (see FIG. 23 to be described later) included in the license. Incidentally, the EKB itself is not directly related to the present invention, and details thereof can be readily understood by those skilled in the art by reference to the above-mentioned WO02/080446 pamphlet and the like. Therefore detailed description of the EKB will be omitted.

The data comprises an arbitrary number of encryption blocks. Each encryption block comprises an IV (Initial Vector), a seed, and data EK'c(data) obtained by encrypting the content data using a key K'c.

The key K'c is constituted by a value calculated by applying the content key Kc and the seed, which is a value set as a random number, to a hash function as expressed by the following equation:

$$K'c = \mathrm{Hash}(Kc, \mathrm{Seed})$$

The initial vector IV and the seed are set to a different value in each encryption block.

The encryption of the content data is carried out in divided units of eight bytes. A succeeding eight bytes is encrypted by use of a result of encryption of a preceding eight bytes in what is known as CBC (Cipher Block Chaining) mode.

In CBC mode, when content data of a first eight bytes is to be encrypted, there is no result of encryption of a preceding eight bytes. Therefore the content data of the first eight bytes is encrypted using the initial vector IV as an initial value.

By performing encryption in this CBC mode, even if one encryption block is decrypted, the other encryption blocks will not be decrypted as a result.

Incidentally, the encryption itself is not directly related to the present invention, and details thereof can be readily understood by those skilled in the art by reference to the above-mentioned WO02/080446 pamphlet and the like. Therefore detailed description of the encryption will be omitted.

As described above, the EMD client 1 can obtain the full data (content data) of a musical piece from the EMD server 3 freely and free of charge. Thus, the musical piece (content) itself can be distributed extensively.

However, as described above, the EMD client 1 needs to retain a license (data) when using a content obtained (when reproducing a musical piece). Thus, the EMD client 1 performs the above-described "license obtaining process" in FIG. 17 to obtain license data. A process on the EMD server 3 side which process corresponds to the "license obtaining process" is the "license providing process (process in step S211 in FIG. 18)" as described above. Details of the "license providing process" are shown in a flowchart of FIG. 22. The details of the "license providing process" will now be described in the following with reference to the flowchart of FIG. 22.

Figure 17:
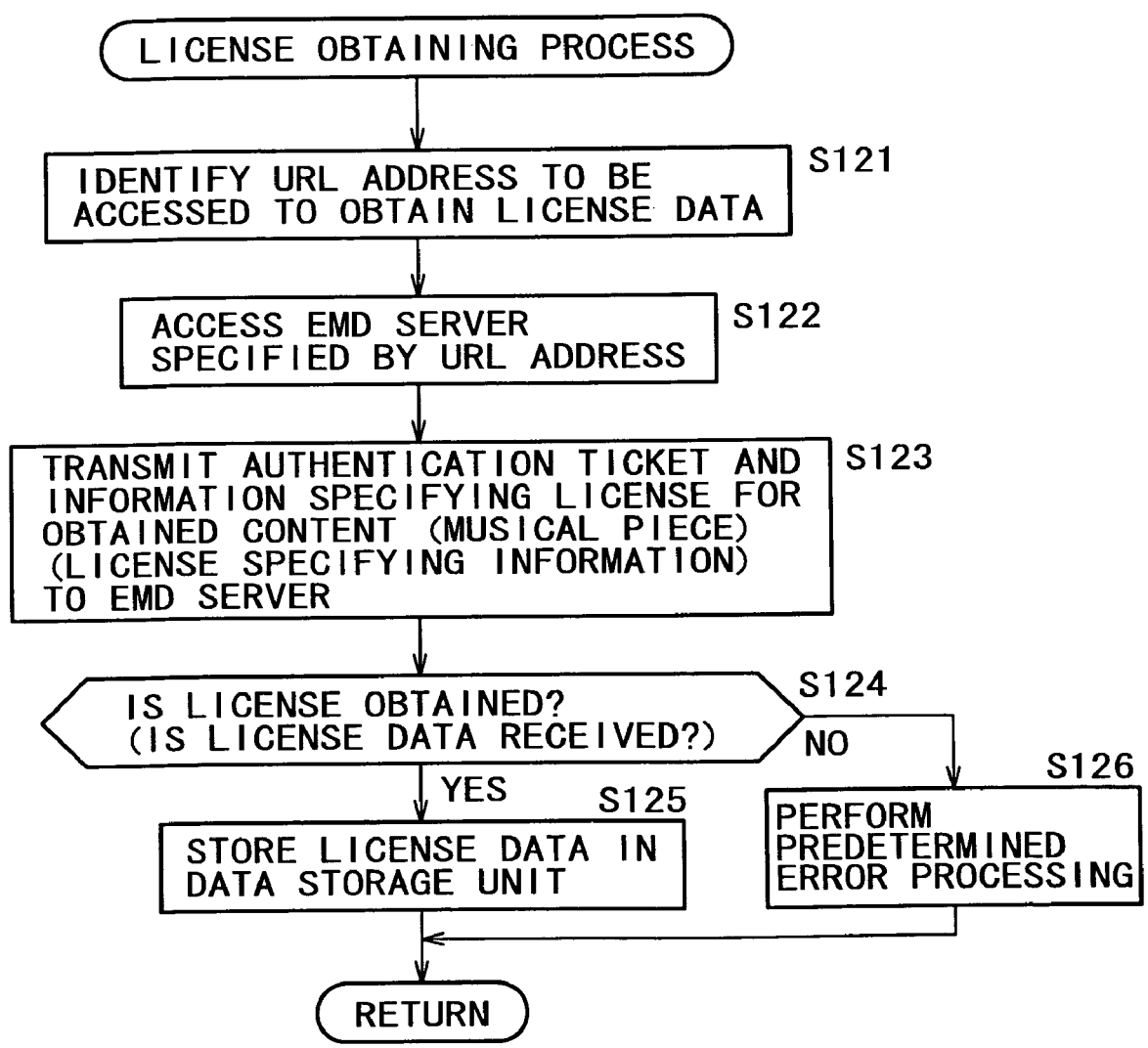
FIG. 17 is a flowchart of assistance in explaining a detailed example of a license obtaining process in the process of the EMD client in FIG. 9.

When the EMD server 3 is accessed by the EMD client 1, and the authentication ticket and the license specifying information are transmitted via the network 2 in the processes of steps S122 and S123 in FIG. 17, as described above, the CPU 101 of the EMD server 3 determines in step S201 in FIG. 18 that the EMD server 3 is accessed by the EMD client 1. The CPU 101 determines in each of steps S202, S204, S206, and S208 that a request corresponding to the process of each of steps S202, S204, S206, and S208 is not made, and then, in step S210, the CPU 101 determines that the license is requested. In step S211, the CPU 101 performs the "license providing process."

Figure 22:
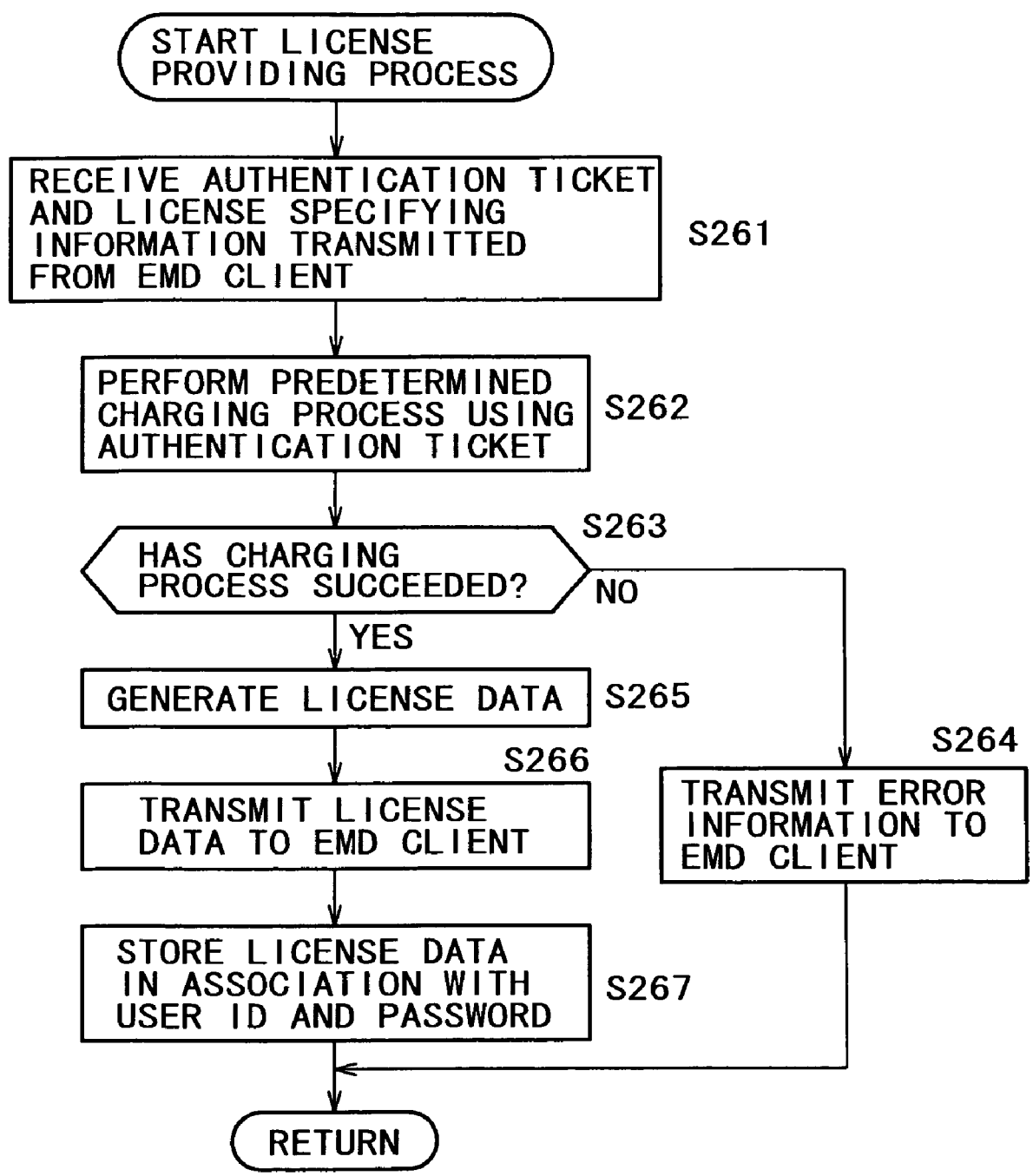
FIG. 22 is a flowchart of assistance in explaining a detailed example of a license providing process in the process of the EMD server in FIG. 18.

Specifically, in step S261 in FIG. 22, the CPU 101 receives the authentication ticket and the license specifying information transmitted from the EMD client 1 via the communication unit 110.

In step S262, the CPU 101 performs a predetermined charging process using the authentication ticket.

Specifically, the CPU 101 for example checks a history of past payments of the user identified by the authentication ticket (a user ID and a password) to determine whether there is a past record of a license fee being unpaid by the user, for example. When there is no such record, the CPU 101 performs a process of generating a credit result that allows the license to be granted and charging a financial institution specified in advance by the user for the license fee. When this process is performed, the CPU 101 determines that the charging process has succeeded.

On the other hand, when the CPU 101 determines that there is a past record of a non-payment, for example, the CPU 101 generates a credit result that does not allow the license to be granted. When this process is performed, the CPU 101 determines that the charging process has failed.

In step S263, the CPU 101 determines whether the charging process has succeeded on the basis of the previously generated credit result.

When the charging process has failed (when the CPU 101 determines in step S263 that the charging process has not succeeded), the CPU 101 in step S264 transmits predetermined error information to the EMD client 1 via the communication unit 110 and the network 2. Thereby the "license providing process" is ended.

On the other hand, when the charging process has succeeded (when the CPU 101 determines in step S263 that the charging process has succeeded), the CPU 101 in step S265 generates the data of the license as shown in FIG. 23.

The license provided to the EMD client 1 will be described below with reference to FIG. 23.

As shown in FIG. 23, the license includes for example use conditions, a leaf ID, and a device node key (DNK).

The use conditions for example includes: a use time limit within which the content (musical piece) can be used on the basis of the license; a download time limit within which the content can be downloaded on the basis of the license; a number of times the content can be copied on the basis of the license (permitted number of copies); a number of checkouts; a maximum number of checkouts; a right to record the content onto a CD(Compact Disk)-R on the basis of the license; a number of times copying can be performed to PDs (Portable Devices); a right to change the license to an ownership right (a bought-out state); and an obligation to keep a use log.

Incidentally, the use conditions themselves are not directly related to the present invention, and details thereof can be readily understood by those skilled in the art by reference to the above-mentioned WO02/080446 pamphlet and the like. Therefore more detailed description of the use conditions will be omitted.

The leaf ID and the DNK refer to the following information.

According to the above-mentioned WO02/080446 pamphlet and the like (according to "OpenMG X"), keys of devices (the EMD client 1 and the like) and licenses are managed on the basis of a principle of a broadcast encryption system. The keys constitute a hierarchical tree structure in which leaves at a bottom level correspond to the keys of individual devices or licenses.

Thus, in the present embodiment, a key system referred to as an MG-R entity formed on the basis of the principle of the broadcast encryption system manages device keys and license keys. For example, though not shown, nodes at 8 levels, 24 levels, and 32 levels in that order from the top constitute a tree structure in which each of the nodes from a route node to an eighth highest level below the route node corresponds to a category. The category in this case refers to a category of devices using a semiconductor memory such for example as a Memory Stick (trademark), or a category of devices for receiving digital broadcasts. One of such category nodes corresponds to a T system serving as a license managing system.

That is, licenses are made to correspond to keys corresponding to nodes at the 24 levels below the node of this T system. In this case, it is thereby possible to define about 16 million ($=2^{24}$=about 16 million) licenses. Further, it is possible to define about forty billion ($=2^{32}$=about forty billion) users by the lowest 32 levels. A key corresponding to each of nodes at the lowest 32 levels forms a DNK. An ID corresponding to the DNK is a leaf ID.

In other words, the leaf ID represents identification information assigned to the license defined by the T system. The DNK is a device node key required in decrypting an encrypted content key Kc included in an EKB (enabling key block) corresponding to the license.

Incidentally, the leaf ID and the DNK, and techniques of the T system and the like related thereto are not directly related to the present invention, and details thereof can be readily understood by those skilled in the art by reference to the above-mentioned WO02/080446 pamphlet and the like. Therefore their detailed description will be omitted.

Returning to FIG. 22, after generating the license data as described above in step S265, the CPU 101 transmits the license data to the EMD client 1 via the communication unit 110 and the network 2 in step S266. Then, in step S267, the CPU 101 stores the license data in the storage unit 109 in association with the user ID and the password. Thereby the "license providing process" is ended.

The processes of the EMD system in FIG. 1 have been described above individually from the two aspects of the process of the EMD client 1 side and the process of the EMD server 3 side.

Such a series of processes is performed by each of the EMD client 1 and the EMD server 3, whereby the EMD client 1 automatically starts trial listening reproduction of a predetermined musical piece without the user performing a specific operation for starting trial listening reproduction. Thus, the user needs only to listen to the musical piece being automatically reproduced for trial listening without looking carefully at the display unit 23 of the EMD client 1, and perform a purchase operation (the user does not need to look carefully at the display unit 23 in this purchase operation, either) when the user likes the musical piece. When the user does not like the musical piece, the user can listen to a sample of another musical piece only by performing an operation of pressing the downward key 45 or the upward key 44 (a simple operation that does not rely on a GUI).

As shown in FIG. 7 described above, the user can purchase (download) a musical piece by pressing the ENTER key 43 twice when the user likes the musical piece being reproduced for trial listening.

However, when the user repeatedly hits the ENTER key 43 (presses the ENTER key 43 twice or more) by mistake without an intention of purchasing, or when the input processing unit 18 (FIG. 2) of the EMD client 1 erroneously detects that the ENTER key 43 has been hit repeatedly even though the ENTER key 43 has not been hit repeatedly in reality, a problem occurs in that the purchase of the musical piece is determined (the musical piece is downloaded).

Accordingly, the CPU 11 (FIG. 2) of the EMD client 1 performs a process of "ignoring an operation of pressing the ENTER key 43 for a certain period (for example one second) from a time of display of the purchase confirmation image 93 on the display unit 23 (that is, a time of a first operation of pressing the ENTER key 43), whereby the problem can be solved. Incidentally, this process is performed in place of step S11 in FIG. 9. The process will hereinafter be referred to as a "content data obtainment preparing process."

Figure 26:
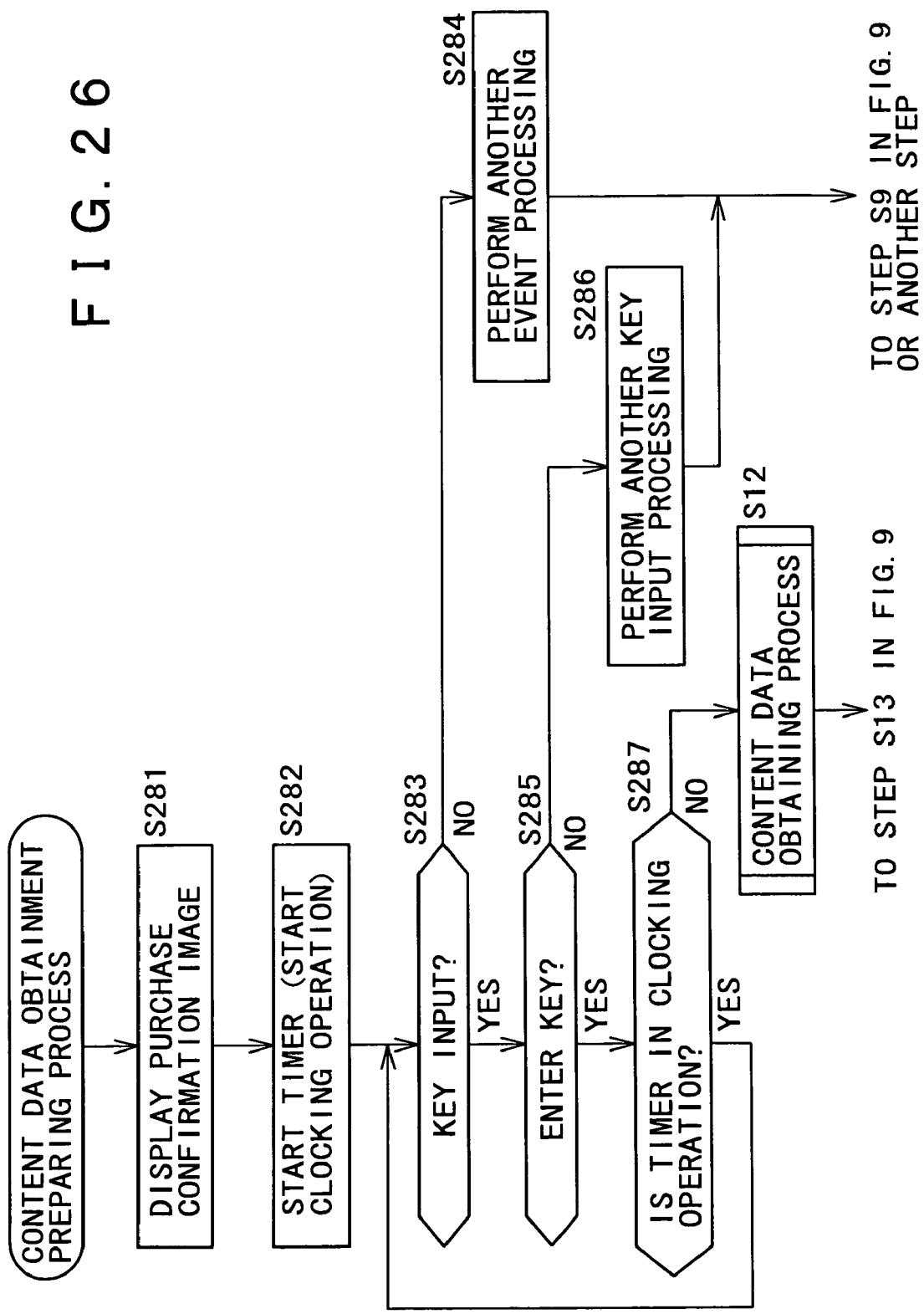
FIG. 26 is a flowchart of assistance in explaining an example of a content data obtainment preparing process performed in place of a process of step S11 in FIG. 9.

Details of the "content data obtainment preparing process" are shown in a flowchart of FIG. 26. The details of the "content data obtainment preparing process" will now be described in the following with reference to the flowchart of FIG. 26.

As described above, when the ENTER key 43 is pressed once while the "trial listening data obtaining and reproducing process" in step S9 is being performed and thus a predetermined musical piece is being reproduced for trial listening, it is determined in the process of step S68 in FIG. 14 that the ENTER key 43 or the left key 47 is pressed, and the "trial listening data obtaining and reproducing process" in step S9 is ended. Then, it is determined in the process of step S10 in FIG. 9 that an instruction to display the top page is not given.

In this case, the "content data obtainment preparing process" is performed in place of step S11 in FIG. 9.

Specifically, the CPU 11 displays the purchase confirmation image 93 (FIG. 7) on the display unit 23 in step S281 in FIG. 26, and starts the timer 51 (starts clocking operation) in step S282. At this time, the timer 51 starts the clocking operation in a mode different from that of the "trial listening data obtaining and reproducing process" in FIG. 14 as described above (in a mode with a different time-out period).

In step S283, the CPU 11 determines whether there is a key input.

When the CPU 11 determines in step S283 that there is no key input, the CPU 11 performs another event process as required in step S284. The process thereafter proceeds to step S9 in FIG. 9 or the like (may return to step S283).

On the other hand, when the CPU 11 determines in step S283 that there is a key input, the CPU 11 determines in step S285 whether the key input is provided by the ENTER key 43.

When the key input is provided by other than the ENTER key 43 (when the CPU 11 determines in step S285 that the key input is not provided by the ENTER key 43), the CPU 11 performs another key input process as required in step S286. The process thereafter proceeds to step S9 in FIG. 9 or the like (may return to step S283).

On the other hand, when the key input is provided from the ENTER key 43 (when the CPU 11 determines in step S285 that the key input is provided by the ENTER key 43), the CPU 11 determines in step S287 whether the timer 51 is in the clocking operation.

When the timer 51 is in the clocking operation (when the CPU 11 determines in step S287 that the timer 51 is in the clocking operation), the CPU 11 ignores the input from the ENTER key 43. That is, the process returns to step S283 to repeat the process from step S283 on down.

On the other hand, when the timer 51 has already ended the clocking operation (when the CPU 11 determines in step S287 that the timer 51 is not in the clocking operation), the CPU 11 judges the input from the ENTER key 43 to be valid, and then performs the "content data obtaining process (process of step S12 in FIG. 9) in FIG. 16 as described above.

Figure 27:
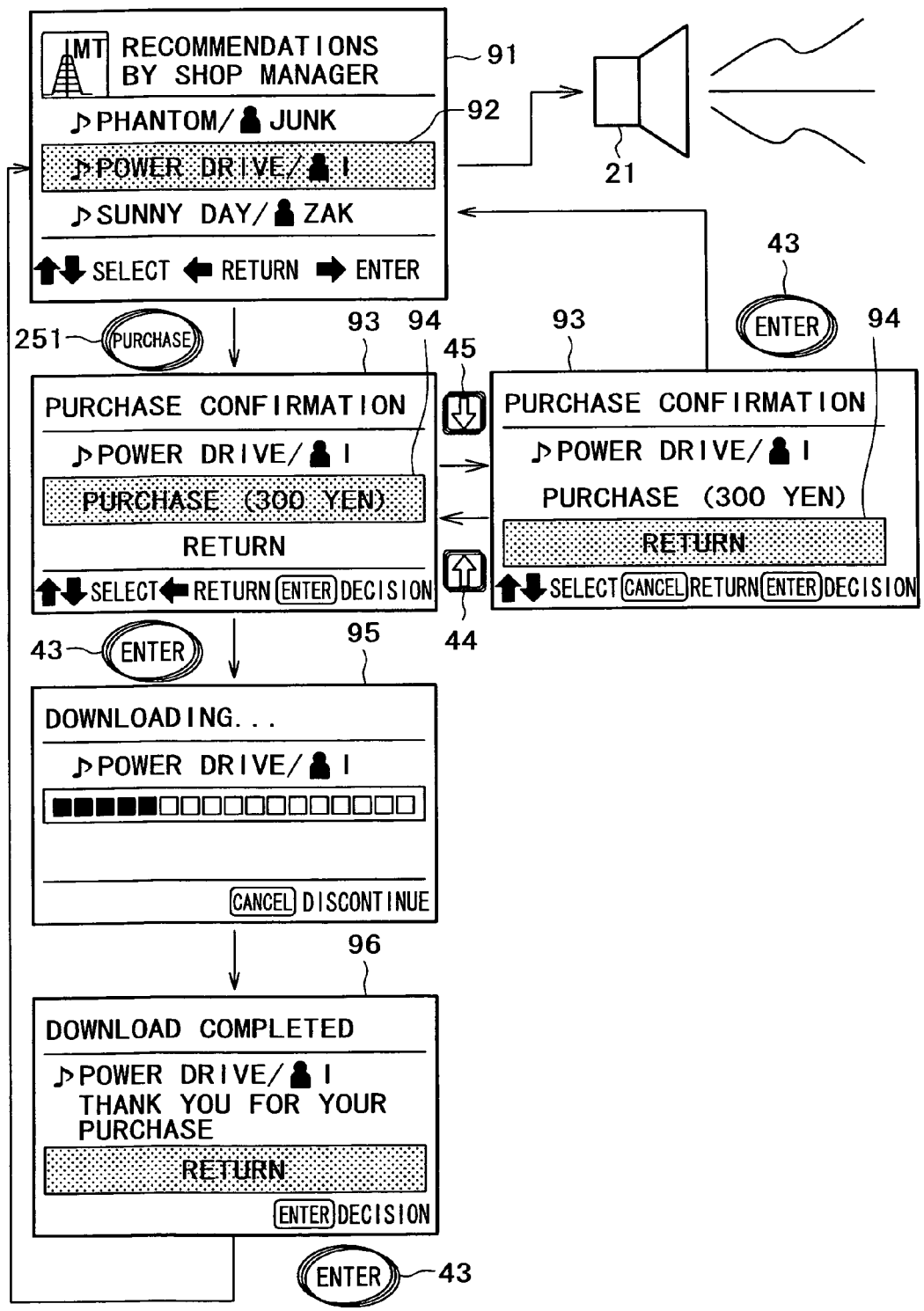
FIG. 27 is a diagram of assistance in explaining another example of operation for purchasing (downloading) a musical piece according to the present embodiment.

Incidentally, as a measure to prevent accidental purchase of a musical piece (a measure to solve the above problem), a dedicated key (purchase key) 251 for purchase may be applied in place of the ENTER key 43 as a key pressed when the user likes a musical piece being reproduced for trial listening, as shown in FIG. 27. That is, the purchase key 251 may be added to the input unit 17 in FIG. 2 or the like.

FIG. 27 is a diagram of assistance in explaining an example of operation for purchasing a musical piece when the purchase key 251 is used. A comparison of FIG. 27 with FIG. 7 described above indicates that the two figures are identical with each other except for the purchase key 251. That is, the operation for purchasing a musical piece when the purchase key 251 is used is basically the same as the musical piece purchasing operation described above with reference to FIG. 7, except for an operation of pressing the purchase key 251. Therefore description of FIG. 27 will be omitted.

The EMD system of FIG. 1 has been described above as an embodiment of the present invention. That is, the EMD system of FIG. 1 has been described above as an embodiment in which the EMD server 3 is formed by one apparatus. However, as described above, it is possible to distribute the first to seventh functions of the EMD server 3 to a plurality of apparatus. That is, the EMD system to which the present invention is applied may comprise the EMD client 1 and an EMD server system comprising a plurality of apparatus. Specifically, the EMD system to which the present invention is applied may be formed as shown in FIG. 28, for example. That is, FIG. 28 shows an example of configuration of another embodiment of the EMD system (content distribution system) to which the present invention is applied.

In FIG. 28, a shop server 301-1, an authentication server 301-2, a trial listening data server 301-3, a content data server 301-4, a license server 301-5, a user information server 301-6, and a charging server 301-7 are connected to a network 2. That is, each of the shop server 301-1, the authentication server 301-2, the trial listening data server 301-3, the content data server 301-4, the license server 301-5, the user information server 301-6, and the charging server 301-7 is connected to an EMD client 1 via the network 2.

The shop server 301-1 stores information such as a top page 81, a musical piece presenting page 91 and the like as described above. When there is a request from the EMD client 1, the shop server 301-1 transmits requested information to the EMD client 1. That is, the shop server 301-1 has the first function of the first to seventh functions of the EMD server 3 described above.

The authentication server 301-2 authenticates a user receiving the EMD service and the EMD client 1. That is, the authentication server 301-2 has the fifth function of the first to seventh functions of the EMD server 3 described above.

The trial listening data server 301-3 stores trial listening data of each of musical pieces. When there is a request from the EMD client 1, the trial listening data server 301-3 transmits the trial listening data of a requested musical piece to the EMD client 1. That is, the trial listening data server 301-3 has the second function of the first to seventh functions of the EMD server 3 described above.

The content data server 301-4 stores full data (content data) of each of musical pieces. When there is a request from the EMD client 1, the content data server 301-4 transmits the full data of a requested musical piece to the EMD client 1. That is, the content data server 301-4 has the third function (and a part of the fourth function) of the first to seventh functions of the EMD server 3 described above.

The license server 301-5 manages a license corresponding to each musical piece. That is, the license server 301-5 has a part of the fourth function of the first to seventh functions of the EMD server 3 described above.

The user information server 301-6 retains information on the user and the EMD client 1 when the EMD service is available to members only, or when a history of past uses or the like needs to be managed. That is, the user information server 301-6 has the sixth function of the first to seventh functions of the EMD server 3 described above.

The charging server 301-7 collects charges for a musical piece (performs a charging process) when the user has purchased the musical piece through the EMD service. That is, the charging server 301-7 has the seventh function of the first to seventh functions of the EMD server 3 described above. Thus, thought not shown, the charging server 301-7 is also connected to networks of credit card companies and financial institutions such as banks, for example.

When the shop server 301-1 to the charging server 301-7 described above are regarded as one system (such a system will hereinafter be referred to as an EMD server system 301), the EMD server 3 in FIG. 1 and the EMD server system 301 have exactly the same functions. That is, the EMD system of FIG. 28, which can be said to be functionally equivalent to the EMD system of FIG. 1, can provide the various effects described above in exactly the same manner.

Incidentally, each of the shop server 301-1 to the charging server 301-7 is not specifically limited in configuration as long as each of the shop server 301-1 to the charging server 301-7 has a configuration that enables the corresponding function to be performed; for example, each of the shop server 301-1 to the charging server 301-7 may have exactly the same configuration as the configuration of the EMD server 3 shown in FIG. 8.

It is to be noted that the first to fourth functions of the first to seventh functions described above are required of the EMD server system 301, whereas the fifth to seventh functions are not required depending on the EMD service being used. For example, when it is not necessary to charge each time a purchase is made (when the seventh function is not required), the charging server 301-7 is not required. Also, when it is not necessary to perform authentication and user management (when the fifth function and the sixth function are not required), the authentication server 301-2 and the user information server 301-6 are not required.

Further, while all the servers (the shop server 301-1 to the charging server 301-7) in the example of FIG. 28 are connected to one network 2 in a bus topology, the topology of the servers is not specifically limited to the example of FIG. 28. For example, servers that are not desired to be accessed directly by the EMD client 1 or another network device may communicate with the EMD client 1 via a predetermined server (for example the shop server 301-1). Also, the network topology of each network device is not specifically limited.

FIG. 29 shows an example of a process flow of the EMD system (FIG. 28). The process flow of the EMD system in FIG. 28 will now be described in the following with reference to FIG. 29.

In FIG. 29, when the EMD client 1 makes a connection request (request for information of the top page 81) to the shop server 301-1 in step S301, the shop server 301-1 in step S302 makes a request to the authentication server 301-2 for authentication of the user (EMD client 1).

Then, in step S303, the authentication server 301-2 makes an authentication request to the EMD client 1. In step S304, the EMD client 1 makes an authentication response. That is, the EMD client 1 transmits a user ID and a password to the authentication server 301-2.

In step S305, to use user information recorded in the user information server 301-6, the authentication server 301-2 requests the user information from the user information server 301-6. In step S306, the user information server 301-6 responds to the request. That is, the user information server 301-6 transmits the user information to the authentication server 301-2. In step S307, the authentication server 301-2 performs an authentication using the user information, and transmits a result of the authentication and an authentication ticket to the shop server 301-1 when the authentication server 301-2 determines that the user and the EMD client 1 are valid.

In step S308, the shop server 301-1 transmits the authentication ticket and the information of the top page 81 to the EMD client 1. Thereby connection between the EMD client 1 and the shop server 301-1 is established.

Next, when the EMD client 1 makes a request for the information of the musical piece presenting page 91 as described above (makes a connection request) in step S309, the shop server 301-1 in step S310 transmits the information of the musical piece presenting page (HTML document 221 in FIG. 13) to the EMD client 1.

Thereafter, in step S311, the EMD client 1 automatically requests trial listening data of a predetermined musical piece (musical piece of interest) as described above from the trial listening data server 301-3 (automatically makes a connection request). Thus, in step S312, the trial listening data server 301-3 transmits the trial listening data of the musical piece of interest to the EMD client 1.

The user can listen to a sample of another musical piece by pressing an upward key 44 or a downward key 45 and thus making the EMD client 1 and the trial listening data server 301-3 automatically repeat the above-described process in steps S311 and S312.

When the user likes a musical piece (musical piece of interest) being reproduced for trial listening and decides to purchase (download) the musical piece, the user presses an ENTER key 43 twice (or presses a purchase key 251 in FIG. 27 after pressing the ENTER key 43), as described above.

Then, in step S313, the EMD client 1 makes a request to the content data server 301-4 for full data (content data) of the musical piece of interest as described above (makes a connection request). In step S314, the content data server 301-4 transmits the full data of the musical piece of interest to the EMD client 1.

When the EMD client 1 makes a license request (transmits the authentication ticket) to the license server 301-5 in step S315, the license server 301-5 makes the authentication server 301-2 check validity of the authentication ticket (makes an authentication request) in step S316. In step S317, the authentication server 301-2 makes an authentication response. When the response represents a result indicating that the authentication ticket is valid, the license server 301-5 makes a charging request to the charging server 301-7 in step S318. In step S319, when the charging server 301-7 performs a predetermined charging process and succeeds in the charging process, the charging server 301-7 transmits the result (charging response) to the license server 301-5. Receiving this result, the license server 301-5 transmits license data to the EMD client 1 (makes a license response) in step S320.

When the series of processes described above is to be carried out by software, a program comprising the software is installed from a network or a recording medium onto a computer incorporated in special hardware, or for example a general-purpose personal computer that can perform various functions by installing various programs thereon.

Specifically, in the EMD client 1, for example, a program comprising application software having each of the list obtaining unit 71 to the content full data obtaining unit 76 in FIG. 3 as a module is installed from a network or a recording medium onto a computer incorporated in special hardware, or for example a general-purpose personal computer that can perform various functions by installing various programs thereon.

As shown in FIG. 2 or FIG. 8, for example, the recording medium including such a program is not only formed by the removable recording medium (packaged medium) 61 (FIG. 2) or the removable recording medium 112 (FIG. 8) distributed to users to provide the program separately from the apparatus proper, the removable recording medium comprising a magnetic disk (including floppy disks), an optical disk (including CD-ROM (Compact Disk-Read Only Memory) and DVD (Digital Versatile Disk)), a magneto-optical disk (including MD (Mini-Disk)), a semiconductor memory or the like which has the program recorded thereon, but also formed by the ROM 12 (FIG. 2) or the ROM 102 (FIG. 8), the hard disk included in the data storage unit 15 (FIG. 2) or the storage unit 109, or the like which has the program recorded thereon and is provided to the user in a state of being preincorporated in the apparatus proper.

It is to be noted that as described above, each of the list obtaining unit 71 to the content full data obtaining unit 76 in FIG. 3 is not specifically limited in configuration as long as each of the list obtaining unit 71 to the content full data obtaining unit 76 performs its function.

Specifically, for example, each of the list obtaining unit 71 to the content full data obtaining unit 76 in FIG. 3 may be formed by hardware. In this case, for example, a manufacturer or the like produces hardware corresponding to each of the list obtaining unit 71 to the content full data obtaining unit 76 in FIG. 3, and connects each of the list obtaining unit 71 to the content full data obtaining unit 76 as shown in FIG. 3. It is thereby possible to realize an EMD client having a different configuration from that of FIG. 2.

Further, even when the list obtaining unit 71 to the content full data obtaining unit 76 in FIG. 3 are formed by software, for example, the configuration thereof is not limited to an example of FIG. 3. The configuration may be for example a module configuration comprising modules obtained by combining a part or the whole of the list obtaining unit 71 to the content full data obtaining unit 76 in FIG. 3, or a module configuration in which a module has a divided part of one of the functions of the list obtaining unit 71 to the content full data obtaining unit 76 in FIG. 3. Alternatively, the software may be a program having a single algorithm.

It is to be noted that in the present specification, the steps describing the program recorded on the recording medium include not only processing carried out in time series in the described order but also processing carried out in parallel or individually and not necessarily in time series.

Also, in the present specification, a system refers to an apparatus as a whole formed by a plurality of apparatus and processing units.

Further, while contents distributed are musical pieces in the above-described example, the contents are not limited to musical pieces, and need only to be contents including audio. Specifically, for example, a movie (moving images and audio corresponding thereto) may be the contents. In this case, the audio part of the movie or audio data of a narration promoting the movie or the like is trial listening data, and a device having a small screen such as a portable telephone or the like can be made to have similar functions to those of the above-described EMD client 1. Thus, by simply performing exactly the same operation as the above-described operation (the operation of pressing a predetermined key) without looking carefully at the small screen of the portable telephone or the like, it is possible to purchase (download) content data such as movie data or the like easily and surely.

What is claimed is:

1. An information processing apparatus, comprising:
a communication unit configured to communicate with an external apparatus to receive list information including identification information of content data;
a reproduction unit configured to reproduce said content data; and
a control unit configured to designate said identification information of said content data to begin a period of designation, in response to an input to an operation unit, to control said communication unit to transmit a request for a part of said content data upon a determination that the content data is not being reproduced upon the period of designation reaching a defined nonzero duration, to control said communication unit to receive said part of said content data in response to the request, and to control said reproduction unit to reproduce the received part of said content data.

2. The information processing apparatus according to claim 1, wherein said control unit is configured to control said communication unit not to transmit the request for said part of said content data until the period of designation reaches said defined nonzero duration.

3. The information processing apparatus according to claim 1, wherein said control unit is configured to control said reproduction unit to repeatedly reproduce the received part of said content data.

4. The information processing apparatus according to claim 1, wherein said control unit is configured to control said reproduction unit to stop reproducing the received part of said content data when said reproduction unit has reproduced the received part of said content data a predetermined number of times.

5. The information processing apparatus according to claim 1, wherein said communication unit is further configured to acquire the entirety of said content data, when another input to said operation unit occurs while said reproduction unit reproduces the received part of said content data.

6. The information processing apparatus according to claim 5, wherein said reproduction unit is further configured to reproduce audio data indicating that said communication unit is receiving said content data, when said communication unit receives said content data.

7. The information processing apparatus according to claim 5, wherein said reproduction unit is further configured to reproduce audio data indicating that said communication unit has finished receiving said content data, when said communication unit has finished receiving said content data.

8. An information processing method for a content reception apparatus, the information processing method comprising:
receiving list information from an external apparatus, said list information including identification information of content data;
designating said identification information of said content data to begin a period of designation, with a processor of the content reception apparatus, in response to an input to an operation unit;
transmitting, with an interface of the content reception apparatus, a request for a part of said content data, upon a determination that the content data is not being reproduced upon said period of designation reaching a defined nonzero duration;
receiving said part of said content data in response to the request; and
reproducing the received part of said content data.

9. The information processing method according to claim 8, wherein said transmitting is not performed until said period of designation reaches said defined nonzero duration.

10. The information processing method according to claim 8, wherein said reproducing includes reproducing the received part of said content data repeatedly.

11. The information processing method according to claim 8, further comprising:
stopping said reproducing when said reproducing has reproduced the received part of said content data a predetermined number of times.

12. The information processing method according to claim 8, further comprising:
acquiring the entirety of said content data, when another input to said operation unit occurs during said reproducing.

13. The information processing method according to claim 12, wherein said receiving said part of said content data includes reproducing audio data indicating that said content data is being received.

14. The information processing method according to claim 12, further comprising:

reproducing audio data indicating that the receiving said part of said content data has finished, when the receiving said part of said content data has finished.

15. A computer-readable medium including computer executable instructions, wherein the instructions, when executed by a processor, cause the processor to perform an information processing method comprising:

receiving list information from an external apparatus, said list information including identification information of content data;

designating said identification information of said content data to begin a period of designation, in response to an input to an operation unit;

transmitting a request for a part of said content data, upon a determination that the content data is not being reproduced upon said period of designation reaching a defined nonzero duration;

receiving the part of said content data in response to the request; and reproducing the received part of said content data.

16. A system, comprising:

an external apparatus; and an information processing apparatus including
  a communication unit configured to communicate with the external apparatus to receive list information including identification information of content data,
  a reproduction unit configured to reproduce said content data, and
  a control unit configured to designate said identification information of said content data to begin a period of designation, in response to an input to an operation unit, to control said communication unit to transmit a request for a part of said content data upon a determination that the content data is not being reproduced upon the period of designation reaching a defined nonzero duration, to control said communication unit to receive said part of said content data in response to the request, and to control said reproduction unit to reproduce the received part of said content data, wherein the external apparatus is configured to transmit said content data, said list information, and said part of said content data to the information processing apparatus.

17. An information processing apparatus, comprising:

means for communicating with an external apparatus to receive list information including identification information of content data;

means for reproducing said content data; and means for designating said identification information of said content data to begin a period of designation in response to an input, for controlling said means for communicating to transmit a request for a part of said content data upon a determination that the content data is not being reproduced upon the period of designation reaching a defined nonzero duration, for controlling said means for communicating to receive the part of said content data in response to the request, and for controlling said means for reproducing to reproduce the received part of said content data.

18. An information processing apparatus, comprising:

a communication unit configured to receive, from an external apparatus, identification information of a first one of a plurality of content data and identification information of a second one of the plurality of content data;

a reproduction unit configured to reproduce a part of the first one of the plurality of content data; and a control unit configured to designate the identification information of the second one of the plurality of content data to begin a designation period when an operation unit receives an input, to determine when the designation period has reached a predetermined duration during a reproduction of the first one of the plurality of content data, to control the communication unit to transmit a request, to the external apparatus, for a part of the second one of the plurality of content data after the control unit has determined, during the reproduction of the first one of the plurality of content data, that the second one of the plurality of content data is not being reproduced upon the designation period reaching the predetermined duration, to control the communication unit to receive the part of the second one of the plurality of content data from the external apparatus in response to the request, and to control the reproduction unit to reproduce the part of the second one of the plurality of content data.

19. The information processing apparatus according to claim 18, wherein the control unit is configured to control the communication unit to transmit the request, to the external apparatus, for the part of the second one of the plurality of content data only after the control unit has determined that the designation period has reached the predetermined duration.

* * * * *